US006935956B1

(12) United States Patent
Ogata et al.

(10) Patent No.: US 6,935,956 B1
(45) Date of Patent: Aug. 30, 2005

(54) CONTROL APPARATUS AND DETECTING DEVICE

(75) Inventors: Hiroki Ogata, Chiba (JP); Kazusato Tagawa, Chiba (JP); Hiroyuki Nakazawa, Chiba (JP); Youtaro Sakakura, Fukushima (JP); Koji Mita, Fukushima (JP)

(73) Assignee: Sony Computer Entertainment Inc. (JP)

( * ) Notice: Subject to any disclaimer, the term of this patent is extended or adjusted under 35 U.S.C. 154(b) by 74 days.

(21) Appl. No.: 09/658,174

(22) Filed: Sep. 8, 2000

(30) Foreign Application Priority Data

| Sep. 11, 1999 | (JP) | ........................................... 11-297204 |
| Dec. 24, 1999 | (JP) | ........................................... 11-367102 |
| Aug. 31, 2000 | (JP) | ...................................... 2000-262766 |

(51) Int. Cl.[7] ................................................. A63F 9/24
(52) U.S. Cl. ....................................................... 463/38
(58) Field of Search ................................ 463/37, 38, 2; 345/161, 156; 338/47; 178/19.04, 19; 73/1.08

(56) References Cited

U.S. PATENT DOCUMENTS

| 3,585,840 | A | * | 6/1971 | Landsness .................. 73/1.08 |
| 3,806,471 | A | * | 4/1974 | Mitchell ..................... 200/511 |
| 4,315,238 | A | * | 2/1982 | Eventoff ..................... 338/100 |
| 5,049,079 | A |   | 9/1991 | Furtado et al. ............. 434/253 |
| 5,184,120 | A | * | 2/1993 | Schultz .................. 340/870.38 |
| 5,431,064 | A |   | 7/1995 | Franz |
| 5,632,680 | A | * | 5/1997 | Chung .......................... 463/36 |
| 5,714,981 | A |   | 2/1998 | Scott-Jackson et al. ..... 345/161 |
| 5,790,102 | A | * | 8/1998 | Nassimi ...................... 345/163 |
| 5,910,335 | A |   | 6/1999 | Yokoyama et al. ......... 427/127 |
| 5,912,612 | A | * | 6/1999 | DeVolpi ...................... 200/512 |
| 5,923,317 | A |   | 7/1999 | Sayler et al. ................ 345/156 |
| 6,047,245 | A | * | 4/2000 | Ott et al. ..................... 702/104 |
| 6,067,005 | A | * | 5/2000 | DeVolpi ...................... 200/512 |
| 6,102,802 | A | * | 8/2000 | Armstrong .................... 463/37 |
| 6,135,886 | A | * | 10/2000 | Armstrong .................... 463/37 |
| 6,203,432 | B1 | * | 3/2001 | Roberts et al. ............... 463/37 |
| 6,347,997 | B1 | * | 2/2002 | Armstrong .................... 463/37 |
| 6,437,772 | B1 | * | 8/2002 | Zimmerman et al. ....... 345/160 |
| 6,509,848 | B1 | * | 1/2003 | Ogata et al. .................. 341/34 |
| 6,617,982 | B1 | * | 9/2003 | Ogata et al. .................. 341/34 |
| 6,717,568 | B1 | * | 4/2004 | Takatuka et al. ............ 345/156 |

FOREIGN PATENT DOCUMENTS

| EP | 0 768 619 A1 | 4/1997 |
| EP | 0 785 499 A1 | 7/1997 |
| JP | 63-246927 | 10/1988 |
| JP | 07-302159 | 11/1995 |
| JP | 7-302159 | * 11/1995 |
| JP | 11-119882 | 4/1999 |
| TW | 340643 | 9/1998 |

OTHER PUBLICATIONS

Schneider, R.T., "Solid–State Pressure Switches Are Coming On Strong", Hydraulics and Pneumatics, vol. 52, No. 5, May 1999, pp., 6, 8, 10.

* cited by examiner

Primary Examiner—Derris H. Banks
Assistant Examiner—Corbett Coburn
(74) Attorney, Agent, or Firm—Lerner, David, Littenberg, Krumholz & Mentlik, LLP

(57) ABSTRACT

A control apparatus includes a pressure-sensitive device for providing an analog signal responsive to an applied pressure, a level segmenting unit for segmenting the analog signal into output levels and an analog-to-digital (A/D) converting unit for converting the segmented analog signal into a digital signal having a plurality of bits.

89 Claims, 43 Drawing Sheets

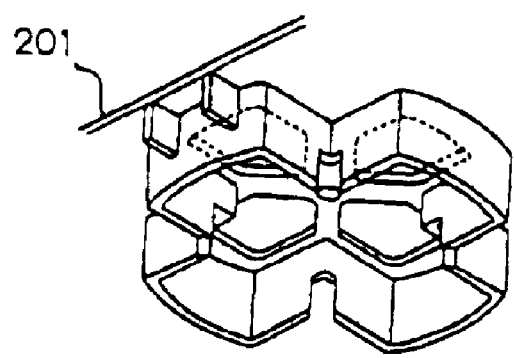
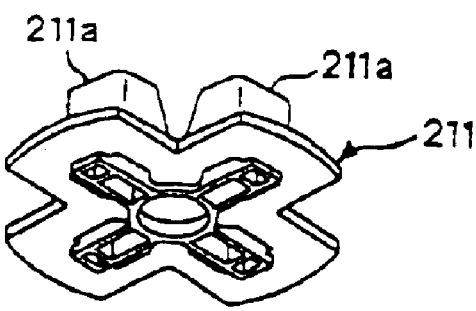
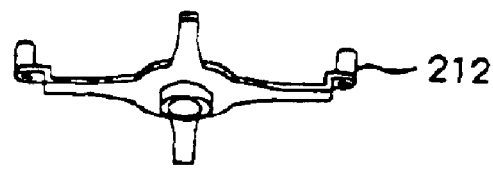
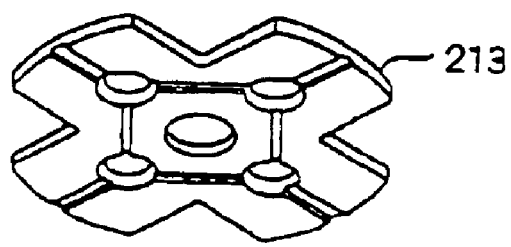
FIG. 20

CONTROL APPARATUS AND DETECTING DEVICE

FIELD OF THE INVENTION

The present invention relates to a control apparatus (controller) which is used as a peripheral equipment of entertainment devices such as video game machines.

BACKGROUND OF THE INVENTION

Generally, a variety of control operations of entertainment devices such as video game machines are performed by using control apparatuses. Therefore, a plurality of control buttons are provided on the control apparatuses and the user controls those buttons, thereby controlling the entertainment devices. As an example, the user can control a character which is displayed on a television receiver.

Conventionally, according to the thus-constructed control apparatuses, in many cases, directional control buttons cross-shaped or circular are disposed at the front-left thereof and a plurality of multi-purpose buttons are disposed at the front-right thereof.

The directional control buttons and the multi-purpose buttons comprise a tactile switch or rubber switch. Since the switch is turned on/off, the character is moved in a digital manner or the state of the character is changed in a digital manner.

As explained above, the conventional entertainment device has only a function for digitally changing the character which is displayed on the television receiver by using the directional control buttons or the multi-purpose buttons, and thereby has a disadvantage in that the motion of the character and changes thereof are not gradual and the appearance thereof is poor.

In order to overcome this disadvantage, according to a manipulation device for a game machine disclosed in Japanese Unexamined Patent Application Publication No. 7-88252, it is possible to control a character which is displayed on a display screen of a television receiver in an analog manner by adding an analog-type input device which comprises a track ball or joystick, etc. Japanese Unexamined Patent Application Publication No. 11-90042 discloses another conventional art to which an analog type-input device is added.

However, the input device of the analog type which comprises the track ball or joystick, etc. is quite different from that of the above-described directional control buttons or multi-purpose buttons in view of the operability. Therefore, it is expected that it takes a long time for a user who is accustomed to using the directional control buttons or multi-purpose buttons to become practiced in the operation of the analog-type input device and that the amount of fun which the entertainment device inherently provides may be drastically reduced.

SUMMARY OF THE INVENTION

In terms of the aforementioned case, it is an object of the present invention to enable operation in an analog manner by pressing operation of a controller which is normally used for conventional digital operation.

In order to attain the object, according to the present invention, there is provided a control apparatus including a controller which can be pressed and operated, a detecting device for outputting an analog signal corresponding to the pressing operation of the controller, and an output unit for a digital signal having a plurality of bits which converts the analog signal that corresponds to the pressing operation of the controller and that is outputted from the detecting device into a digital signal having a plurality of levels in accordance with the output levels of the analog signal.

According to the construction of the present invention, in accordance with the pressing operation of the controller, the output unit for outputting the digital signal having a plurality of bits outputs the digital signal having a plurality of bits by which an analog operation is possible, and thus the digital operation by pressing operation of the controller can be realized.

Here, the detecting device can include a pressure-sensitive device which is disposed at a position to which a pressure for acting on the controller is transmitted. As for such a detecting device, a resistor pressure-sensitive device which is made of pressure-sensitive conductive rubber, etc. can be used as an example. It is also possible to apply a hole device and an electrostatic device which output an analog signal corresponding to an pressing stroke of the controller to such a pressure-sensitive device.

The detecting device includes a conductive member which moves together with the controller and has elasticity, and a resistor which is arranged at a position which the conductive member is brought in contact with and out of contact with. The resistor can output an analog signal corresponding to the contact area with the conductive member. Incidentally, the positions of the conductive member and the resistor may be exchanged.

Preferably, the surface facing the resistor of the conductive member may be deformed in accordance with the contact pressure with the resistor and the contact area with the resistor may change and, as an example, the conductive member can be formed with the following shapes.

1. Shape having a peaked longitudinal-section surface
2. Shape having a trapezoidal longitudinal section surface
3. Shape having a cross-sectional surface which decreases step by step toward the top facing the resistor
4. Shape having a spherical surface which faces the resistor.

The resistor may have a shape having a cross-sectional surface decreases towards the top facing the conductive member. A contact region of the conductive member can be divided into a plurality parts by spaces and the contact area with the resistor can increase step by step in accordance with the deformation of the conductive member.

According to the present invention, the output unit for the digital signal having the plurality of bits can include a level segmenting means for segmenting the output levels of the analog signal which is outputted by the detecting device in accordance with the pressing operation of the controller into a plurality of levels, and an A/D converting means for converting the analog signal into a digital signal in accordance with the output levels which are segmented by the level segmenting means. Thus, it is possible to easily output the digital signal having a plurality of bits on the basis of the output level of the analog signal which is outputted by the detecting device.

Herein, preferably, the level segmenting means may uniformly segment the output level of the analog signal which is outputted by the detecting device in accordance with the pressing operation of the controller into a plurality of levels. By uniformly segmenting the output levels of the analog signal which is outputted by the detecting device, it is possible to obtain natural and smooth operability corresponding to the pressure of the controller.

BRIEF DESCRIPTION OF THE DRAWINGS

FIG. 20 is an exploded perspective view showing a structural example of a first control unit according to the first embodiment;

FIGS. 34A to 34D are front sectional views showing one deformed example of the detecting device, in which FIG. 34A is a front sectional-view of a control unit including the detecting device, FIG. 34B is a front view of a conductive member, FIG. 34C is a diagram in which the conductive member is seen from below; and FIG. 34D is a characteristic diagram of an analog signal which is outputted from an output terminal of the resistor;

FIGS. 35A to 35D are front sectional views showing another deformed example of the detecting device, in which FIG. 35A is a front sectional view of a control unit including the detecting device, FIG. 35B is a front view of a conductive member, FIG. 35C is a diagram in which the conductive member is seen from below, and FIG. 35D is a characteristic diagram of an analog signal which is outputted from an output terminal of the resistor;

FIGS. 36A to 36D are front sectional views showing another deformed example of the detecting device, in which FIG. 36A is a front sectional-view of a control unit including the detecting device, FIG. 36B is a front view of a conductive member, FIG. 36C is a diagram in which the conductive member is seen from below, and FIG. 36D is a characteristic diagram of an analog signal which is outputted from an output terminal of the resistor;

FIGS. 37A to 37D are front sectional views showing another deformed example of the detecting device, in which FIG. 37A is a front sectional view of a control unit including the detecting device, FIG. 37B is a front view of a conductive member, FIG. 37C is a diagram in which the conductive member is seen from below, and FIG. 37D is a characteristic diagram of an analog signal which is outputted from an output terminal of the resistor;

FIGS. 38A to 38D are front sectional views showing another deformed example of the detecting device, in which FIG. 38A is a front sectional-view of a control unit including the detecting device, FIG. 38B is a front view of a conductive member, FIG. 38C is a diagram in which the conductive member is seen from above, and FIG. 38D is a characteristic diagram of an analog signal which is outputted from an output terminal of the resistor;

FIGS. 39A to 39D are front sectional views showing another deformed example of the detecting device, in which FIG. 39A is a front sectional-view of a control unit including the detecting device, FIG. 39B is a front view of a conductive member, FIG. 39C is a diagram in which the conductive member is seen from above, and FIG. 39D is a characteristic diagram of an analog signal which is outputted from an output terminal of the resistor;

FIGS. 40A to 40D are front sectional views showing another deformed example of the detecting device, in which FIG. 40A is a front sectional-view of a control unit including the detecting device, FIG. 40B is a front view of a conductive member, FIG. 40C is a diagram in which the conductive member is seen from above, and FIG. 40D is a characteristic diagram of an analog signal which is outputted from an output terminal of the resistor;

FIGS. 41A to 41D are front sectional views showing another deformed example of the detecting device, in which FIG. 41A is a front sectional-view of a control unit including the detecting device, FIG. 41B is a front view of a conductive member, FIG. 41C is a diagram in which the conductive member is seen from above, and FIG. 41D is a characteristic diagram of an analog signal which is outputted from an output terminal of the resistor;

FIGS. 42A to 42D are front sectional views showing another deformed example of the detecting device, in which FIG. 42A is a front sectional-view of a control unit including the detecting device, FIG. 42B is a plan view showing one example of the resistor, FIG. 42C is a plan view showing another example of the resistor, and FIG. 42D is a plan view showing another example of the resistor.

DESCRIPTION OF THE PREFERRED EMBODIMENTS

Embodiments according to the present invention will be described in detail hereinbelow with reference to the drawings.

A control apparatus according to the present embodiments is connected to a video game machine as an entertainment device, and can control a character which is displayed on a display screen of a television receiver in a digital and analog manner.

[Outline of the Apparatus]

Figure 1:
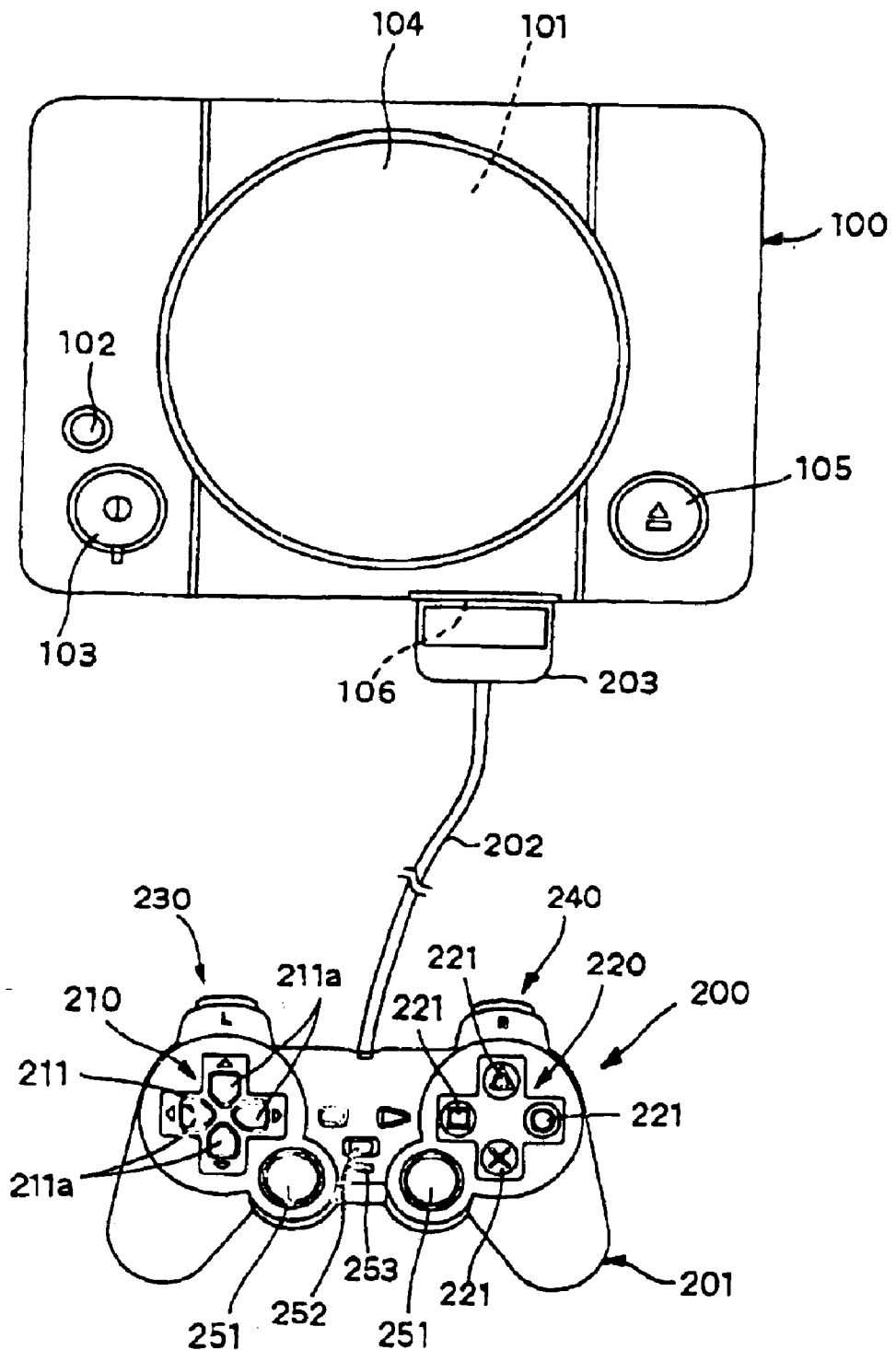
FIG. 1 is a plan view showing the outline of a video game machine which is used with a control apparatus according to embodiments of the present invention.

FIG. 1 is a plan view showing the outline of the video game machine with which the control apparatus according to the present embodiments is used. As shown in FIG. 1, the video game machine includes a game machine main body 100 which is connected to a television receiver (not shown) used as a display and a control apparatus 200 which is connected to the game machine main body 100.

The game machine main body 100 is provided therein with a disk-drive unit 101 for reading an optical disk on which a game program is recorded, an image processing device for displaying characters and a background picture on the screen of the television receiver in accordance with the game program which is stored in the optical disk, and the like. The game machine main body 100 is also provided therein with a reset switch 102 for resetting the game during execution, a power switch 103, and a lid opening control button 105 for controlling an operation for opening/closing a lid 104 which opens/closes a disk loading unit of the disk-drive unit 101.

The control apparatus 200 is connected to the game machine main body 100 via a connecting cord 202 which is led out from a device main body 201. A connector 203 is provided at one end of the connecting cord 202. The connector 203 is connected to a jack 106 which is provided in one side of the game machine main body 100, thereby connecting the control apparatus 200 to the game machine main body 100.

Figure 2:
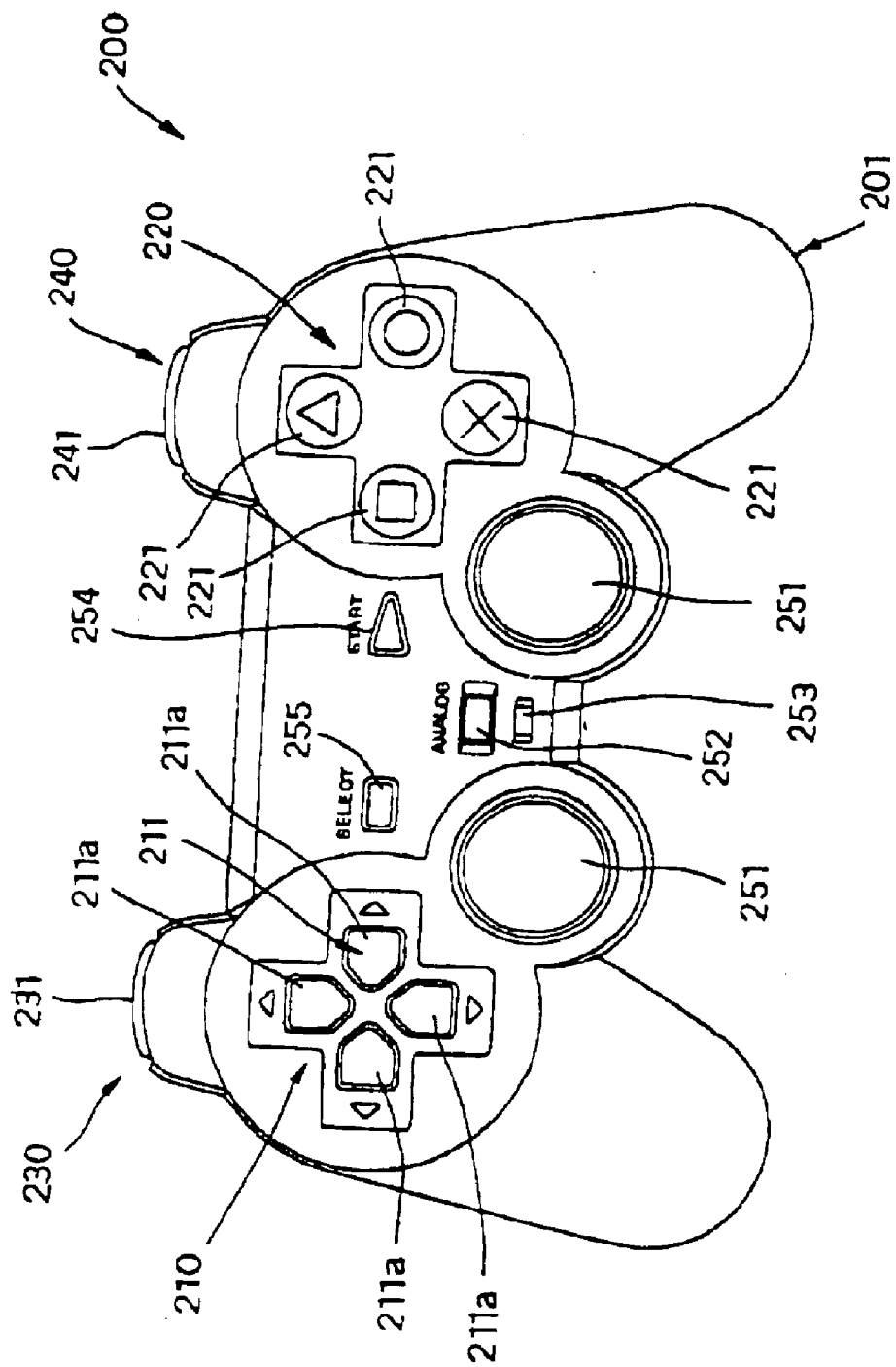
FIG. 2 is an enlarged plan view showing the controller apparatus shown in FIG. 1.

FIG. 2 is a plan view showing the control apparatus. A first control unit 210 and a second control unit 220 are provided on the upper side of the device main body 201 of the control apparatus 200, and a third control unit 230 and a fourth control unit 240 are provided at the lateral side thereof.

The first control unit 210 comprises one cross-shaped control body 211 for pressing control operation and control keys 211a which extend in four directions form the control body 211. The first control unit 210 causes a character displayed on the screen of the television receiver to be moved and has a function for moving the character vertically and horizontally by pressing the control keys 211a in the control body 211.

The second control unit 220 comprises four columnar-shaped control buttons (controller) 221 for pressing control operation. Identification marks such as an open circle "○", an open triangle "△", an open square "□" and a cross "x" are provided on the control buttons 221, so that it is easy to identify the individual control buttons 221. The function of the second control unit 220 is determined by the game program which is recorded in the optical disk. A function for changing the state of a game character is assigned to the control buttons 221. For example, functions for moving the right and left arms and the right and left legs are assigned.

The third and fourth control units 230 and 240 have almost the same structure, and comprise two control buttons 231 (controller) and two control buttons (controller) 241, respectively. The functions of the third and fourth control units 230 and 240 are determined by the game program which is recorded in the optical disk, for example, functions for performing special movements of the game character are assigned.

Further, joysticks 251 for analog operation are provided in the device main body 201 shown in FIG. 2. The joysticks 251 switch the first and second control units 210 and 220, thereby making the device more usable. The switching operation is performed by an analog-selecting switch 252 which is provided in the device main body 201. When the joysticks 251 are selected, a display unit 253 which is provided in the device main body 201 is lit, thereby indicating that the joysticks 251 are selected.

Incidentally, the device main body 201 also has a start switch 254 for instructing starting of the game and a select switch 255 for selecting the degree of difficulty of the game when starting the game.

[First Embodiment]

The following is a detailed description of the structure of a first embodiment of the present invention.

Figure 3:
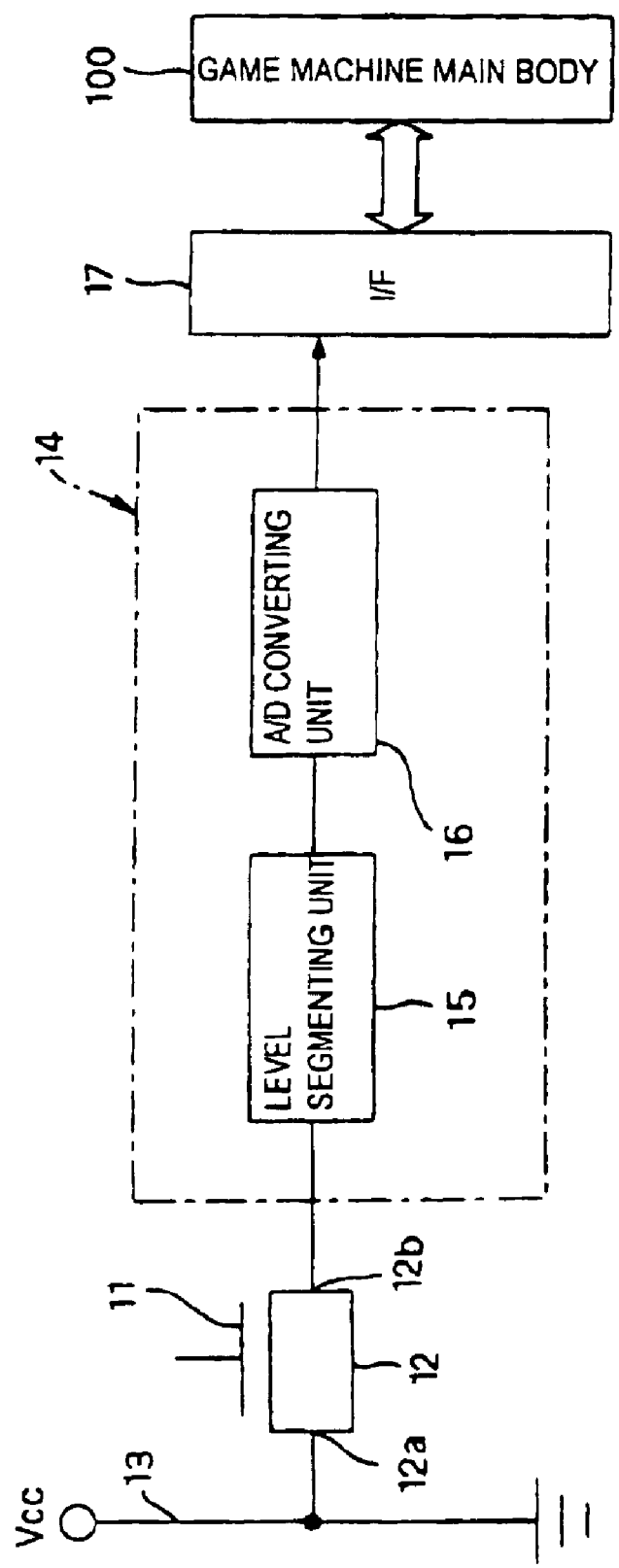
FIG. 3 is a block diagram showing the main portion of a control apparatus according to a first embodiment of the present invention.

FIG. 3 is a block diagram showing the main portion of a control apparatus according to the first embodiment of the present invention.

The control units 210, 220, 230, and 240 for pressing control operation in the control apparatus 200 have a controller 11 comprising the control keys 211a of the control body 211 and the control buttons 221, 231, and 241, and a pressure-sensitive device (detecting device) 12.

The pressure-sensitive device 12 may be made of pressure-sensitive conductive rubber, and electrodes 12a and 12b are formed at the two ends thereof which are positioned symmetrically. One electrode 12a is connected to a power line 13 and a predetermined voltage is applied thereto from a power source (Vcc). The resistance between the electrodes 12a and 12b changes in accordance with the magnitude of a pressure which acts on the pressure-sensitive device 12.

Figure 4:
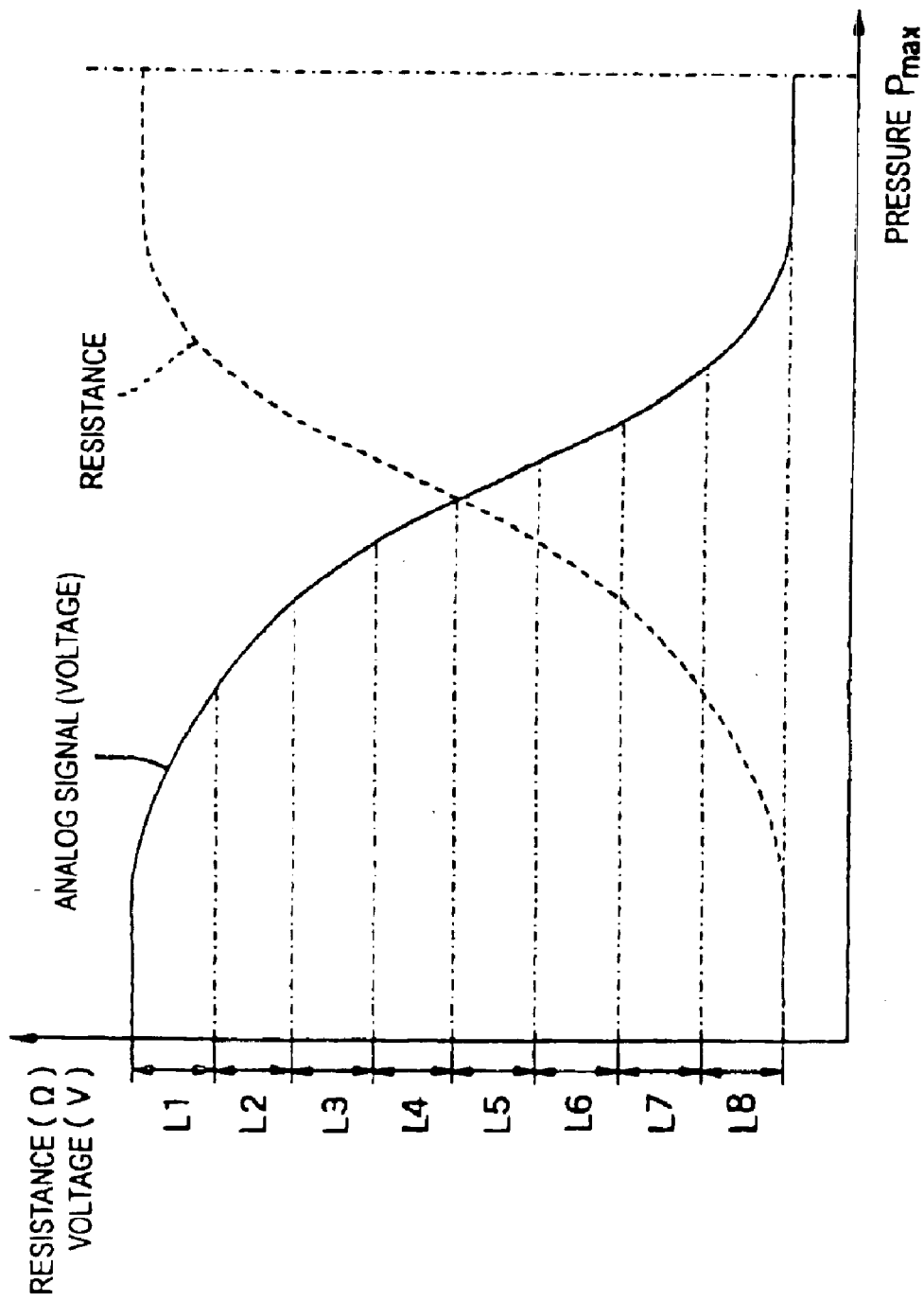
FIG. 4 is a diagram showing characteristics of a pressure-sensitive device shown in FIG. 3.

As one example, the pressure-sensitive device 12 made of pressure-sensitive conductive rubber exhibits the smallest resistance when no pressure acts, and the resistance increases as the applied pressure becomes larger, as shown by a dotted line in FIG. 4. Therefore, the largest analog signal (voltage) is outputted at the other electrode 12b when no pressure acts, and the analog signal (voltage) which is outputted decreases as the pressure increases (solid line in FIG. 4).

The pressure-sensitive device 12 is disposed in the path into which the controller 11 is pushed. As the user presses the controller 11, pressure is applied and the resistance of the pressure-sensitive device 12 changes. The analog signal corresponding to the pressure is outputted at the electrode 12b side.

A microprocessor unit 14 (abbreviated to MPU, hereinafter) for controlling the control apparatus 200 is mounted on an internal board of the control apparatus 200. The MPU 14 functions as a level segmenting unit (LS) 15 for segmenting the output level of the analog signal which is outputted by the pressure-sensitive device 12 into a plurality of levels, and an A/D converting unit 16 for converting the analog signal which is outputted from the pressure-sensitive device 12 into a digital signal in accordance with the output level which is segmented by the level segmenting unit 15. The electrode 12b of the pressure-sensitive device 12 is connected to an input side of the level segmenting unit 15.

The level segmenting unit 15 has a fundamental function for segmenting the range of a preset analog signal level (voltage) by a uniform width, as shown in FIG. 4. The number of segments can be set arbitrarily, and the example shown in FIG. 4 illustrates that the range of the analog signal level (voltage) is uniformly segmented into eight levels. Individual output levels L1 to L8 which are thus uniformly segmented are transmitted to the A/D converting unit 16. Incidentally, the range of the analog signal level which is uniformly segmented by the level segmenting unit 15 can be arbitrarily changed.

The A/D converting unit 16 converts the analog signal which is segmented into levels by the level segmenting unit 15 into a digital signal in accordance with the output level of the analog signal and outputs the digital signal. That is, digital signals having a plurality of bits are outputted by the A/D converting unit 16 in accordance with the output level L1 to L8.

Herein, a description will be given of a specific example of the level segmenting unit 15 and A/D converting unit 16. It is assumed that the control apparatus 200 is driven by a power supply voltage of 3.5 V, and the analog signal which is outputted by the pressure-sensitive device 12 changes from 0 to 2.4 V. It is also assumed that the level segmenting unit 15 uniformly segments the output level ranging from 0 to 2.4 V into eight levels. Then, one level has a level width of 0.3 V.

Therefore, the level segmenting unit 15 segments the output levels of 2.4 to 2.1 V, 2.1 to 1.8 V, 1.8 to 1.5 V, 1.5 to 1.2 V, 1.2 to 0.9 V, 0.9 to 0.6 V, 0.6 to 0.3 V, and 0.3 to 0 V of the analog signal which is outputted by the pressure-sensitive device 12 into level 1 (L1), level 2 (L2), level 3 (L3), level 4 (L4), level 5 (L5), level 6 (L6), level 7 (L7), and level 8 (L8), respectively.

The A/D converting unit 16 assigns proper digital signals having a plurality of bits to the output levels which are level-segmented as disclosed above and outputs the digital signals. For instance, the digital signals having a plurality of bits, e.g., 8 bits or 16 bits, are assigned to the output levels, and digital signals of "1f", "3f", . . . , "ff" (hexadecimal notation) are assigned to level 1, level 2, . . . , level 8, respectively, and are outputted.

The digital signal which has a plurality of bits and is outputted by the A/D converting unit 16 is transmitted to the game machine main body 100 via an interface 17 which is provided in the internal board of the control apparatus 200, so that the digital signal causes the game character to be moved, etc.

The change in level of the analog signal outputted by the pressure-sensitive device 12 corresponds to the change in pressure applied by the controller 11, as mentioned above. Accordingly, the digital signal which has a plurality of bits and is outputted by the converting unit 16 corresponds to the pressure on the controller 11 applied by the user. If the operations for the game character, etc. are controlled in response to the digital signal having a plurality of bits which is related to the user's pressing operation, it is possible to realize a smoother operation in an analog manner, as compared with the ON/OFF control operation in response to a single bit digital signal which is "1" or "0".

Figure 5:
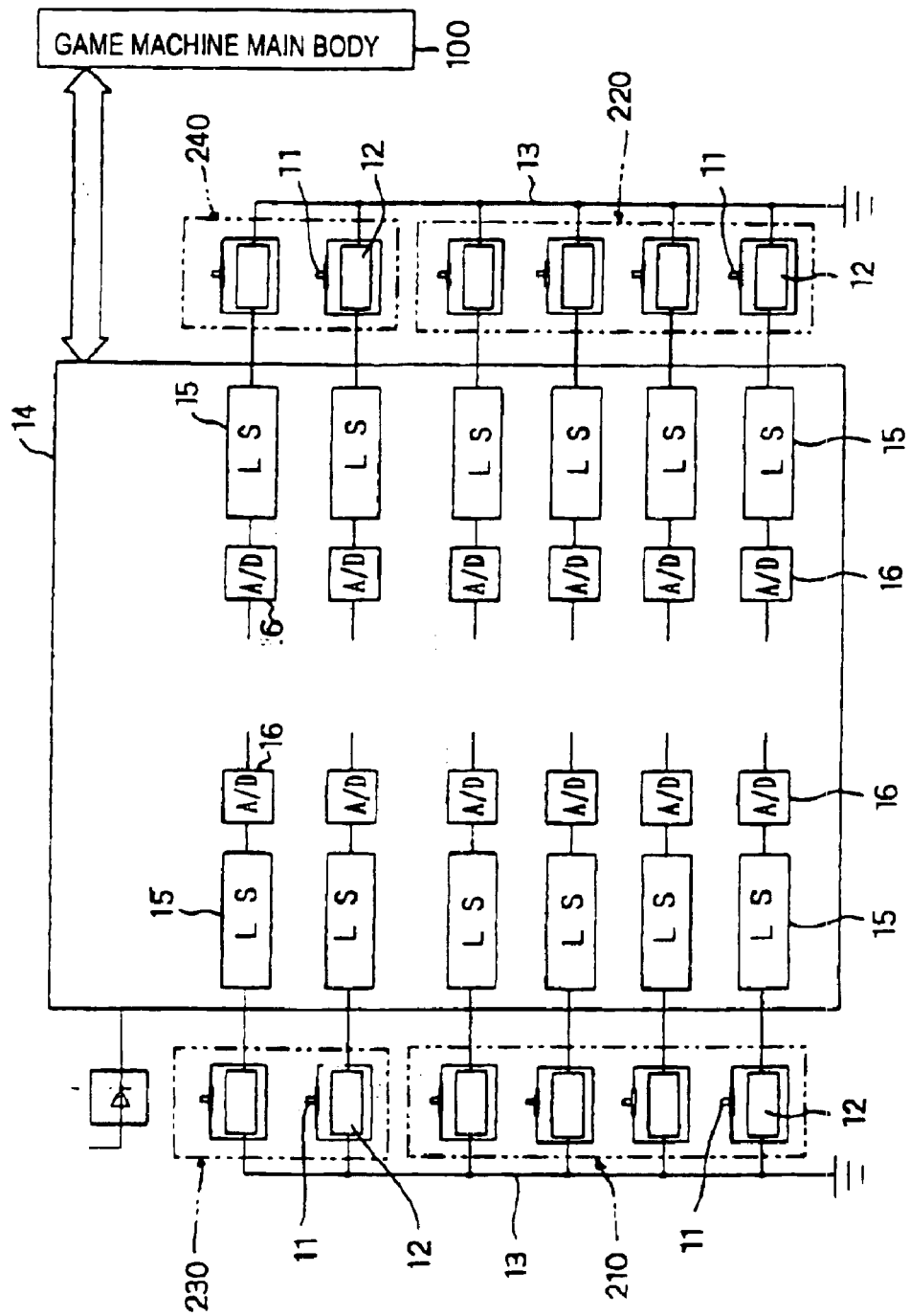
FIG. 5 is a block diagram showing an example of the entire configuration of the control apparatus according to the first embodiment of the present invention.

According to the present embodiment, as shown in FIG. 5, the first to fourth control units 210, 220, 230, and 240 have the configuration having controller 11 and pressure-sensitive device 12 shown in FIG. 3. Thus, it is possible to separately use digital operation and analog operation of the control units 210, 220, 230, and 240. Incidentally, only the control unit which is arbitrarily selected among the first to fourth control units 210, 220, 230, and 240 can also have the configuration shown in FIG. 3.

As explained above, the level segmenting unit 15 uniformly segments the output level of the analog signal which is outputted by the pressure-sensitive device 12 within the preset range. However, if the preset range deviates from the range of the analog signal level (voltage) which is actually outputted by the pressure-sensitive device 12, there is a danger that it is impossible to output a digital signal which matches with state of the controller 11.

Further, the pressure-sensitive devices 12 have individual difference and the power supply voltages also vary. This results in varying output ranges of the analog signals which are outputted by the pressure-sensitive devices 12 that are provided in the control units 210, 220, 230, and 240, depending on the individual control apparatuses 200.

According to the present embodiment, the control apparatus 200 comprises a calibration function (segmenting-range adjusting unit) for individually setting the range of output levels of the analog signal which is segmented by the level segmenting unit 15.

Figure 6:
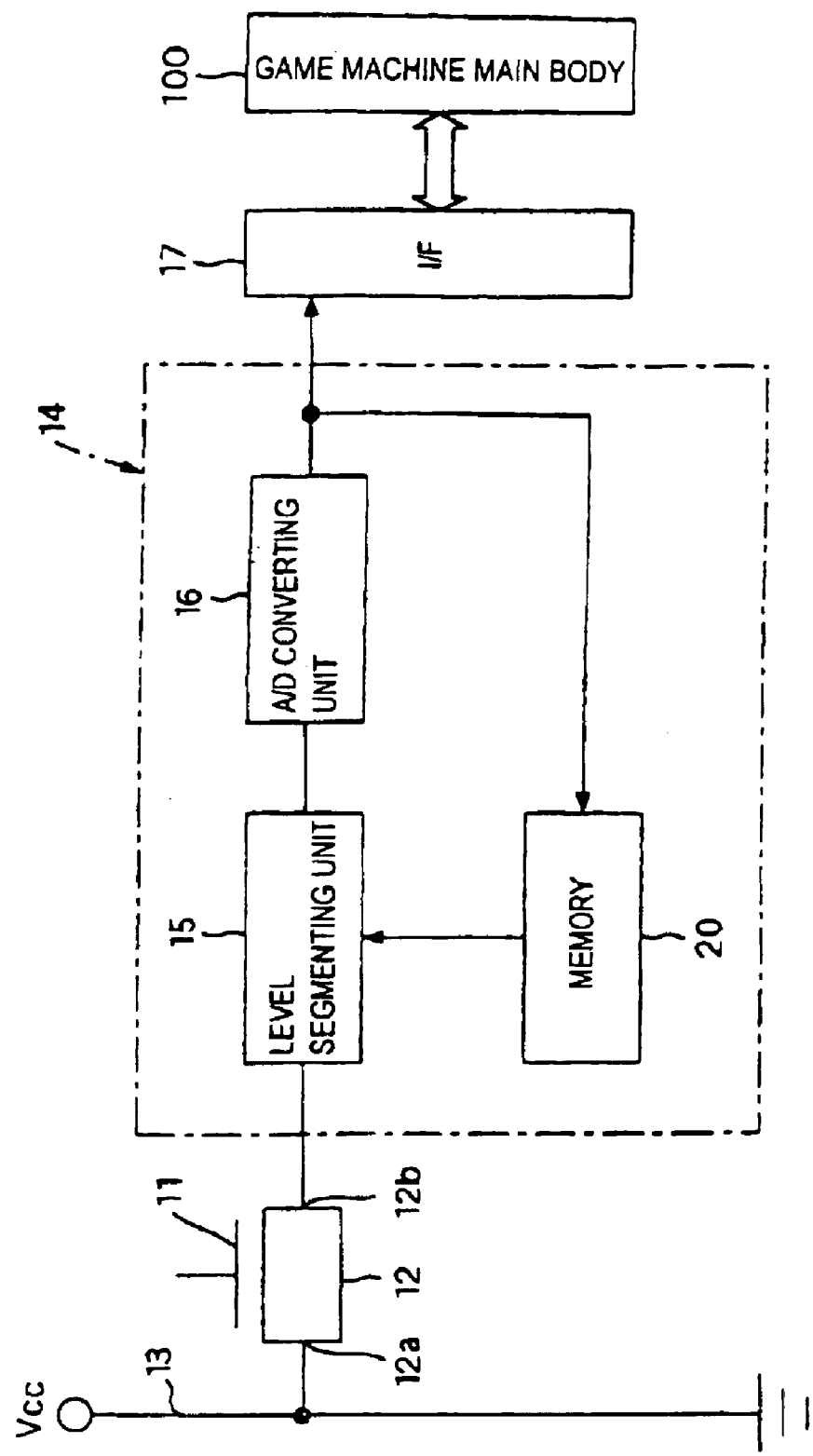
FIG. 6 is a block diagram showing a first structural example for calibration of a level segmenting unit.

FIG. 6 is a block diagram showing a first structural example for calibration of the level segmenting unit 15. According to the configuration shown in FIG. 6, the MPU 14 includes a memory 20 and the range of output levels of the analog signal which is segmented by the level segmenting unit 15 is stored in the memory 20.

As an example, in the production line of the control apparatus 200, a predetermined load is applied to the control apparatus 200 so that the resistance of the pressure-sensitive device 12 becomes a maximum. In this case, the output level of the analog signal which is outputted by the pressure-sensitive device 12 is stored in the memory 20.

Next, a description will be given based on the above-discussed specific example. Assuming that a default value of the level segmenting unit 15 is set so as to uniformly segment the voltage level ranging 0 to 2.4 V into eight levels and an analog signal of 2.0 V is outputted by the pressure-sensitive device 12 when the predetermined load acts, the A/D converting unit 16 outputs the digital signal "3f" which corresponds to level 2, as explained above. The digital signal "3f" is stored in the memory 20, and the level segmenting unit 15 adjusts the output range of the analog signal which is level-segmented on the basis of the set value.

Incidentally, the digital signal "3f" corresponds to the output level of the analog signal of 2.1 V to 1.8 V. Preferably the voltage value within the range is specified in advance. For instance, it is specified in advance that a maximum voltage value (2.1 V in the foregoing example) of the output levels is the upper limit of the range of output levels of the analog signal which is segmented into the levels.

Figure 7:
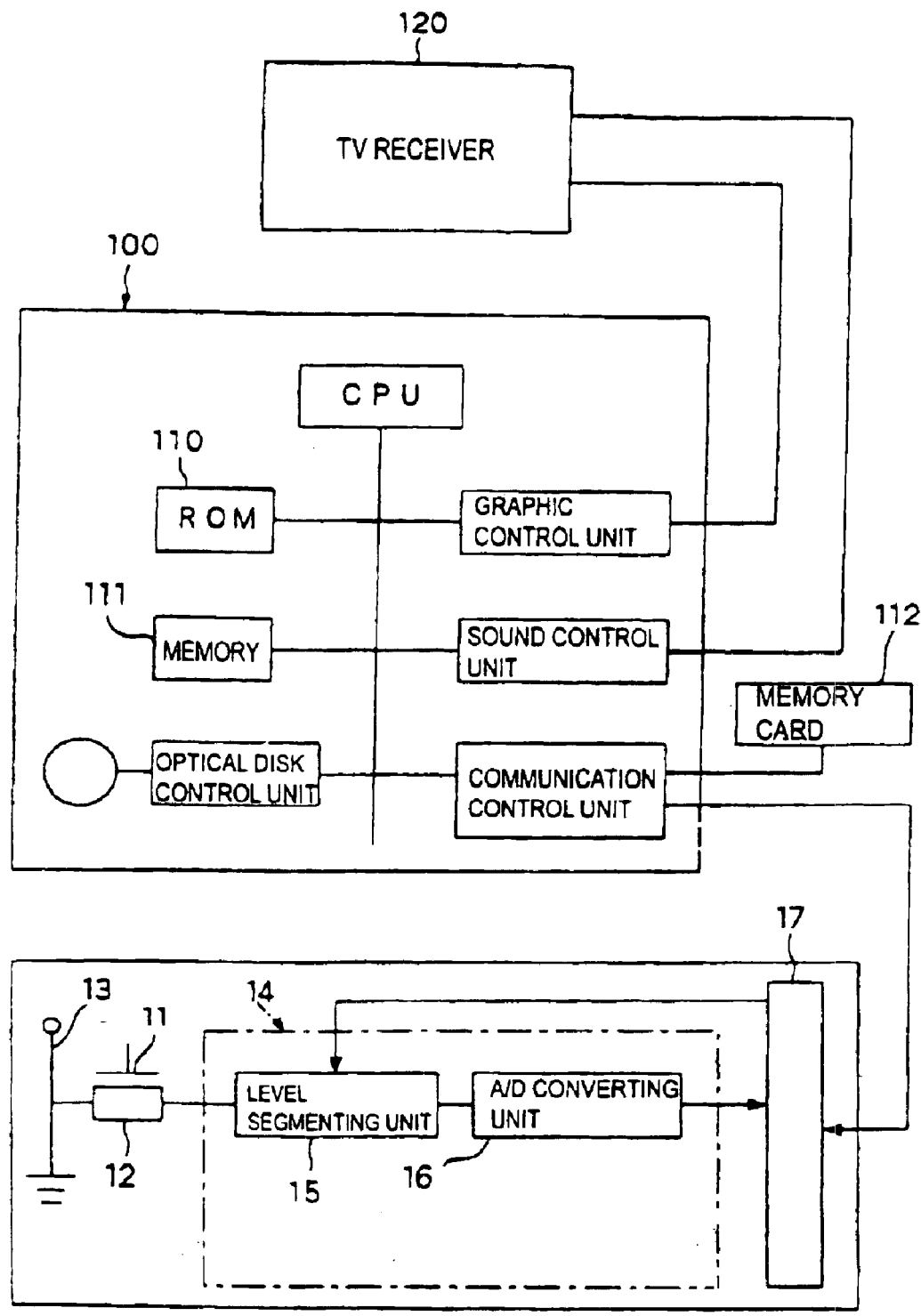
FIG. 7 is a block diagram showing a second structural example for calibration of the level segmenting unit.

FIG. 7 is a block diagram showing a second structural example for calibration of the level segmenting unit. According to the configuration shown in FIG. 7, a memory is not provided in the control apparatus 200 and, in place thereof, the range of output levels of the analog signal which is segmented by the level segmenting unit 15 is stored in a built-in memory 111 of the game machine main body 100 to which the control apparatus 200 is connected or into a memory card 112 which is detachable.

When the calibration of the level segmenting unit 15 is executed by using the configuration, preferably, a setting program for executing the calibration operation is built in a control program which is stored in a ROM 110 in the game machine main body 100.

Figure 8:
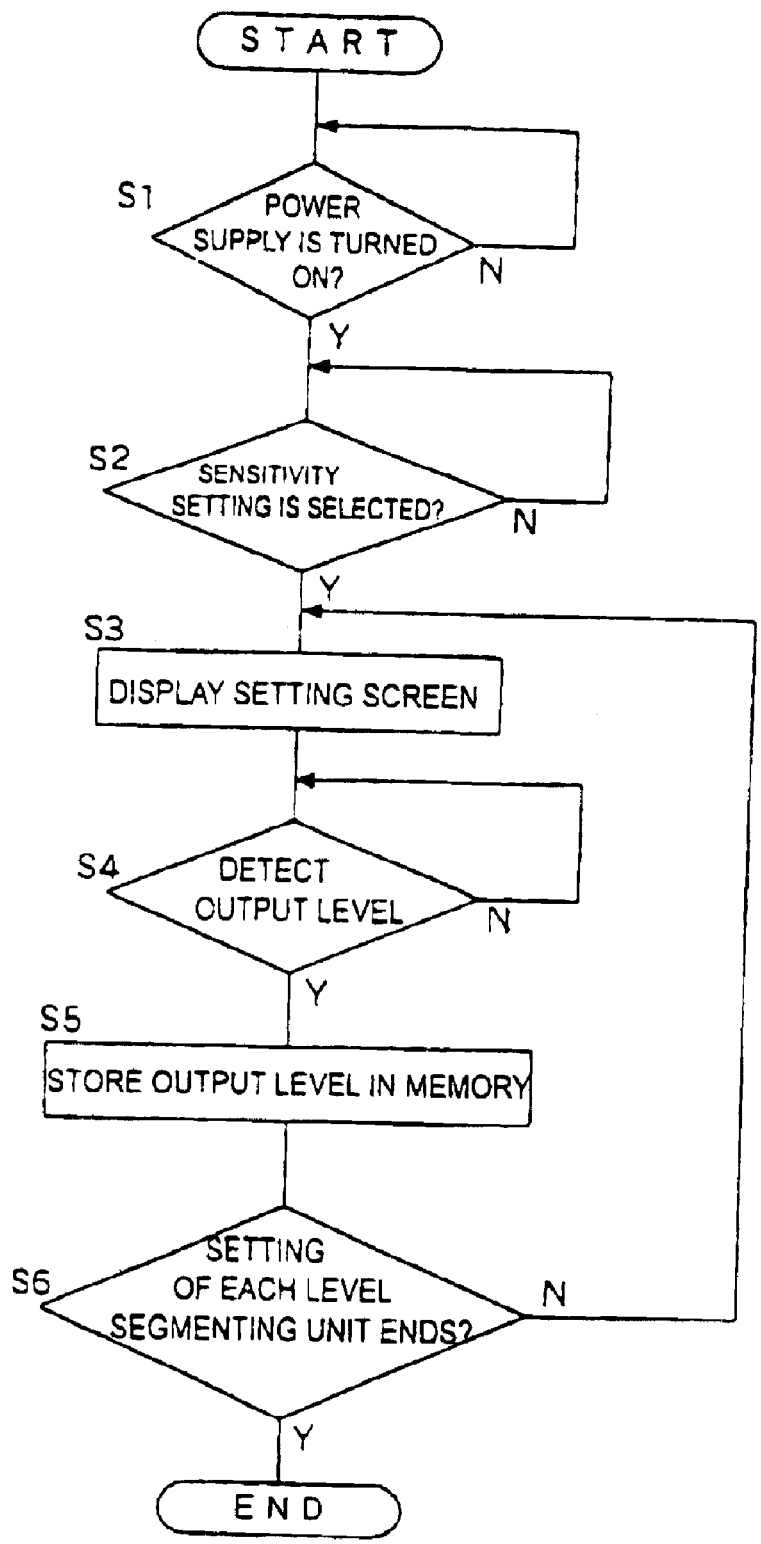
FIG. 8 is a flowchart showing one example of a setting program for calibration which is applied to the second structural example shown in FIG. 7.

FIG. 8 is a flowchart showing one example of the setting program.

First of all, a power supply of the game machine main body 100 is turned on (step S1). The sensitivity setting (calibration) of the control unit is selected by the menu selection by the user (step S2). Then, a setting screen is displayed on the television receiver 120 (step S3). For example, a message for prompting the user to strongly press the controller 11 which is provided in the predetermined control unit is displayed on the setting screen. When the user presses the controller 11 strongly according to the representation, the output level of the analog signal from the pressure-sensitive device 12 which is detected in this case is outputted to the game machine main body 100 (step S4). The output level is stored in the built-in memory 111 (step S5). The above-mentioned steps are repeated for each level segmenting unit 15 in the control apparatus 200 (step S6), and the sensitivity setting of the control unit ends.

The level segmenting unit 15 provided in the control apparatus 200 adjusts the range of output levels of the segmented analog-signal on the basis of the set value which is stored in the built-in memory 111 in the game machine main body 100.

It is also possible to provide the setting program for executing the calibration operation in the game program which is recorded in the optical disk.

Figure 9:
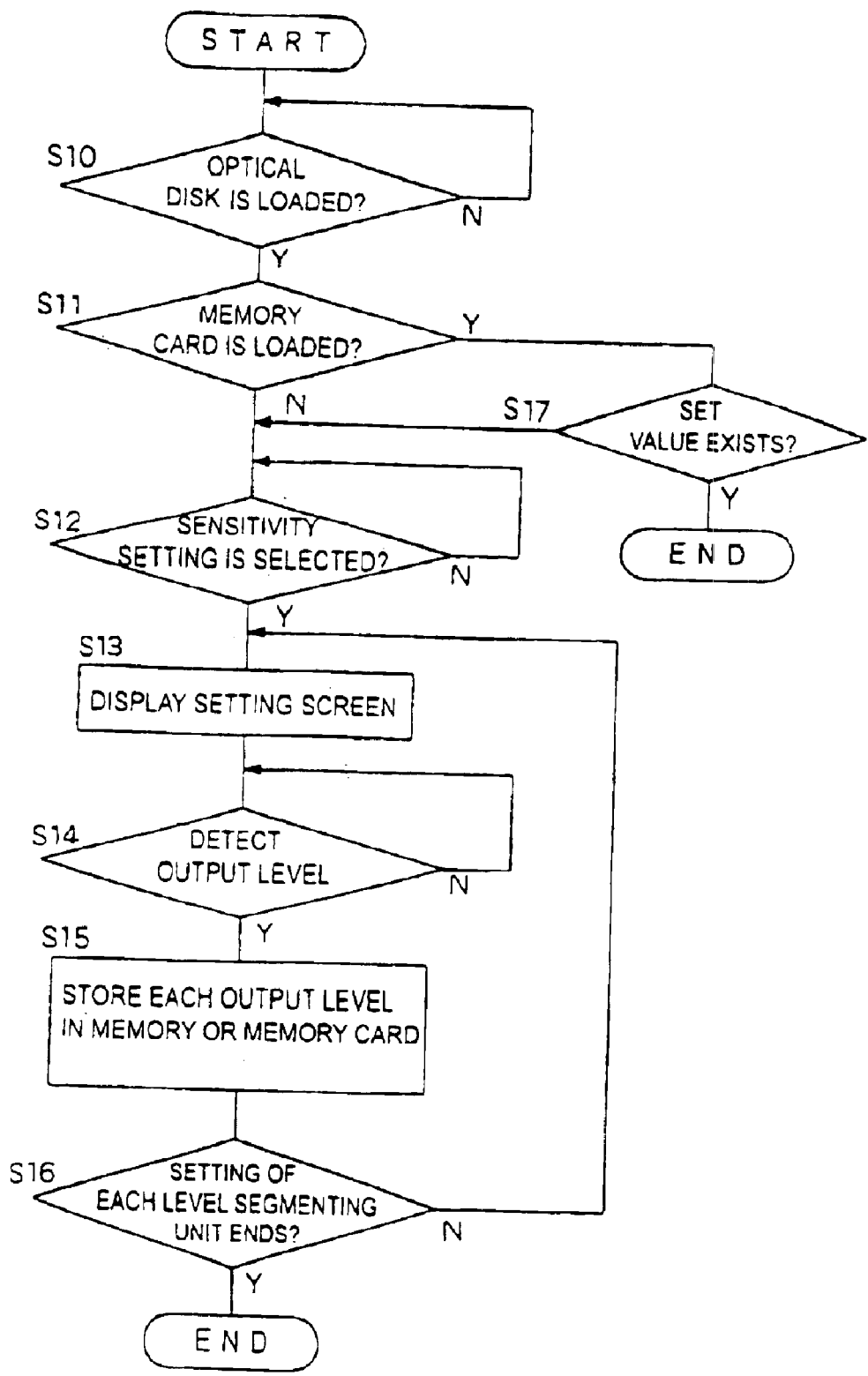
FIG. 9 is a flowchart showing another example of the setting program for calibration which is applied to the second structural example shown in FIG. 7.

FIG. 9 is a flowchart showing another example of the setting program.

To start with, the optical disk is loaded in the game machine main body 100 (step S10). Thereafter, it is checked to see if the memory card 112 is loaded in the game machine main body 100 (step S11). If the memory card 112 is not loaded, the user's menu-selection causes the selection of the sensitivity setting (calibration) of the control unit (step S12), and the setting screen is displayed on the television receiver 120 (step S13). For instance, a message for prompting to the user to strongly press the controller 11 which is provided in the predetermined control unit is displayed on the setting screen. When the user strongly presses the controller 11 according to the representation, the output level of the analog signal from the pressure-sensitive device 12 which is detected in this case is outputted to the game machine main body 100 (step S14). The output level is stored in the built-in memory 111 (step S15). The above-mentioned steps are repeated for each level segmenting unit 15 in the control apparatus 200 (step S16), and the sensitivity setting of the control unit ends.

If it is detected in step S11 that the memory card 112 is loaded, it is checked to determine if a set value regarding a calibration has already been stored in the memory card 112 (step S17). If the result is YES in step S17, the sensitivity setting of the control unit ends. In this case, the level segmenting unit 15 provided in the control apparatus 200 adjusts, on the basis of the set value which is stored in the memory card 112, the range of output levels of the analog signal which is to be segmented.

If there is no set value regarding the calibration stored in the memory card 112, the processing sequence proceeds to step S12, and the above-mentioned calibration operation is performed. Then, the output level of the analog signal from the pressure-sensitive device 12 which is detected in step S15 is stored in the memory card 112 (step S16).

The level segmenting unit 15 provided in the control apparatus 200 adjusts, on the basis of the set value which is stored in the built-in memory 111 in the game machine main body 100 or memory card 112 therein, the range of output levels of the analog signal which is to be segmented.

Figure 10:
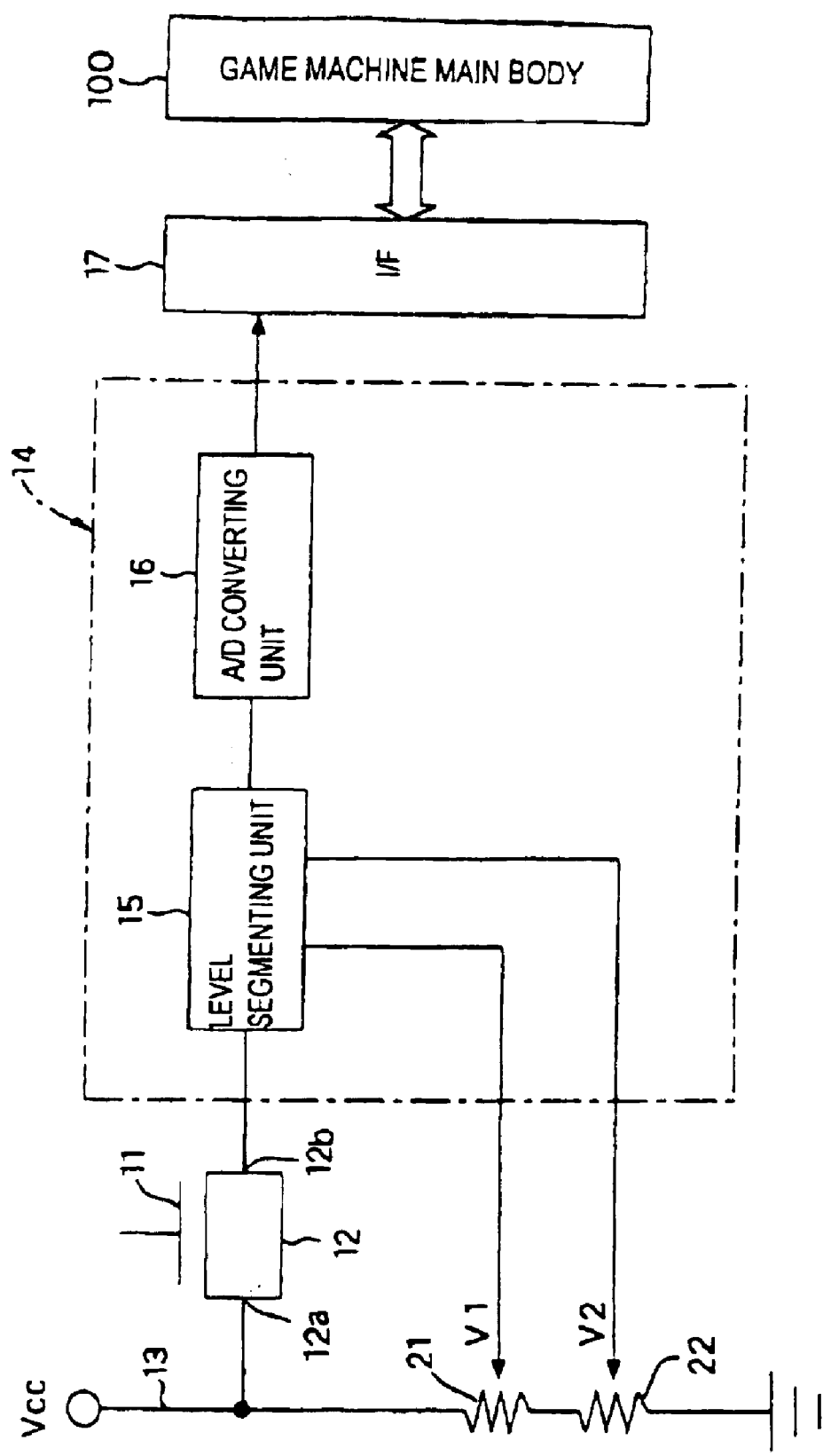
FIG. 10 is a block diagram showing a third structural example for calibration of the level segmenting unit.

FIG. 10 is a block diagram showing a third structural example for calibration of the level segmenting unit 15. According to the configuration shown in FIG. 10, two volume devices 21 and 22 (serving as electric-potential setting devices) are serially connected to the power line 13 to which the pressure-sensitive device 12 of the control apparatus 200 is connected. The volume devices 21 and 22 enable an intermediate voltage of the power line 13 to be adjusted.

Figure 11:
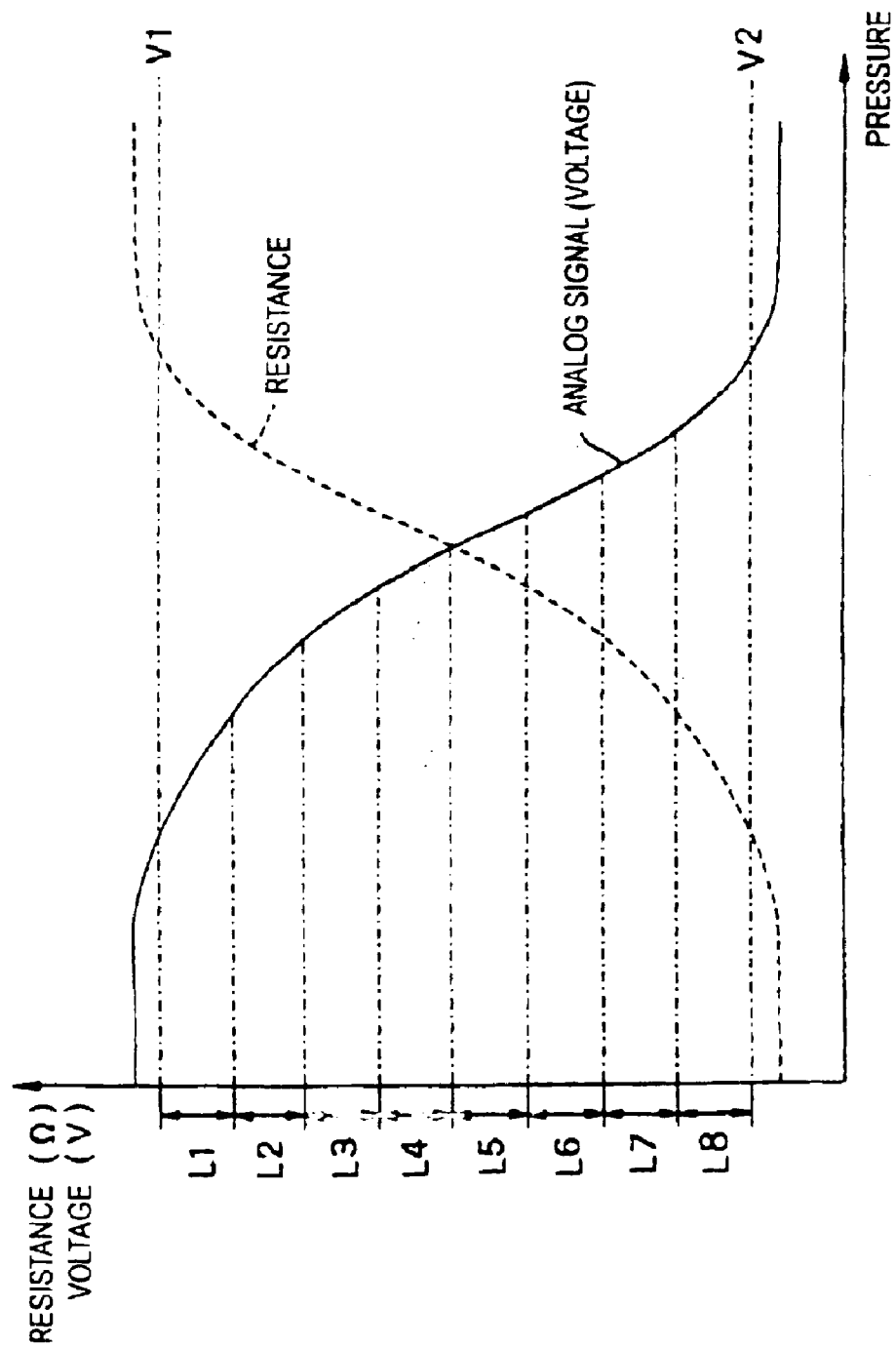
FIG. 11 is a diagram for explaining the calibration operation of the third structural example shown in FIG. 10.

The level segmenting unit 15 sets the range of output levels of the segmented analog-signal on the basis of intermediate voltages V1 and V2 of the power line 13 which are adjusted by the volume devices 21 and 22, as shown in FIG. 11. In other words, the level segmenting unit 15 sets the intermediate voltage V1, which is detected by one volume device 21 on the side near the power source Vcc to the maximum value in the range of output levels of the segmented analog-signal, sets the intermediate voltage V2, which is detected by the other volume device 22, to the minimum value in the range of output levels of the segmented analog-signal, and uniformly segments the output level of the analog signal which is outputted by the pressure-sensitive device 12 within the range of the intermediate voltage V1 to V2. The volume devices 21 and 22 may be adjusted, for instance, upon shipment of the control apparatus 200.

If monitoring functions for the intermediate voltages V1 and V2 are added to the level segmenting unit 15 and the secular change, etc. fluctuate the intermediate voltages V1 and V2, the range of output levels of the segmented analog-signal may be adjusted on the basis of the intermediate voltages V1 and V2 after the fluctuation. If the thus-constructed auto-calibration function is added, it is possible to always maintain the proper setting when the intermediate voltages V1 and V2 fluctuate in accordance with the secular change of the pressure-sensitive device 12 and volume device and variations in the power supply voltage, because the range of output levels of the segmented analog-signal is adjusted on the basis of the intermediate voltages V1 and V2 after fluctuation.

However, if the level segmenting unit 15 always executes the auto-calibration, there is a danger that the output to the game machine main body 100 is delayed. In this case, only when the power supply of the control apparatus 200 is turned on, the level segmenting unit 15 may adjust, by checking the intermediate voltages V1 and V2 of the power line 13, the range of output levels of the analog signal to be segmented.

Figure 12:
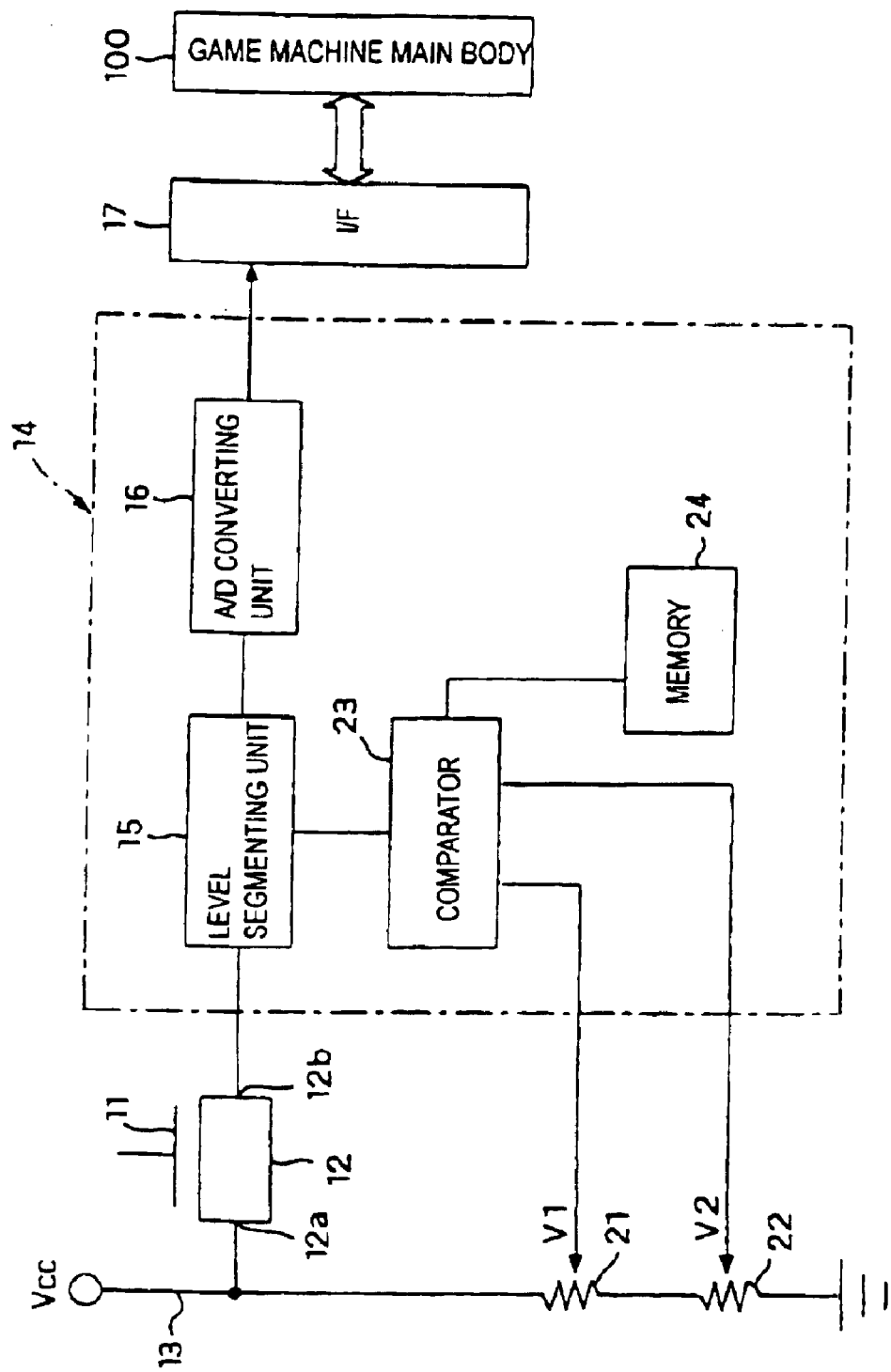
FIG. 12 is a block diagram showing a fourth structural example for calibration of the level segmenting unit.

FIG. 12 is a block diagram showing a fourth structural example for calibration of the level segmenting unit. According to the constitution shown in FIG. 12, the two volume devices 21 and 22 are inserted in series in the power line 13 to which the pressure-sensitive device 12 in the control apparatus 200 is connected and, further, the MPU 14 includes a comparator 23 and a memory 24.

The limit value of the range of output levels of the analog signal which is segmented by the level segmenting unit 15 is stored in the memory 24 in advance. For example, an allowable voltage of the MPU 14 is stored in the memory 24 as a limit value. The comparator 23 always monitors the intermediate voltages V1 and V2 which are detected by the volume devices 21 and 22, and has a function for comparing the limit value which is stored in the memory 24 with the intermediate voltages V1 and V2 (especially, V1) and forcedly sending the limit value to the level segmenting unit 15 when the intermediate voltage is over the limit value. If the limit value is sent from the comparator 23, the range of output levels of the analog signal which is segmented on the basis of the limit value is adjusted.

According to the above-described constitution, if an analog signal of an excessive output level, which is above the processing capacity of the MPU 14, is outputted by the pressure-sensitive device 12, the normal operation of the MPU 14 can be compensated.

Next, a detailed description is given of a structural example of the control unit which is provided in the control apparatus 200 according to the first embodiment of the present invention.

Figure 13:
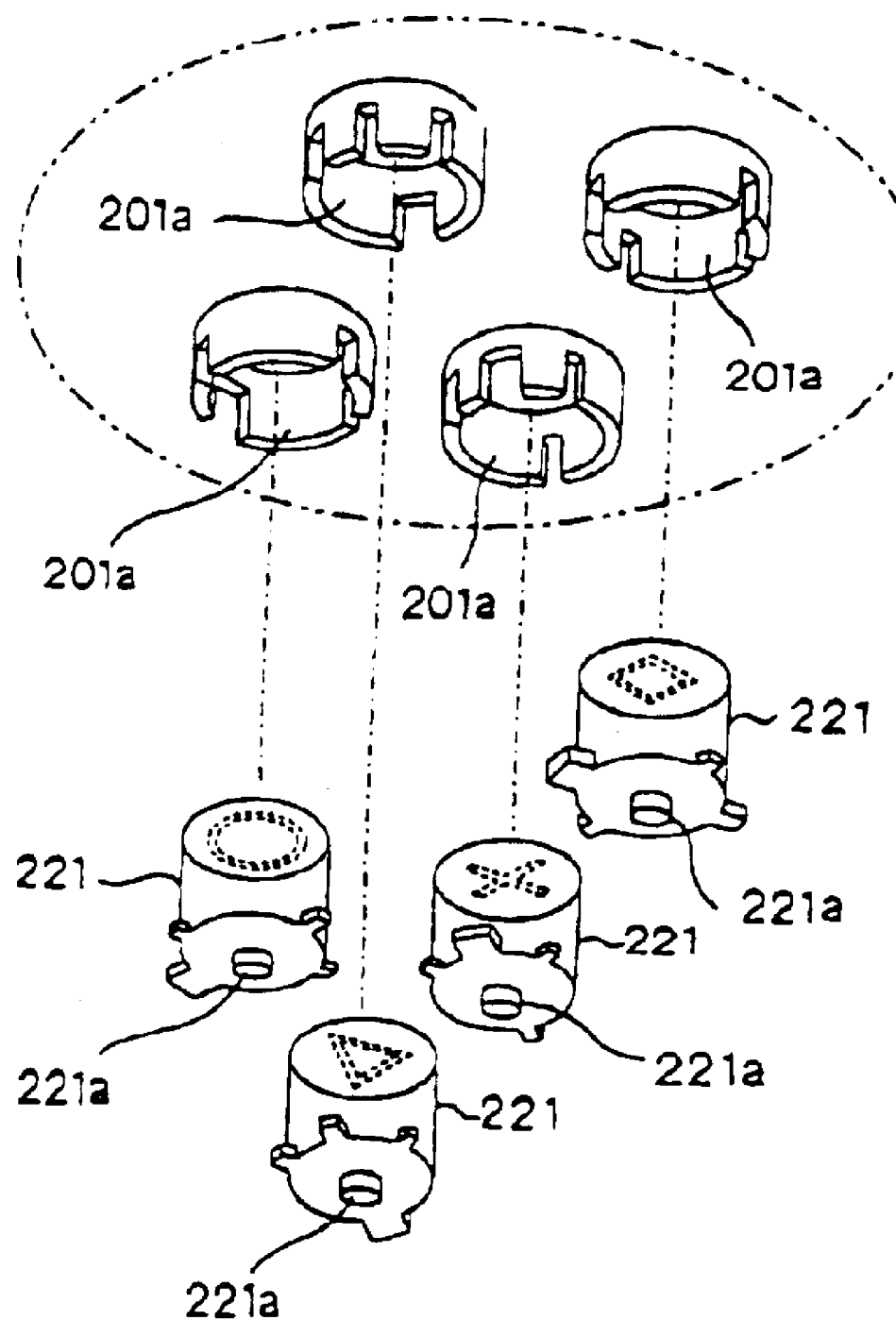
FIG. 13 is an exploded perspective view showing control buttons (controller) which are provided to a second control unit according to the first embodiment.
Figure 14:
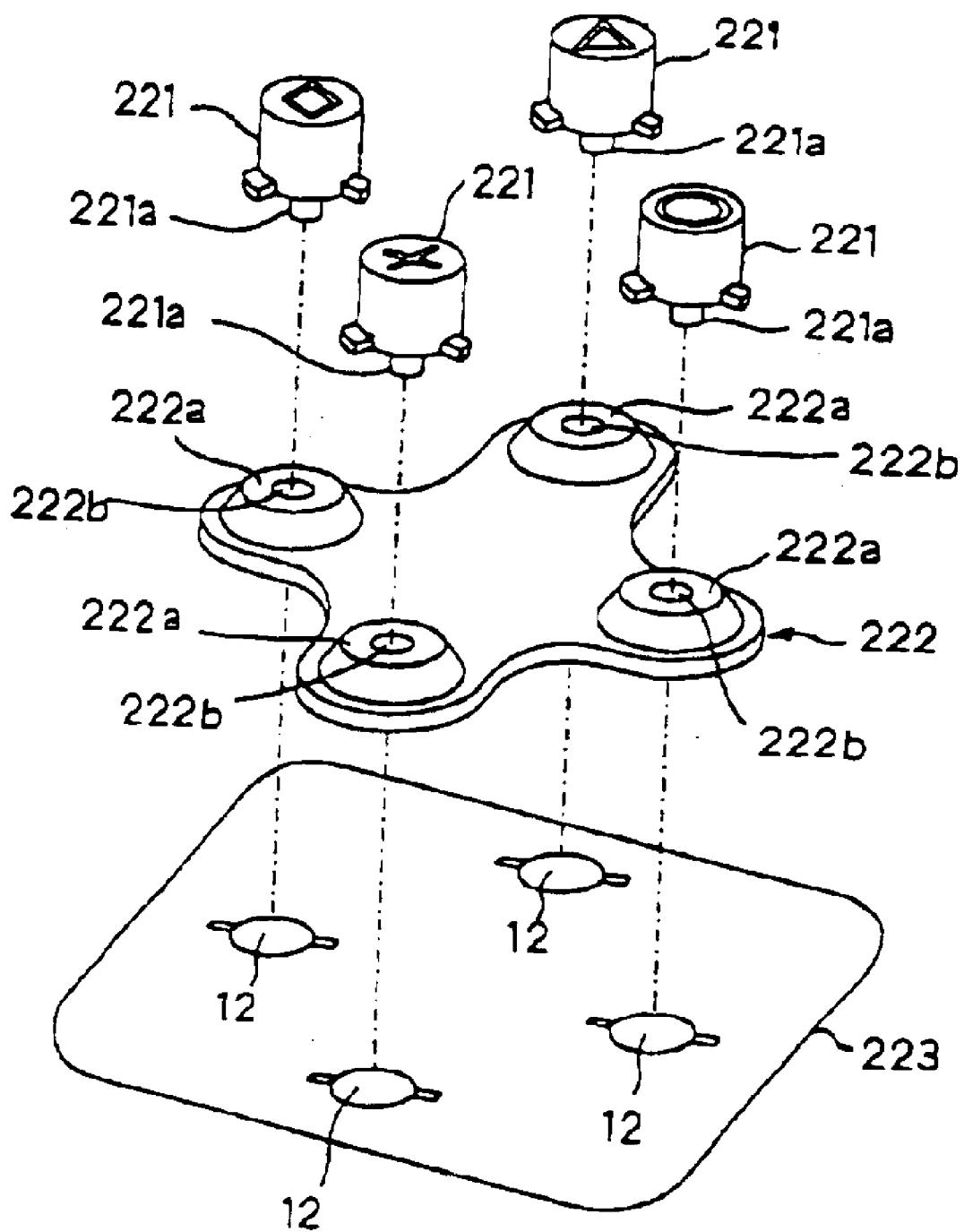
FIG. 14 is an exploded perspective view showing a first structural example of the second control unit according to the first embodiment.
Figure 15:
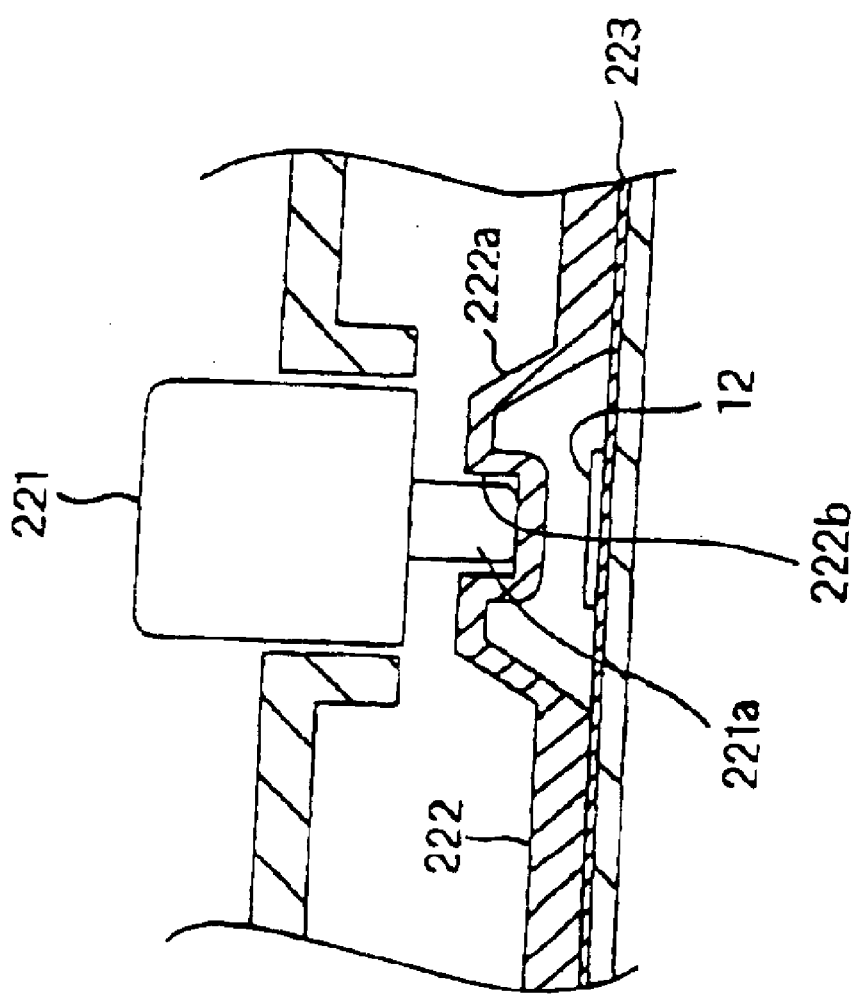
FIG. 15 is a front sectional view showing the first structural example of the second control unit according to the first embodiment.

FIG. 13 to FIG. 15 are diagrams showing a first structural example of the second control unit.

The second control unit 220 comprises the four control buttons 221 constructing the controller 11, an elastic body 222, and a sheet member 223 on which the pressure-sensitive devices 12 are provided, as shown in FIG. 14. As shown in FIG. 13, the control buttons 221 are mounted, from the back side thereof, to mounting holes 201a which are formed in the upper surface of the device main body 201. The control buttons 221 mounted in the mounting holes 201a are movable in the axial direction.

The elastic body 222 is made of insulative rubber, etc., has elastic portions 222a which are projected upward, and supports the lower ends of the control buttons 221 at the upper surfaces of the elastic portions 222a. If the control buttons 222 are depressed, sloping portions of the elastic portions 222a are bent and the upper surfaces of the elastic portions 222a move together with the control buttons 221. If the pressures to the control button 221 are removed, the sloping portions of the elastic portions 222a which are bent are elastically restored and the control buttons 221 are pushed up. That is, the elastic body 222 functions as biasing means for restoring the control buttons 221, which are depressed by the pressing operation, to the original positions.

The sheet member 223 is made of a thin-sheet material such as a flexible and insulative membrane. The pressure-sensitive devices 12 are provided at proper portions of the sheet member 223. As shown in FIG. 15, the pressure-sensitive devices 12 are arranged so as to face the control buttons 221 via the elastic body 222.

According to the present structural example, a projection 221a is formed at the bottom of the control buttons 221 serving as the controller 11, and a concave portion 222b for supporting the projection 221a is formed in the elastic portion 222a of the elastic body 222. If the control button 221 is pressed, the projection 221a presses the pressure-sensitive device 12 via the concave portion 222b of the elastic portion 222a.

As mentioned above, the resistance of the pressure-sensitive device 12 changes in accordance with the pressure which is applied from the control button 221. The projection 221a is provided at the bottom of the control button 221 and the projection 221a presses the pressure-sensitive devices 12 so that the pressure can be transmitted to the pressure-sensitive devices 12 with high sensitivity.

However, as a result of pressing the pressure-sensitive device 12 by the projection 221a, the pressure which acts on the pressure-sensitive device 12 and the concave portion 222b of the elastic body 222 becomes excessively large and there is a danger in the durability of the pressure-sensitive device 12 and the elastic body 222 decreasing.

Figure 16:
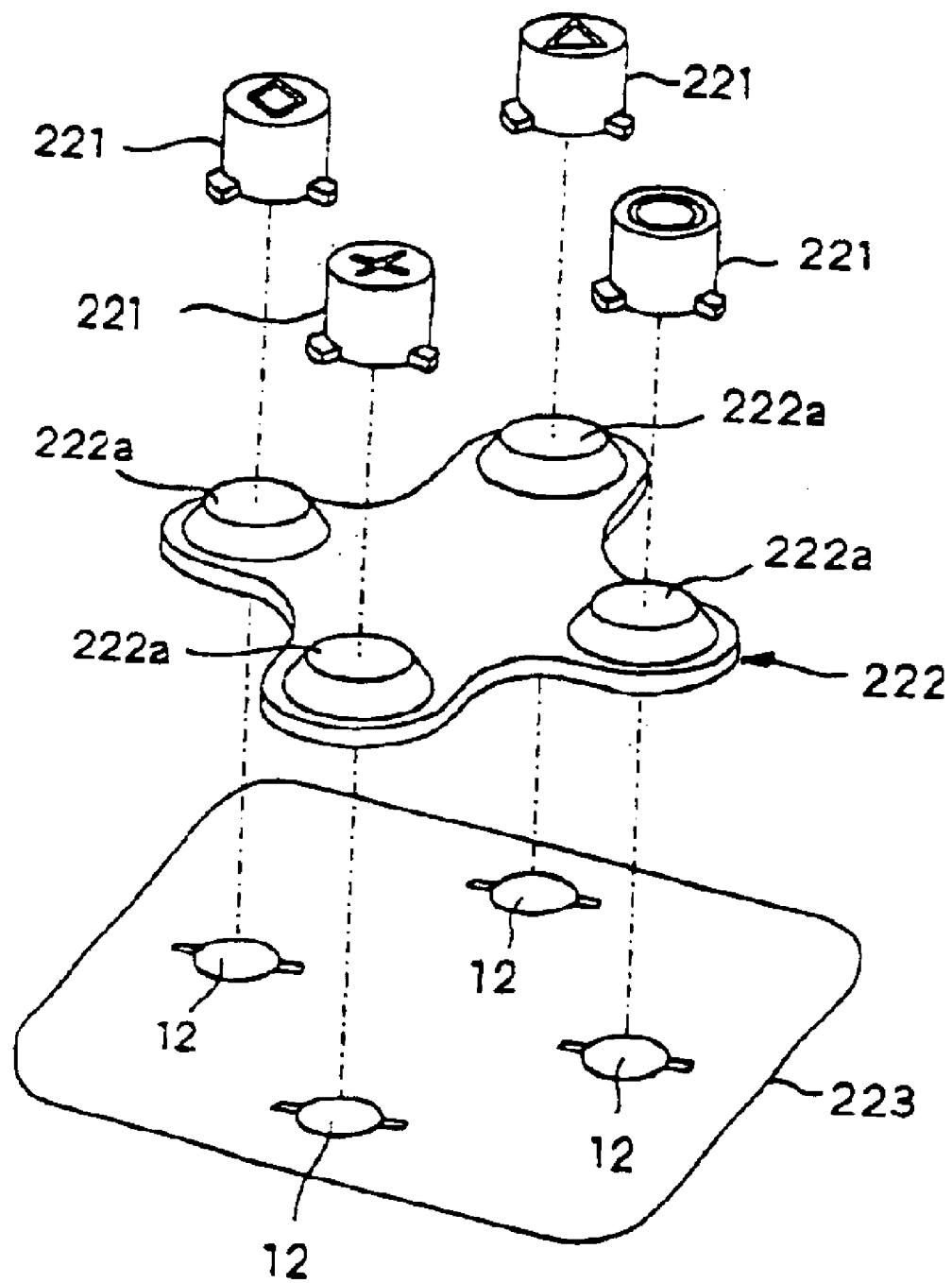
FIG. 16 is an exploded perspective view showing a second structural example of the second control unit according to the first embodiment.
Figure 17:
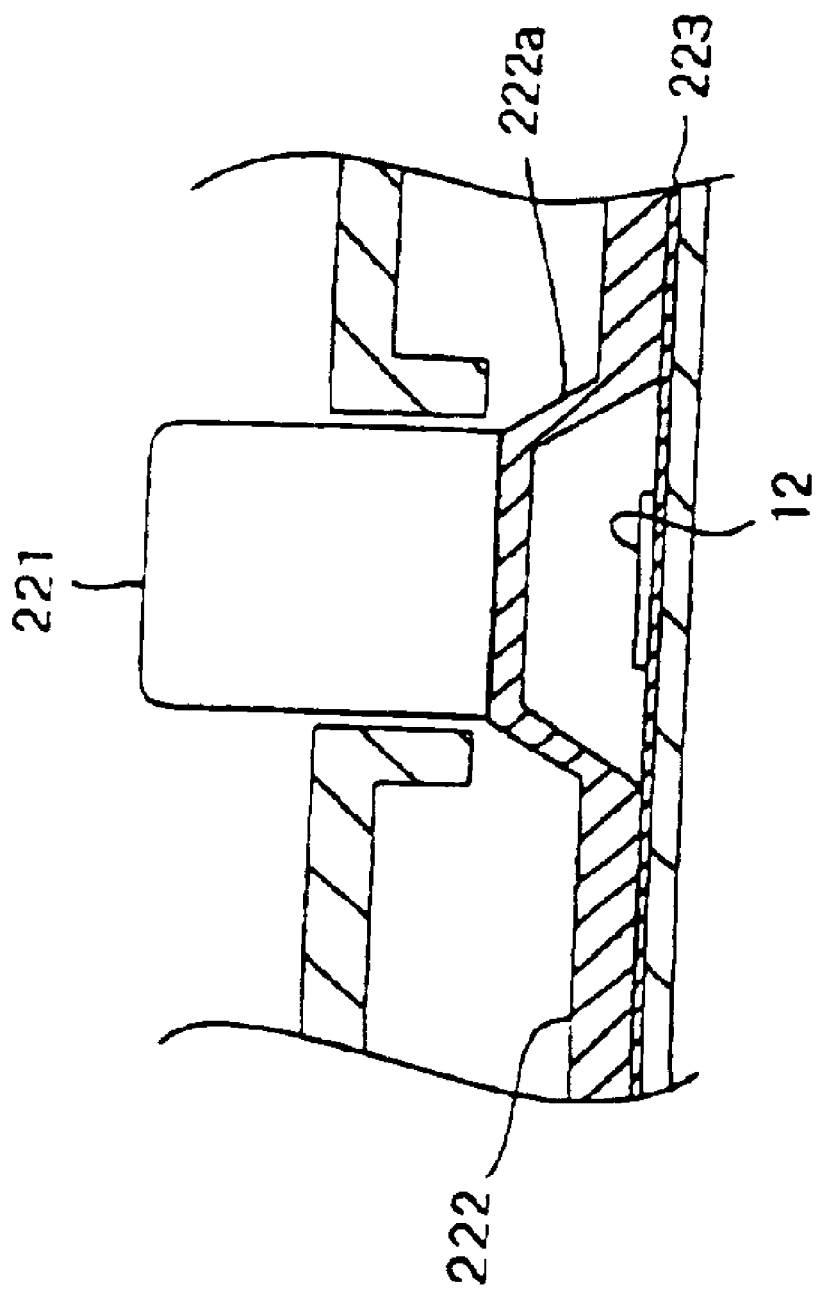
FIG. 17 is a front sectional view showing the second structural example of the second control unit according to the first embodiment.

Next, according to a second structural example shown in FIG. 16 and FIG. 17, the bottom of the control button 221 serving as the controller 11 is flat and the whole of the flat bottom presses the pressure-sensitive device 12. The elastic portion 222a of the elastic body 222 has no concave portion formed therein, and it supports the bottom of the control button 221 by the flat surface thereof. If thus construction is used, although the sensitivity with which the pressure from the control buttons 221 is transmitted to the pressure-sensitive device 12 is decreased, the advantage of improved durability of the pressure-sensitive devices 12 and the elastic body 222 is obtained.

Figure 18:
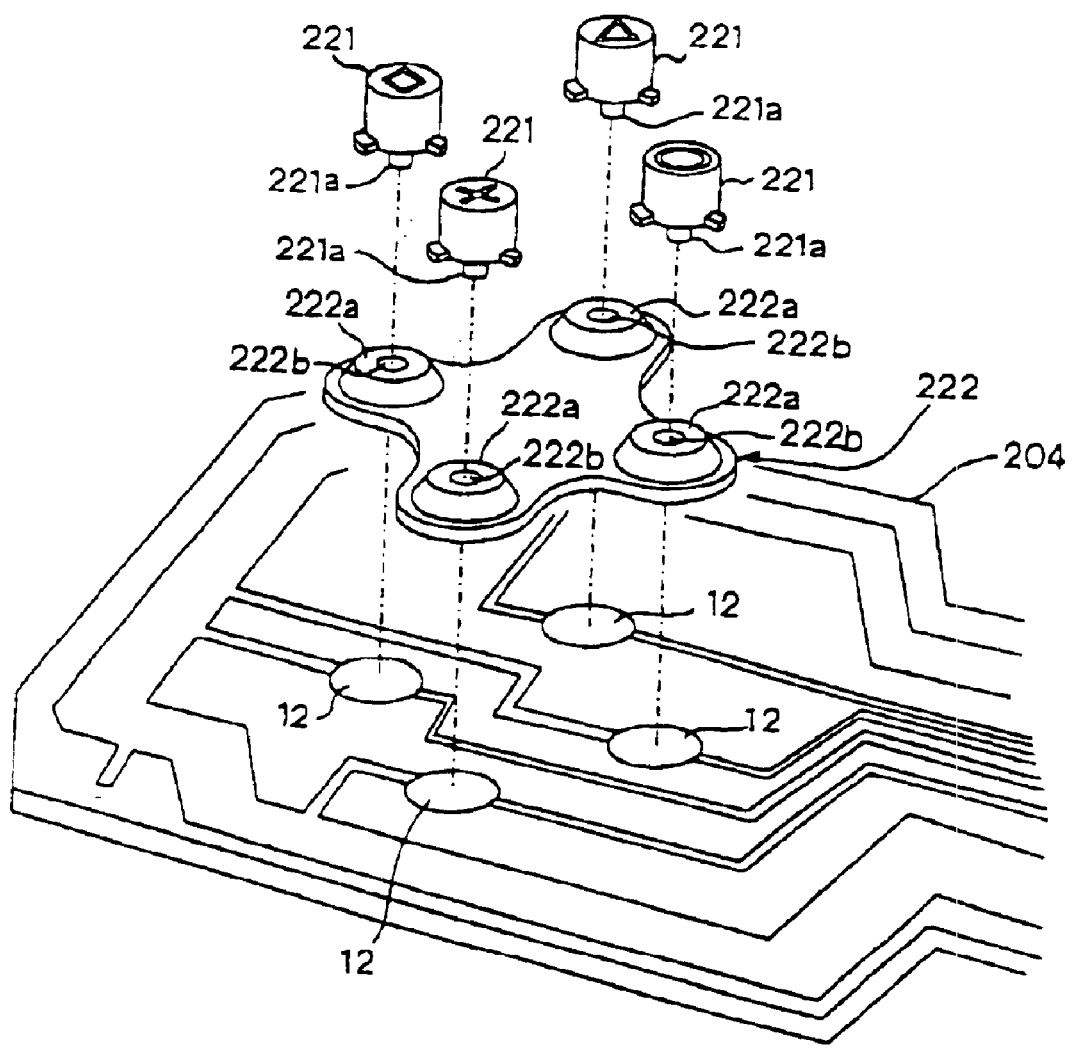
FIG. 18 is an exploded perspective view showing a third structural example of the second control unit according to the first embodiment.
Figure 19:
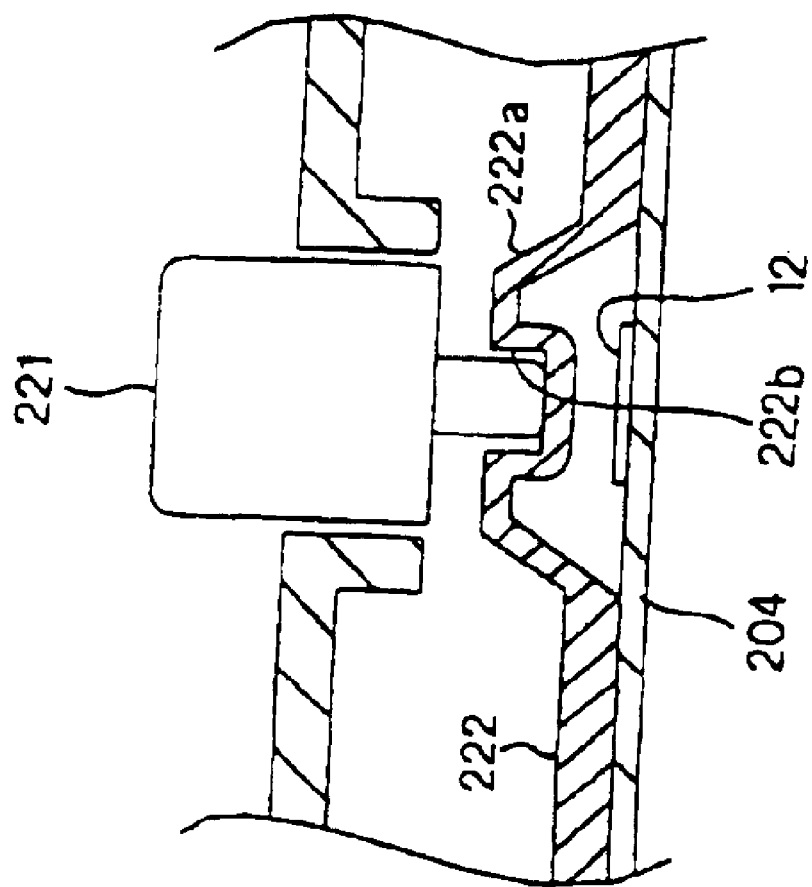
FIG. 19 is a front sectional view showing the third structural example of the second control unit according to the first embodiment.

FIG. 18 and FIG. 19 are diagrams showing a third structural example of the second control unit.

According to the third structural example shown in the figures, the pressure-sensitive devices 12 are directly provided at proper portions on an internal board 204 which is built in the control apparatus 200. By providing the pressure-sensitive devices 12 on the internal board 204, the sheet member can be omitted and the number of parts can be reduced. Incidentally, of course, the pressure-sensitive devices 12 are provided at portions to which the pressure from the control buttons 221 is transmitted.

Figure 21:
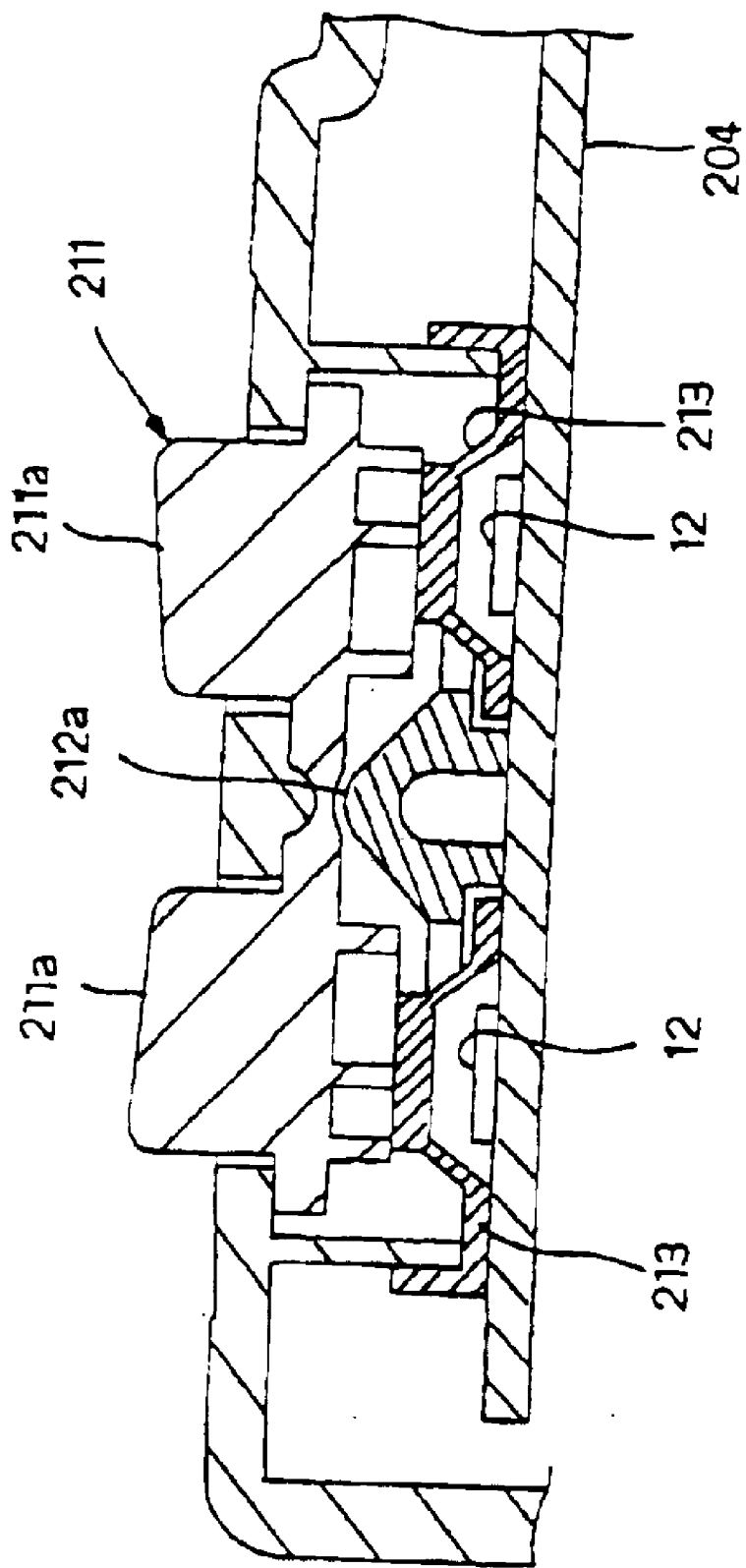
FIG. 21 is a front sectional view showing the first structural example of the second control unit according to the first embodiment.

FIG. 20 and FIG. 21 are diagrams showing a structural example of the first control unit.

As shown in FIG. 20, the first control unit 210 comprises the cross-shaped control body 211, a spacer 212 for positioning the control body 211, and an elastic body 213 for elastically supporting the control body 211 and, further, as shown in FIG. 21, has a configuration in which the pressure-sensitive devices 12 are arranged at positions which face the control keys 211a (controller 11) of the control body 211 via the elastic body 213.

The overall/general structure of the first control unit 210 is well known from Japanese Unexamined Patent Application Publication No. 8-163672, etc., and thus a detailed description is omitted. However, the control body 211 is assembled so as to enable the control keys 211a (the controller) to be pressed to the sides of the pressure-sensitive devices 12 (FIG. 21) while a convex portion 212a having hemispheric shapes which is formed at the center of the spacer 212 is set at the fulcrum.

If the control key 211a serving as the controller 11 is pressed, the pressure acts on the pressure-sensitive device 12 via the elastic body 213 and the resistance of the pressure-sensitive device 12 changes in accordance with the magnitude of the pressure. The structural example shown in FIG. 21 illustrates that the pressure-sensitive devices 12 are directly provided at proper portions on the internal board 204 which is built in the control apparatus 200. However, similarly to the structural example of the second control unit 220 shown in FIGS. 14 and 15, the pressure-sensitive devices 12 can be provided on the sheet member 23.

Figure 22:
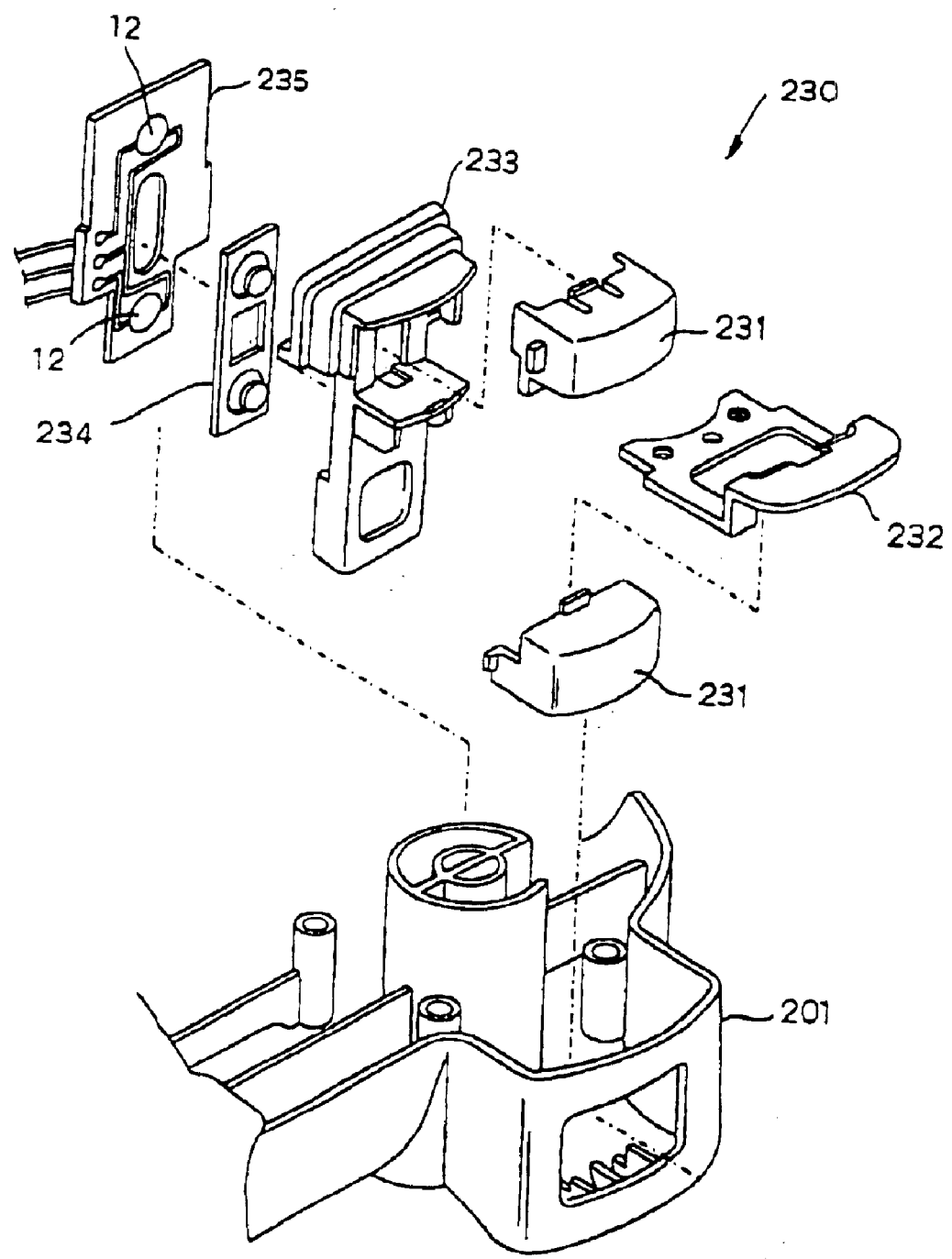
FIG. 22 is an exploded perspective view showing a structural example of a third control unit according to the first embodiment.
Figure 23:
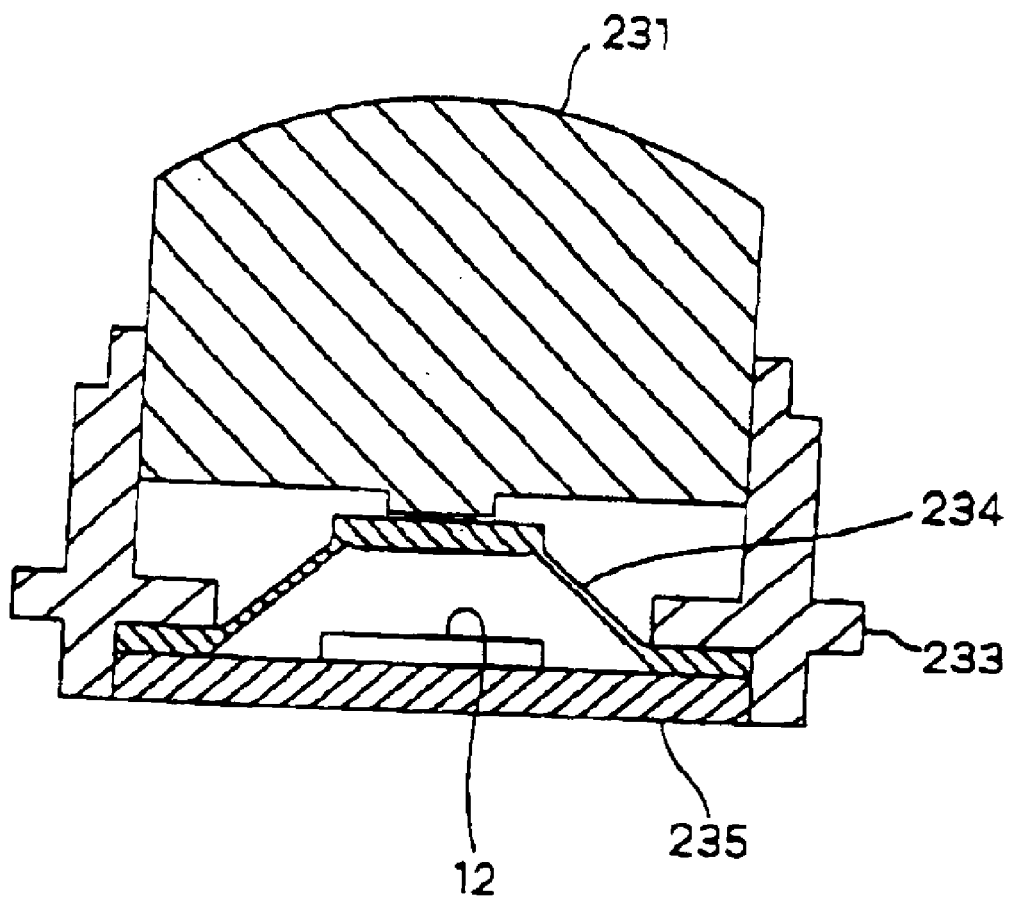
FIG. 23 is a front sectional view showing a structural example of the third control unit according to the first embodiment.

FIG. 22 and FIG. 23 are diagrams showing a structural example of the third control unit.

The third control unit 230 comprises the two control buttons 231, a spacer 232 for positioning the control buttons 231 in the control apparatus 200, a holder 233 for supporting the control buttons 231, an elastic body 234, and an internal board 235, and has the pressure-sensitive devices 12 at proper portions on the internal board 235.

The overall/general structure of the third control unit 230 is also well-known from Japanese Unexamined Patent Application Publication No. 8-163672, etc., and thus a detailed description is omitted. However, the control buttons 231 can be pressed while being guided by the spacer 232. The pressure when the control buttons 231 are pressed acts on the pressure-sensitive devices 12 via the elastic body 234. The resistance of the pressure-sensitive devices 12 is changed in accordance with the magnitude of the applied pressure. The structural example shown in FIGS. 22 and 23 illustrate that the pressure-sensitive devices 12 are directly provided at proper portions of the internal board 235 which is built in the control apparatus 200. However, similarly to the structural example of the second control unit 220 shown in FIG. 14 and FIG. 15, the pressure-sensitive device 12 can also be provided on the sheet member 223.

Incidentally, the fourth control unit 240 is also constructed similarly to the third control unit 230.

Although the above description shows the structural examples in the case in which the present invention is applied to the first to fourth control units 210, 220, 230, and 240, the present invention is not limited to be applied to all of the control units. The control unit to which the present invention is applied can be selected arbitrarily and the other control units can have conventional constructions.

The first embodiment is described by using the pressure-sensitive devices 12 having the characteristics shown in FIGS. 4 and 11. In other words, according to the characteristics, the resistance of the pressure-sensitive device 12 increases and the output voltage decreases in accordance with the increase in the pressure of the controller 11. However, according to the first embodiment, it is also possible to use a pressure-sensitive device 12 having characteristics which are opposite to the above-mentioned characteristics. In other words, according to the opposite characteristics, the resistance of the pressure-sensitive device 12 decreases and the output voltage increases in accordance with the increase in the pressure of the controller 11. By using the pressure-sensitive device 12 having this opposite characteristics, the input characteristics of the level segmenting unit 15 need to be inverted. However, the pressure-sensitive device 12 has characteristics in that a large voltage is not applied unless the controller 11 is pressed.

[Second Embodiment]

Next, a detailed description is given of the structure according to a second embodiment of the present invention.

Incidentally, the same reference numerals denote the same portion as those of the first embodiment which have been already described, and thus a detailed description thereof is omitted.

Although according to the control device 200 of the first embodiment, the pressure-sensitive device 12 is used as a detecting device, while, according to the second embodiment which will be described hereinbelow, a detecting device comprises a resistor 40 and a conductive member 50.

Figure 24A:
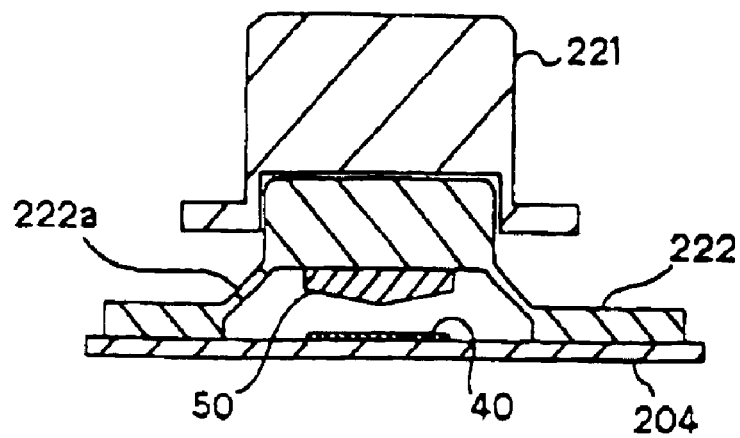
FIG. 24A to FIG. 24C are front sectional views showing structural examples of a second control unit according to a second embodiment of the present invention.
Figure 24B:
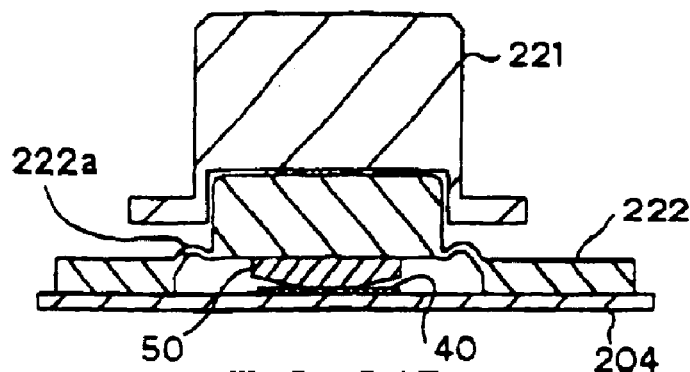
Figure 24C:
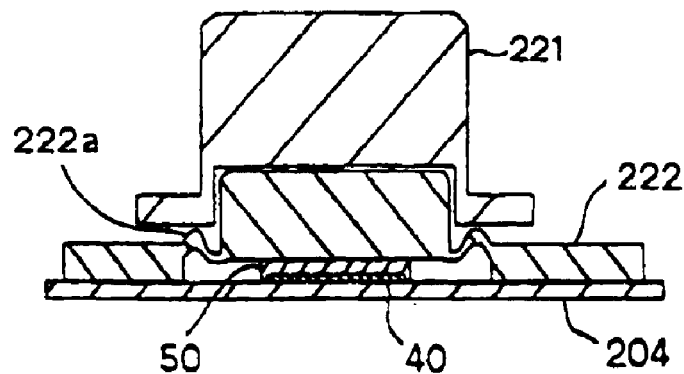

FIG. 24A to FIG. 24C are diagrams showing one structural example of a second control according to the present embodiment. Although only a single control button 221 and the related structure are shown in the figures, a plurality of control buttons 221 can be provided in the second control unit 220, each having the same structure as the structure shown in the figures by selecting the control button 221 arbitrarily.

In other words, the second control unit 220 according to the present embodiment comprises the control button 221 serving as the controller 11, the elastic body 222, the conductive member 50, and the resistor 40. The conductive member 50 is made of, e.g., conductive rubber having elasticity, and is formed with a peak shape in which the top of the peak is at the center. The conductive member 50 is adhered to the inside of the ceiling surface of the elastic portion 222a which is formed in the elastic body 222.

The resistor 40 is provided, for instance, on the internal board 204 so as to face the conductive member 50, and the conductive member 50 makes contact to the resistor 40 in accordance with the pressing operation of the control button 221. The conductive member 50 is deformed in accordance with the pressure on the control button 221 (that is, contact pressure with the resistor 40), thereby changing the contact area with the resistor 40, as shown in FIGS. 24B and 24C. In other words, when the pressure on the control button 221 is small, the portion near the top of the conductive member 50 having a peak shape makes contact with the resistor 40, as shown in FIG. 24B. Further, when the pressure on the control button 221 becomes larger, the conductive member 50 is gradually deformed from the top thereof and the contact area becomes larger.

Figure 25:
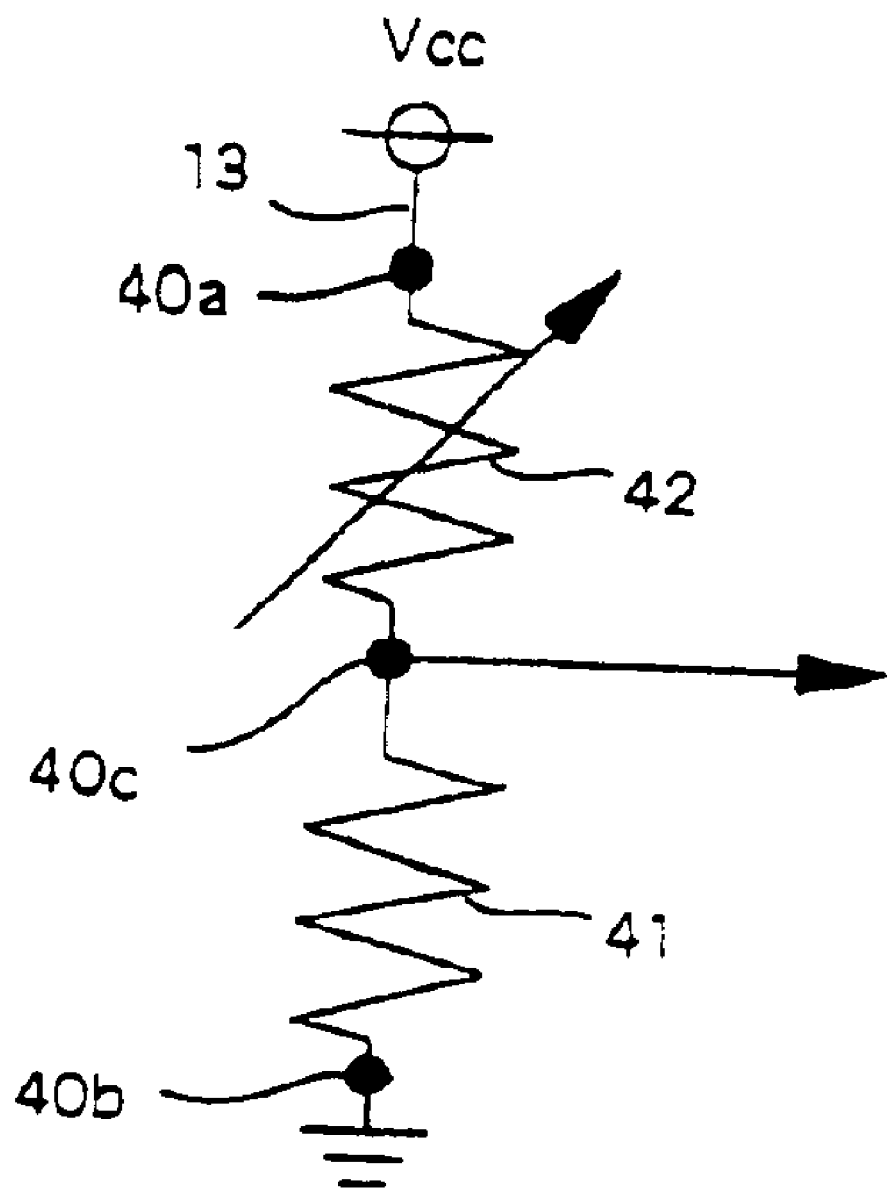
FIG. 25 is a diagram showing the circuit configuration of a resistor shown in FIGS. 24A to 24C.

FIG. 25 is a diagram showing the circuit configuration of the resistor 40, the conductive member 50, and devices peripheral thereto. A variable resistor 42 in FIG. 25 corresponds to the combination of the conductive member 50 and the resistor 40 in FIGS. 24A to 24C. A fixed resistor 41 (not shown in FIGS. 24A to 24C) is connected to the resistor 40. A power supply voltage Vcc is applied to the variable resistor 42 and the fixed resistor 41 which are serially connected, that is, across electrodes 40a and 40b.

The variable resistor 42 corresponds to the combination of the conductive member 50 and the resistor 40. The resistance of the variable resistor 42 changes in accordance with the contact area between the conductive member 50 and the resistor 40. That is, if the conductive member 50 makes contact with the resistor 40, the conductive member 50 functions as a bypass for the resistor 40 and a current flows. Therefore, the contact portion is effectively short-circuited, so that the resistance of the resistor 40 drops. As the contact area of the conductive member 50 becomes larger, the resistance of the resistor 40 decreases more.

The power supply voltage Vcc applied across the electrodes 40a and 40b is divided by the variable resistor 42 whose resistance changes in accordance with the pressure on the control button 221 and the fixed resistor 41. Thus, the output voltage which is obtained from an output terminal 40c between the variable resistor 42 and the fixed resistor 41 becomes larger as the resistance of the variable resistance 42 become smaller and, on the other hand, the output voltage becomes smaller as the resistance of the variable resistance 42 becomes larger.

Figure 26:
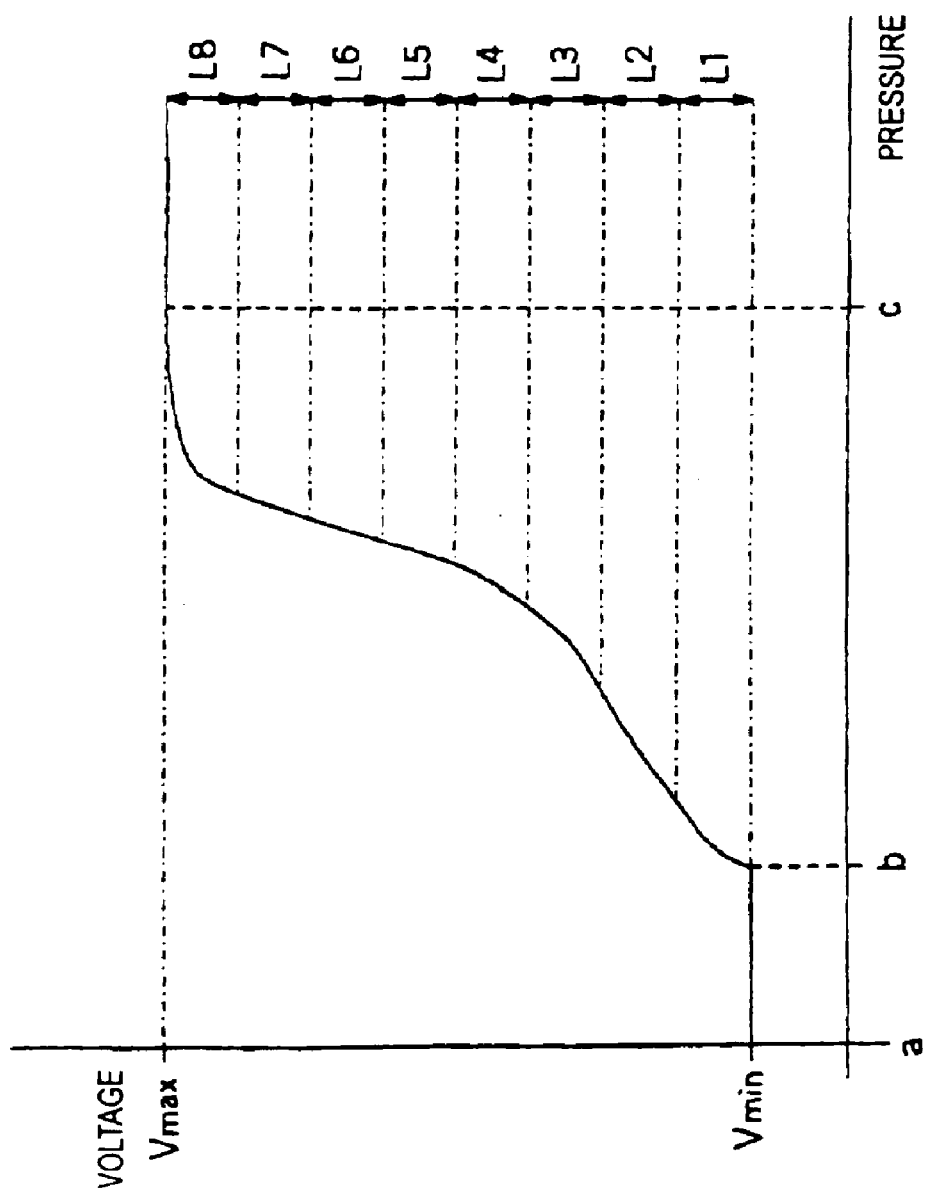
FIG. 26 is a diagram showing characteristics of an analog signal which is outputted by an output terminal of the resistor shown in FIG. 25.

FIG. 26 is a diagram showing the characteristics of the analog signal (voltage) which is outputted from the output terminal 40c of the resistor 40.

To start with, since a voltage is applied to the resistor 40 when the power is turned on, a predetermined analog signal (voltage) Vmin is outputted from the output terminal 40c until the control button 221 is pressed (a position "a" shown in the figure). Subsequently, since the resistance of the resistor 40 is not changed until the conductive member 50 makes contact with the resistor 40 when the control button 221 is pressed, the output from the resistor 40 is held at Vmin and is not changed. Further, the control button 221 is pressed and the conductive member 50 makes contact with the resistor 40 (a pressing position "b" in the figure) and, thereafter, the contact area of the conductive member 50 with the resistor 40 increases in accordance with the pressure on the control button 221. Thus, the internal resistance of the resistor 40 decreases and the analog signal (voltage) which is outputted from the output terminal 40c of the resistor 40 increases. When the conductive member 50 is unideformed to the greatest extent, the analog signal (voltage) outputted from the output terminal 40c of the resistor 40 is equal to a maximum value Vmax (a pressed position "c" in the figure).

Figure 27:
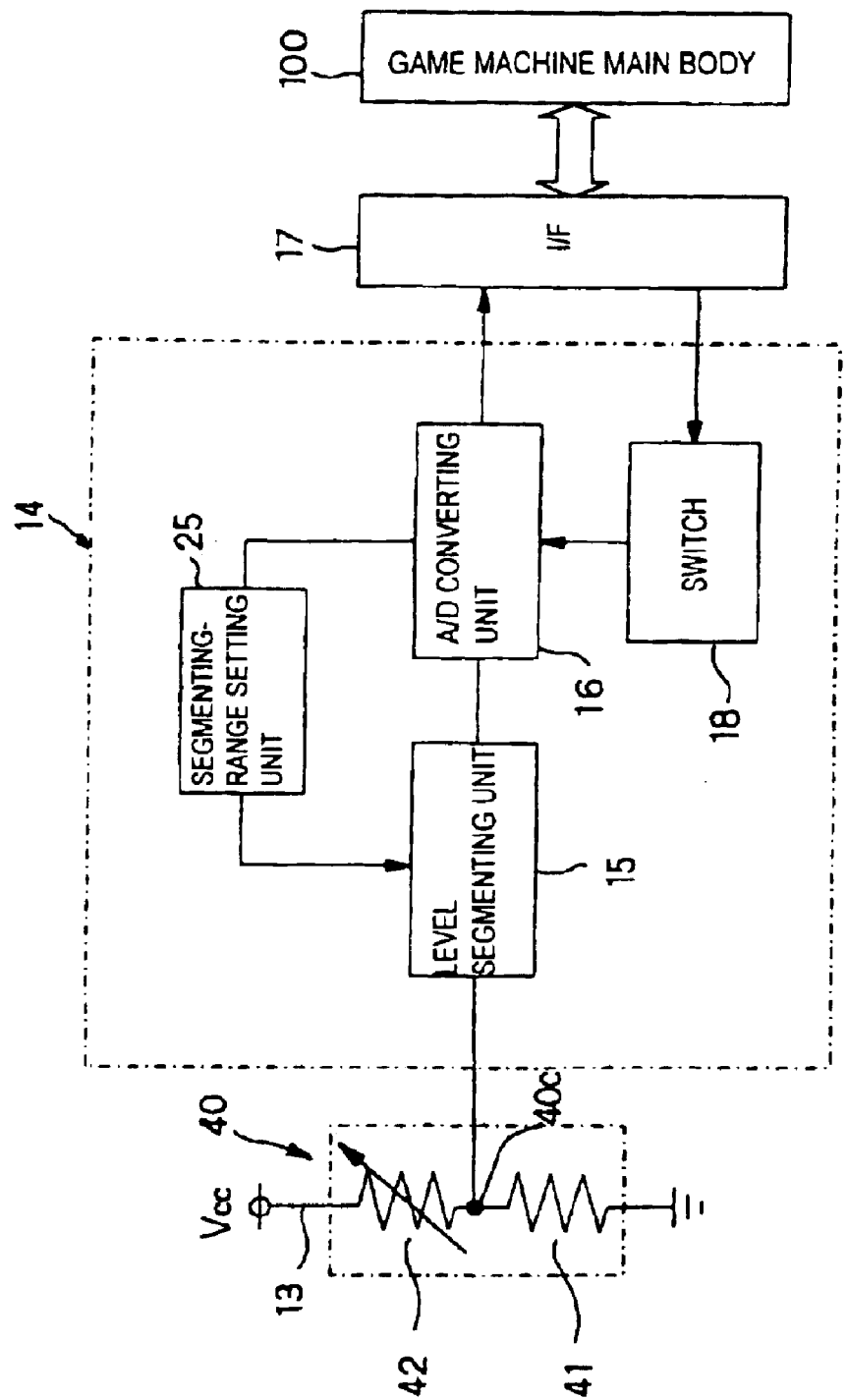
FIG. 27 is a block diagram showing the main portion concerning the second control unit according to the second embodiment.

FIG. 27 is a block diagram showing the main portion of the control apparatus according to the second embodiment of the present invention.

According to the present embodiment, the MPU 14 provided on the internal board of the control apparatus 200 comprises the level segmenting unit 15, the A/D converting unit 16, and the switch 18. According to the present embodiment, the analog signal (voltage) which is outputted from the output terminal 40c of the resistor 40 is inputted to the level segmenting unit 15, then, the output level of the analog signal is segmented into a plurality of levels by the level segmenting unit 15, and, further, the A/D converting unit 16 converts the analog signal which is outputted by the resistor 40 into a digital signal in accordance with the segmented output level.

The functions of the level segmenting unit 15 and A/D converting unit 16 are the same as those of the aforementioned first embodiment. The level segmenting unit 15 has a fundamental function for segmenting the range of levels of the analog signal (voltage) which is outputted from the resistor 40 by a uniform width, as shown in FIG. 36. The number of segments can be arbitrarily set and, in the example shown in FIG. 36, the range of levels of the analog signal (voltage) is uniformly segmented into eight levels. The individual output levels L1 to L8 which are segmented uniformly as discussed above are transmitted to the A/D converting unit 16. Incidentally, the range of levels of the analog signal which is uniformly segmented by the level segmenting unit 15 can be changed arbitrarily.

The A/D converting unit 16 converts the analog signal level-segmented by the level segmenting unit 15 into the digital signal in accordance with the output level of the analog signal and outputs the digital signal. In other words, the A/D converting unit 16 outputs the digital signal having a plurality of bits in accordance with the output levels L1 to L8.

The A/D converting unit 16 assigns the digital signal having a proper plurality of bits to the output level which is level-segmented, and outputs the digital signal. As an example, the digital signal having a plurality of bits, e.g., 8 bits or 16 bits is assigned to the output level and the digital signals "1f", "3f", . . . , "ff" are assigned and outputted in the cases of level 1 (L1), level 2 (L2), . . . , the level 8 (L8), respectively.

The digital signal having a plurality of bits which is outputted by the A/D converting unit 16 is transmitted to the game machine main body 100 by way of the interface 17 that is provided to the internal board of the control apparatus 200. The digital signal causes the movement of the game character, etc.

The level change in the analog signal which is outputted from the output terminal 40c of the resistor 40 corresponds to the change in the pressure which is applied by the control button 221 (controller 11). Therefore, the digital signal having the plurality of bits which is outputted by the A/D converting unit 16 corresponds to the pressure on the control button 221 (controller 11) by the user. If the operation of the game character, etc. is controlled by the digital signal having the plurality of bits which has the above-explained relation with the user's pressing operation, it is possible to realize a smoother operation in an analog manner as compared with the control operation by the digital signal having a single bit ("1" or "0").

As described above, the level segmenting unit 15 uniformly segments the output level of the analog signal which is outputted by the resistor 40 within a predetermined range. There is a danger that it is impossible to output a digital signal which matches the state of the controller 11 if the predetermined range deviates from the range of levels of the analog signal (voltage) which is actually outputted by the resistor 40.

However, the resistor 40 and the conductive material 50 have individual differences and the power supply voltage also varies. Consequently, the individual control apparatuses 200 cause the output range of the analog signal outputted by the resistor 40 to differ.

Then, the control apparatus 200 according to the present embodiment comprises a segmenting-range setting unit 25 for individually setting the range of output levels of the analog signal which is segmented by the level segmenting unit 15 (refer to FIG. 27), and to thereby calibrate the range of levels of the analog signal (voltage) which is segmented by the level segmenting unit 15.

Figure 28:
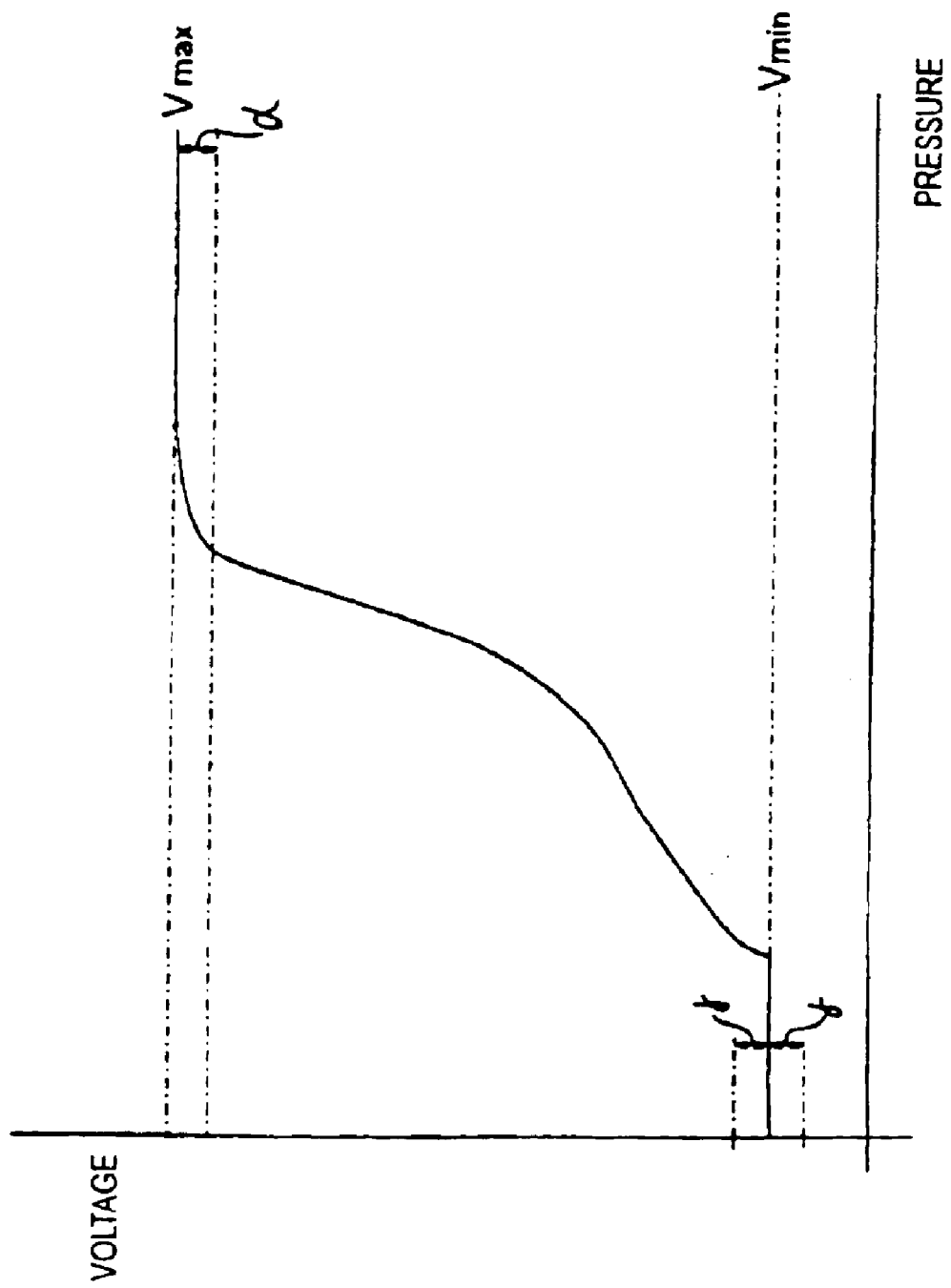
FIG. 28 is a diagram for explaining the function of a segmenting-range setting unit for the second control unit according to the second embodiment.

FIG. 28 is a diagram used to explain the function of the segmenting-range setting unit.

As shown in FIG. 28, a minimum value Vmin and a maximum value Vmax of the analog signal (voltage) which is outputted by the resistor 40 are initially set in advance in the segmenting-range setting unit 25. An arbitrary allowable value α for the maximum value Vmax is set in advance. The allowable value α is set so as to compensate for variations when the output (analog signal) of the resistance is recognized on the basis of information from the A/D converting unit 16. Further, a discriminating value γ around the minimum value Vmin is set in advance so as to determine whether or not the control button is pressed.

For the setting, the segmenting-range setting unit 25 executes the calibration operation as follows.

When the power source of the control apparatus 200 is turned on, the segmenting-range setting unit 25 recognizes a unit Vmin(Real) of the analog signal (voltage) which is actually outputted by the resistor 40 on the basis of the information from the A/D converting unit 16 in order to adjust the minimum value Vmin of the analog signal (voltage) which is outputted by the resistor 40.

In this case, considering the reason that the user presses the control button 221, etc., it is determined whether or not Vmin(Real) is within the range of the allowable error value γ in which Vmin is set to a center value. If Vmin(Real) is out of the range (Vmin+γ)>Vmin(Real)>(Vmin−γ), the user is informed that the calibration is being performed.

To inform the user, it is possible to adopt methods of switching on/off the display unit 253 which is provided in the control apparatus 200 and operating a vibration mechanism if such a mechanism is built in the control apparatus 200, etc.

Next, under the condition such that Vmin(Real) is within the range (Vmin+γ)>Vmin(Real)>(Vmin−γ), the value Vmin(Real) is compared with Vmin. As a comparison, if Vmin(Real)>Vmin, the initial set value Vmin is set as the minimum value of the analog signal (voltage) which is outputted by the resistor 40. If Vmin(Real)<Vmin, the actual output-value Vmin(Real) changes and set as the minimum value of the analog signal (voltage) which is outputted by the resistor 40.

Sequentially, the control button 221 is depressed strongly by the user according to the manual operation, etc., thereby recognizing a level Vmax(Real) of the analog signal (voltage) which is actually outputted by the resistor 40 on the basis of the information that is then outputted from the A/D converting unit 16.

If the value Vmax(Real) is larger than (Vmax−α) which is obtained by considering the allowable value α, it is recognized that the user pressed the control button 221 up to the limit and Vmax(Real) is compared with Vmax. As a comparison, Vmax(Real)<Vmax, the initial set value Vmax is set as the maximum value of the analog signal (voltage) which is outputted by the resistor 40. On the other hand, if Vmax(Real)>Vmax, the actual output value Vmax(Real) changes and set as the maximum value of the analog signal (voltage) which is outputted by the resistor 40.

The segmenting-range setting unit 25 controls the level segmenting unit 15 so as to uniformly segment the analog signal (voltage) which is outputted by the resistor 40 within the range from the minimum value Vmin to the maximum value Vmax, which are set as mentioned above.

Figure 29:
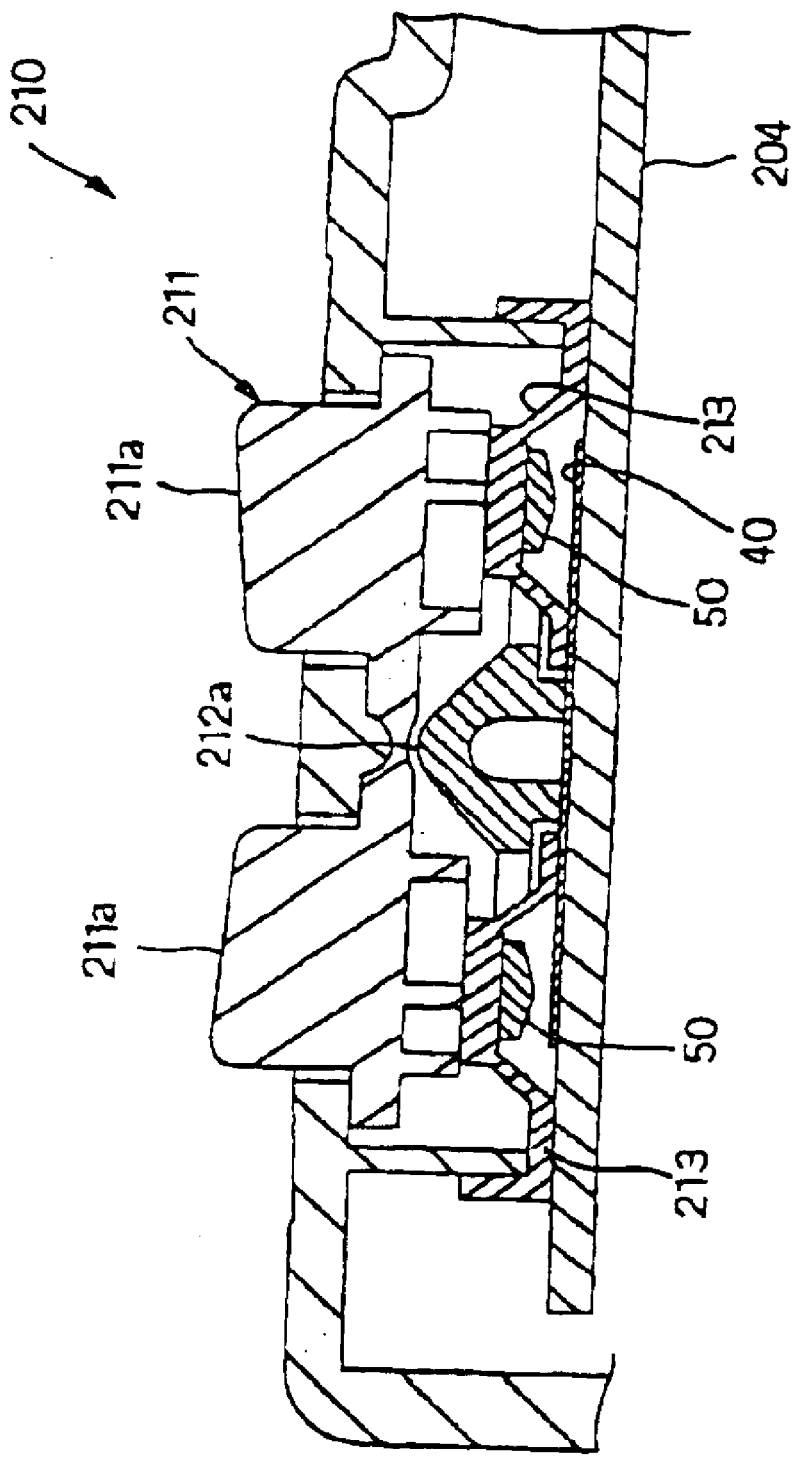
FIG. 29 is a front sectional view showing a structural example of a first control unit according to the second embodiment of the present invention.

FIG. 29 is a diagram showing a structural example of the first control unit according to the present embodiment.

According to the structural example of the first control unit 210 shown in the figure, corresponding to the control keys 211a (controller 11) of the cross-shaped control body 211, the conductive members 50 are adhered to the inside ceiling-surface of the elastic body 213. The resistor 40 having a single construction is disposed so as to face the conductive members 50.

Figure 30:
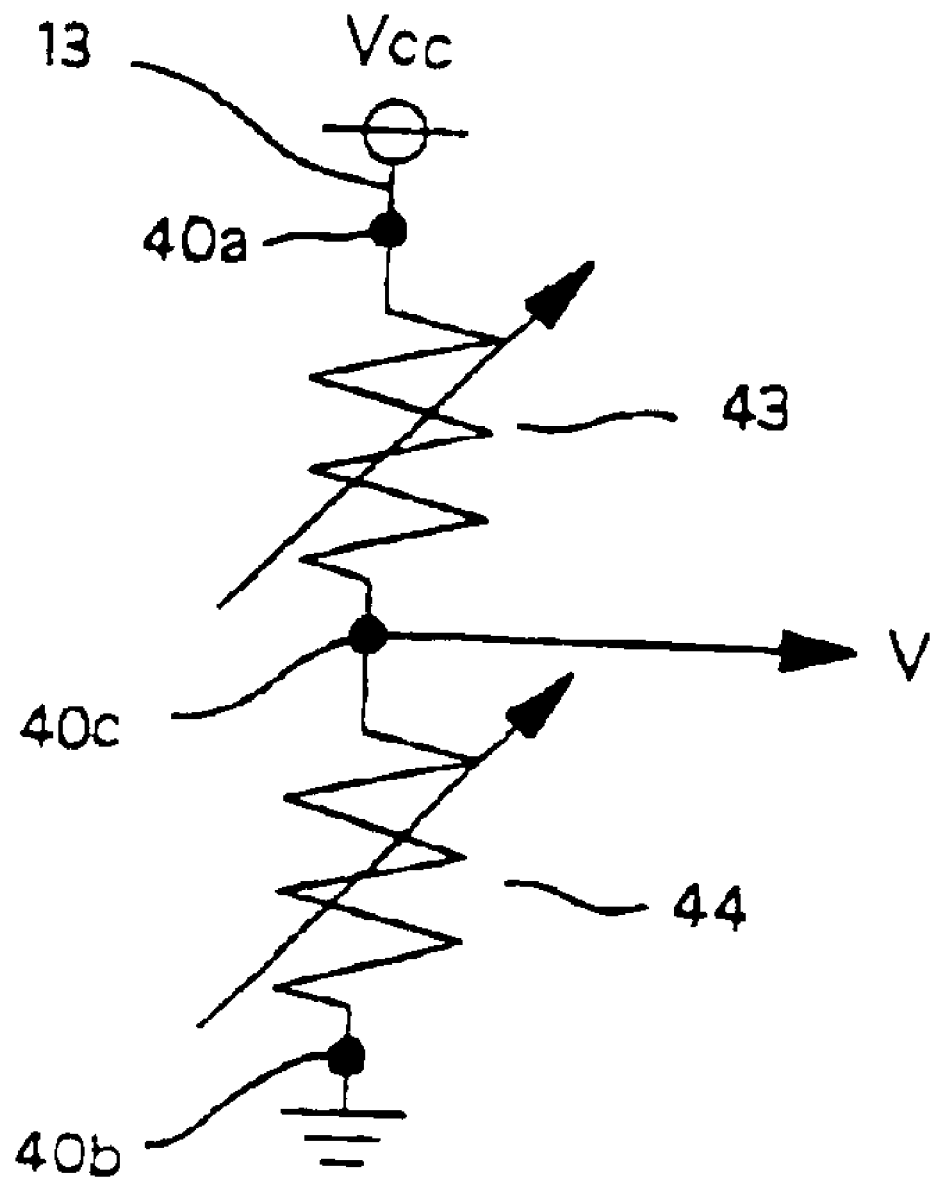
FIG. 30 is a diagram showing the circuit configuration of a resistor shown in FIG. 29.

FIG. 30 is a diagram showing the circuit configuration of the resistor. As shown in the figure, the resistor 40 is inserted in series with the power line 13 and a voltage is applied across the electrodes 40a and 40b. The internal resistance of the resistor 40 is schematically divided into first and second variable resistors 43 and 44 shown in the figure. For instance, the conductive member 50 which moves together with the control key 211a (up directional key) for moving the character upward makes contact with a portion of first variable resistor 43 and the conductive member 50 which moves together with the control key 211a (left directional key) for moving to the left makes contact therewith, thereby changing the resistance in accordance with the contact area with the conductive members 50. For instance, the conductive member 50 which moves together with the control key 211a (down directional key) for moving the character downward makes contact with the second variable resistor 44 and the conductive member 50 which moves together with the control key 211a (right directional key) for moving to the right makes contact therewith, thereby changing the resistance in accordance with the contact area with the conductive members 50.

The output terminal 40c is provided at an intermediate portion between the variable resistors 43 and 44, and the analog signal is outputted from the output terminal 40c in accordance with the pressure on the control keys 211a (controller 11).

The outputs from the output terminal 40c can be calculated by using a dividing ratio of the resistances of the first and second variable resistors 43 and 44 have. If the resistance of the first variable resistor 43 is R1, the resistance of the second resistor 44 is R2, and the power supply voltage is Vcc, an output voltage V generated at the output terminal 40c can be expressed by the following expression.

$$V = Vcc \times R2/(R1+R2)$$

Therefore, when the resistance of the first variable resistor 43 decreases, the output voltage increases. On the other hand, when the resistance of the second variable resistor 44 decreases, the output voltage decreases.

Figure 31:
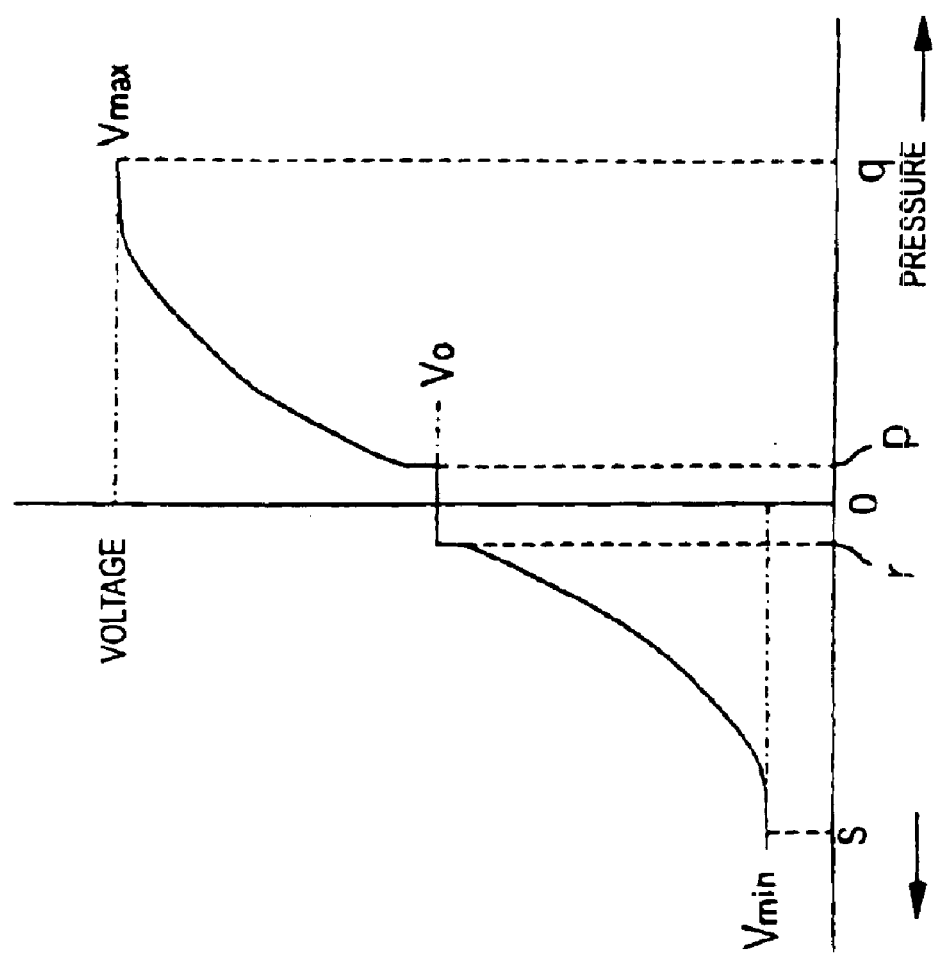
FIG. 31 is a diagram showing characteristics of an analog signal which is outputted by an output terminal of the resistor shown in FIG. 30.

FIG. 31 is a diagram showing the characteristics of the analog signal (voltage) which is outputted by the output terminal 40c of the resistor.

First of all, a voltage is applied to the resistor 40 when the power is turned on, so that a predetermined analog-signal (voltage) $V_o$ is outputted by the output terminal 40c unless the control keys 211a of the controller 221 are pressed.

Next, if any one of control keys 211a is pressed, the output from the resistor 40 is kept at $V_o$ and does not change because the resistance of the resistor 40 does not change until the conductive member 50 makes contact with the resistor 40.

Moreover, the up directional key or the left directional key is pressed and the conductive member 50 makes contact with the first variable resistor 43 in the resistor 40 (a pressed position p in the figure) and, thereafter, the contact area of the conductive member 50 for the first variable resistor 43 increases corresponding to the pressure on the control key 211a (controller). Thus, the resistance corresponding to the position decreases and the analog signal (voltage) which is outputted by the output terminal 40c in the resistor 40 is increased. When the conductive member 50 is deformed to the greatest extent, the analog signal (voltage) which is outputted by the output terminal 40c in the resistor 40 is set to the maximum value Vmax (a pressed position q in the figure).

On the contrary, the down directional key or right directional key is pressed and the conductive member 50 makes contact with the second variable resistor 44 in the resistor 40 (a pressed position r in the figure) and, thereafter, the contact area of the conductive member 50 for the second variable resistor 44 increases corresponding to the pressure on the control key 211a (controller). Thus, the resistance corresponding to the position decreases and this results in decreasing the analog signal (voltage) which is outputted by the output terminal 40c in the resistor 40. When the conductive member 50 is deformed to the greatest extent, the analog signal (voltage) which is outputted by the output terminal 40c in the resistor 40 is set to the minimum value Vmin (a pressed position s in the figure).

Figure 32:
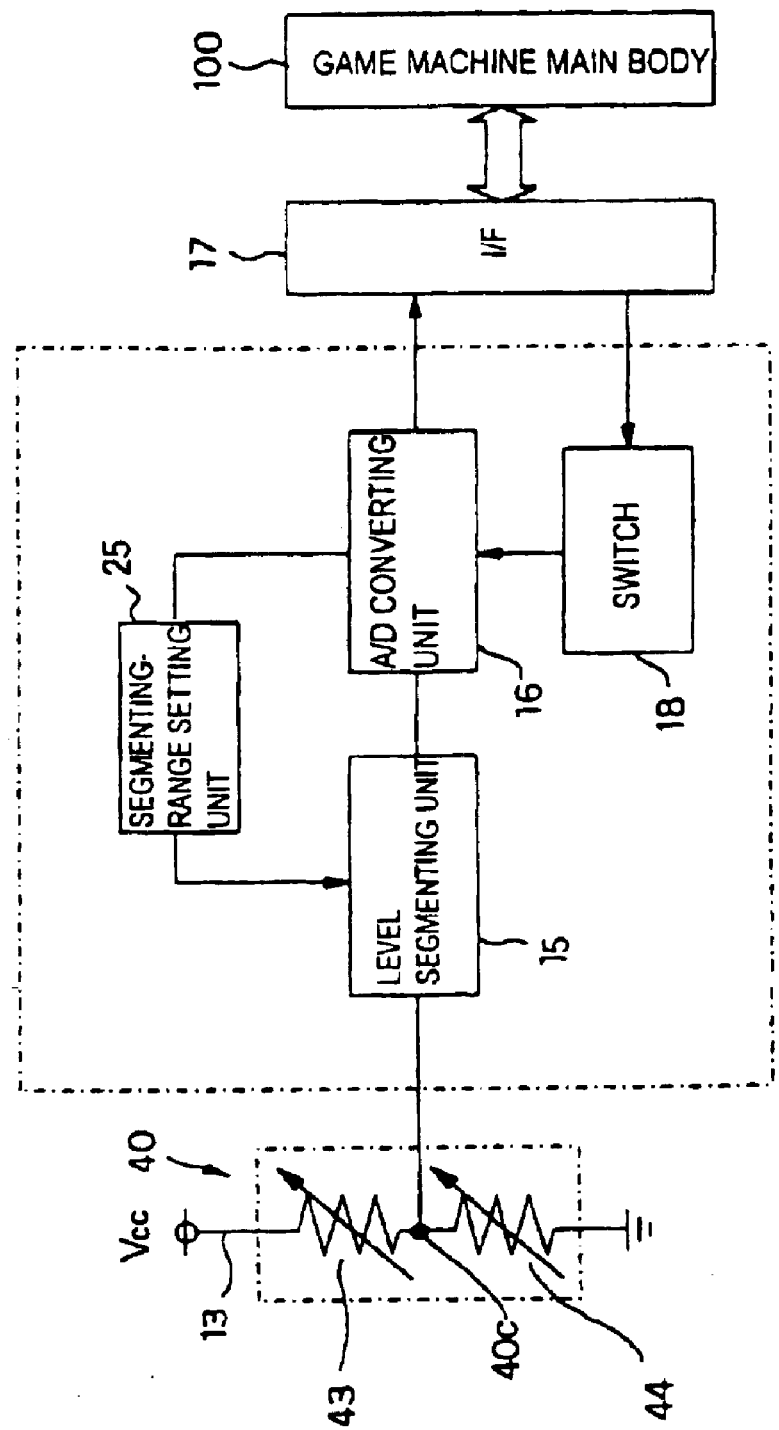
FIG. 32 is a block diagram showing the main portion of the first control unit according to the second embodiment.

The analog signal (voltage) which is outputted by the output terminal 40c in the resistor 40 is inputted to the level segmenting unit 15, as shown in FIG. 32. The level segmenting unit 15 segments the output level of the analog signal into a plurality of levels and, further, the A/D converting unit 16 converts the analog signal which is outputted by the resistor 40 into the digital signal in accordance with the segmented output-level. Incidentally, the functions of the level segmenting unit 15 and the A/D converting unit 16 which are shown in FIG. 32 have been described above with reference to FIG. 27, and the detailed description thereof is omitted.

Figure 33:
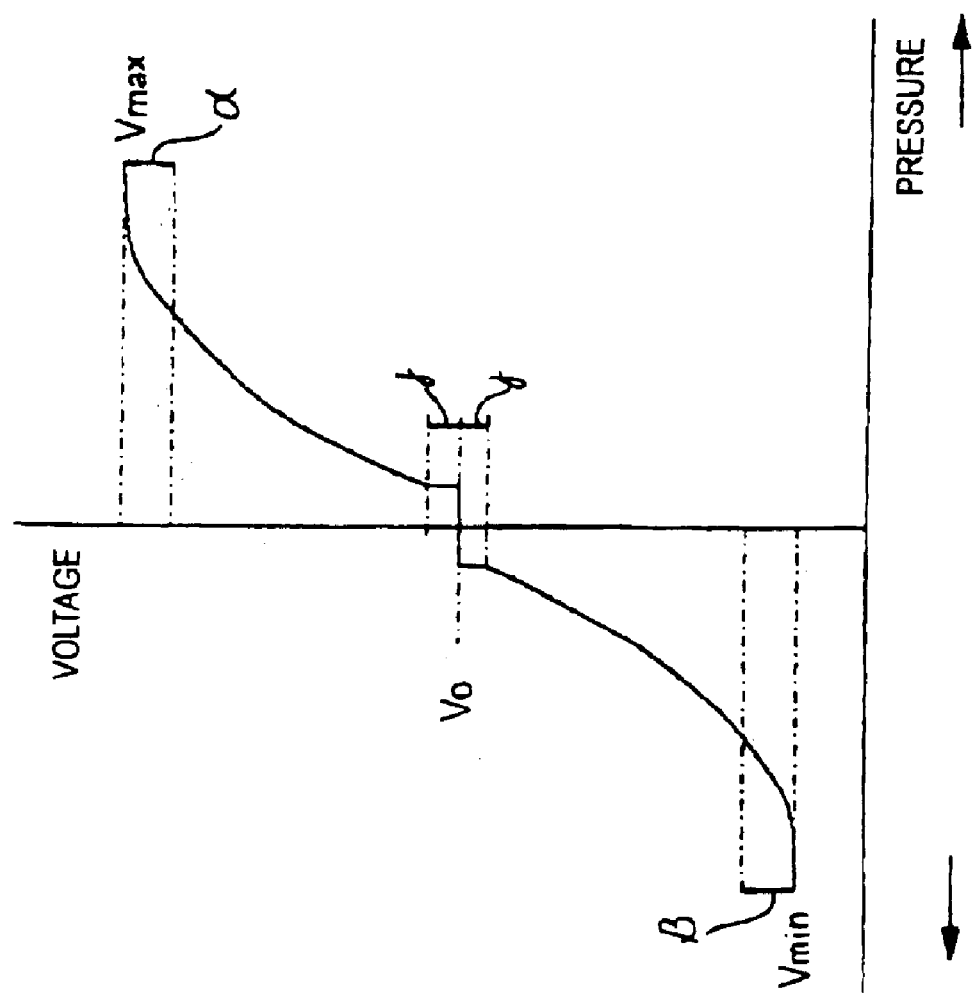
FIG. 33 is a diagram for explaining the functions of a segmenting-range setting unit for the first control unit according to the second embodiment.

The value $V_o$ during the non-pressed state and the minimum value Vmin and the maximum Vmax of the analog signal (voltage) which is outputted by the resistor 40 are initially set, in advance, in the segmenting-range setting unit 25 for individually setting the range of output levels of the analog signal which is segmented by the level segmenting unit 15, as shown in FIG. 33. An arbitrary allowable value $\alpha$ for the maximum value Vmax is preset and an arbitrary allowable value $\beta$ for the minimum value Vmin is preset. The allowable values $\alpha$ and $\beta$ compensate for variations when the output (analog signal) of the resistance is recognized on the basis of the information from the A/D converting unit 16. Further, a discriminating value $\gamma$ around the value $V_0$ of the analog signal (voltage) which is outputted in the non-pressed state is preset so as to determine whether or not the control button is pressed.

For the setting, the segmenting-range setting unit 25 executes the calibration operation as follows.

When the power supply of the control apparatus 200 is turned on, the segmenting-range setting unit 25 first recognizes, on the basis of information from the A/D converting unit 16 in order to adjust the level $V_0$ of the analog signal (voltage) which is outputted by the resistor 40 in the non-pressed state, a level ($V_0$(Real)) of the analog signal (voltage) which is actually outputted by the resistor 40.

In this case, considering the reason that the user presses the control button 221, etc., it is determined whether or not $V_0$(Real) is within the range of the allowable error value $\gamma$ in which $V_0$ is set as a central value. If $V_0$(Real) is out of a range $(V_0+\gamma) > V_0(Real) > (V_0-\gamma)$, the user is informed that the calibration is being performed.

To inform the user, it is possible to adopt methods of switching on/off the display unit 253 provided in the control apparatus 200 and operating a vibration mechanism if such a mechanism is built in the control apparatus 200, etc.

Next, under the condition such that $V_0$(Real) is within the range $(V_0+\gamma) > V_0(Real) > (V_0-\gamma)$, the value $V_0$(Real) is compared with $V_0$. As a comparison, if $V_0(Real) > V_0$, the initial set value $V_0$ is set as the value of the analog signal (voltage) which is outputted by the resistor 40 in the non-pressed state. On the other hand, if $V_0(Real) < V_0$, the actual output value $V_0$(Real) changes and set as the value of the analog signal (voltage) which is outputted by the resistor 40 in the non-pressed operation.

Sequentially, the up directional key is depressed strongly by a manual operation of the user, etc, thereby recognizing the level Vmax(Real) of the analog signal (voltage) which is actually outputted by the resistor 40 on the basis of information that is then outputted from the A/D converting unit 16.

If the value Vmax(Real) is larger than (Vmax−$\alpha$) which is obtained by considering the allowable value $\alpha$, it is recognized that the user pressed the up directional key up to the limit and Vmax(Real) is compared with Vmax. As a comparison, Vmax(Real)<Vmax, the initial set value Vmax is set as the maximum value of the analog signal (voltage) which is outputted by the resistor 40. On the other hand, if Vmax(Real)>Vmax, the actual output value Vmax(real) changes and set as the maximum value of the analog signal (voltage) which is outputted by the resistor 40.

The similar operation is performed in the case of the left directional key. The maximum value Vmax of the analog signal (voltage) which is outputted by the resistor 40 in accordance with the operation for pressing the left directional key is set.

Sequentially, the down directional key is depressed strongly by a manual operation of the user, etc, thereby recognizing the level Vmin(Real) of the analog signal (voltage) which is actually outputted by the resistor 40 on the basis of information that is then outputted by the A/D converting unit 16.

If the value Vmin(Real) is smaller than (Vmin+$\beta$) which is obtained by considering the allowable value $\beta$, it is recognized that the user pressed the down directional key up to the limit and Vmin(Real) is compared with Vmin. As a comparison, if Vmin(Real)>Vmin, the initial set value Vmin is set as the minimum value of the analog signal (voltage) which is outputted by the resistor 40. On the other hand, if Vmin(Real)<Vmin, the actual output value Vmin(Real) changes and set as the minimum value of the analog signal (voltage) which is outputted by the resistor 40.

The similar operation is performed in the case of the right directional key. The minimum value Vmin of the analog signal (voltage) which is outputted by the resistor 40 in accordance with the operation for pressing the right directional key is set.

The segmenting-range setting unit 25 controls the level segmenting unit 15 so as to uniformly segment the analog signal (voltage) which is outputted by the resistor 40 within the range from the output $V_0$ in the non-pressed state to the maximum value Vmax, which are set as mentioned above, in response to the pressing operation of the up directional key and the left directional key. The segmenting-range setting unit 25 controls the level segmenting unit 15 so as to uniformly segment the analog signal (voltage) which is outputted by the resistor 40 within the range from the output $V_0$ in the non-pressed state to the minimum value Vmin, which are set as mentioned above, in response to the pressing operation of the down directional key and the right directional key.

Incidentally, in the above description, the up directional key and the left directional key are assigned to the first variable resistor portion in the resistor 40 and the down directional key and the right directional key are assigned to the second variable resistor portion in the resistor 40. However, the present invention is not limited to the above description and, obviously, it is possible to arbitrarily set the allocation between the keys and the variable resistor portions.

With respect to the first control unit 210, the resistor 40 can also be individually arranged at the conductive members 50 which are provided at positions corresponding to the control keys 221a of the control body 211, so as to have the circuit configuration shown in FIG. 25. In this case, the characteristics of the analog signal (voltage) which is outputted by the output terminal 40c in the resistor 40 are those shown in FIG. 26.

[Modified Examples of Detecting Device]

Next, a description is given of modified examples of the detecting device comprising the resistor 40 and the conductive member 50. Although according to the following description relates to the detecting device which is provided in the second control unit 220 as an example, it is possible to apply another control unit to the following detecting device.

FIGS. 34A to 34D to FIGS. 37A to 37D show detecting devices which are obtained by changing the shape of the conductive member 50. Incidentally, in the figures, FIGS. 34A, 35A, 36A, and 37A are front sectional views of the control unit including the detecting device, FIGS. 34B, 35B, 36B, and 37B are front views of the conductive member, FIGS. 34C, 35C, 36C, and 37C are diagrams in which the conductive member is seen from below, and FIGS. 34D, 35D, 36D, and 37D are characteristics diagrams of the analog signal which is outputted by the output terminal of the resistor.

Any conductive member 50 in the figures have a shape in which the contact area with the resistor 40 can be changed in accordance with the contact pressure with the resistor 40.

Figure 34A:
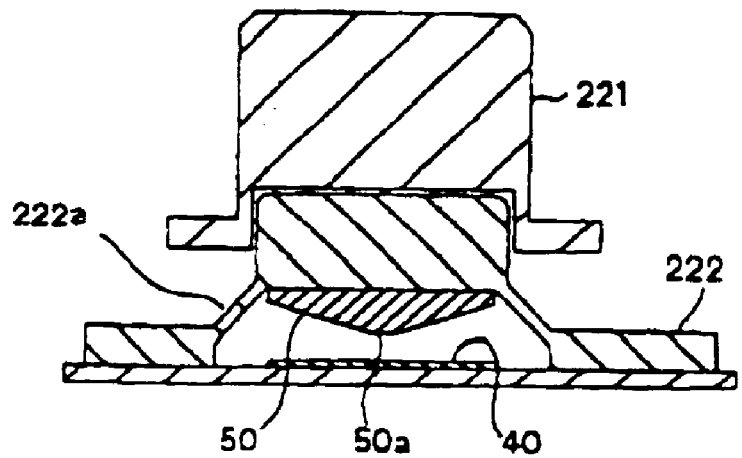
Figure 34B:
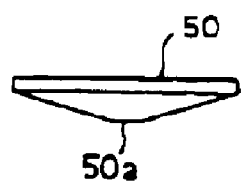
Figure 34C:
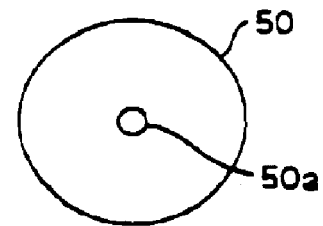
Figure 34D:
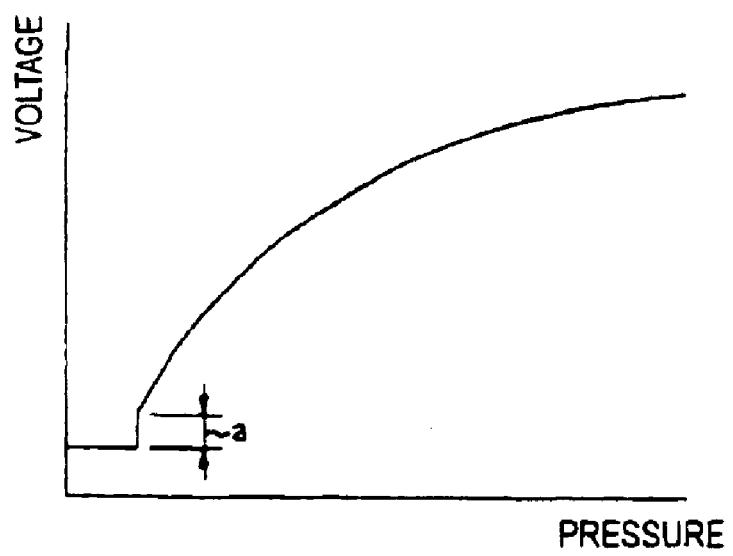
Figure 35A:
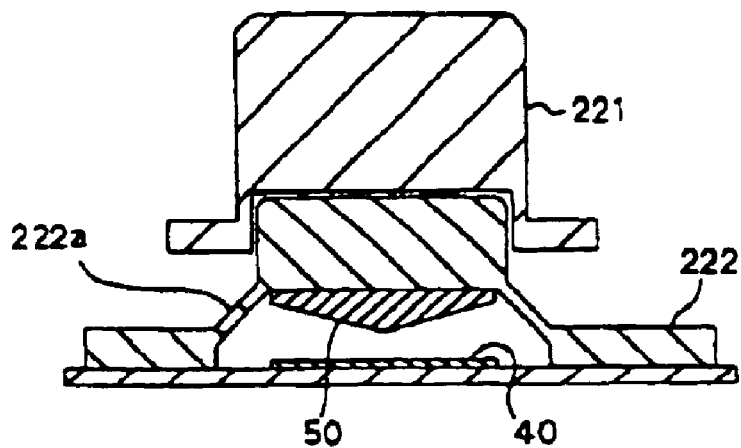
Figure 35B:
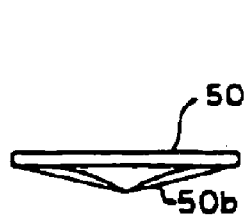
Figure 35C:
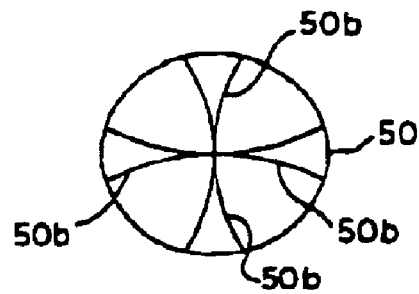
Figure 35D:
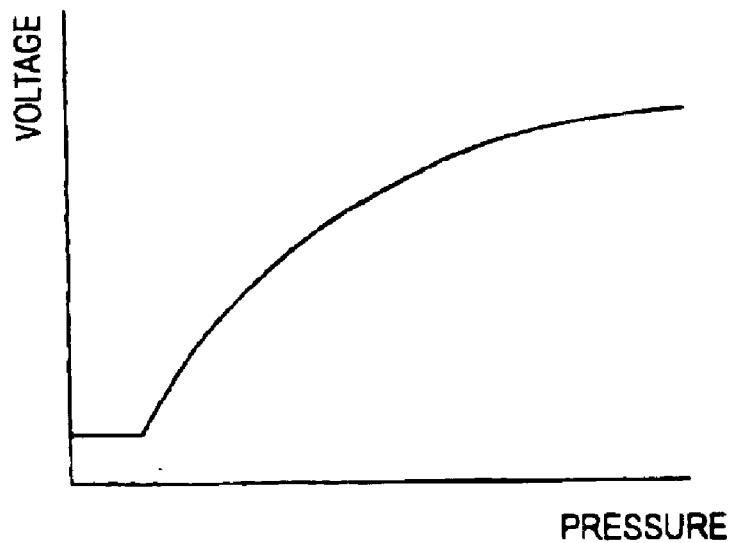
Figure 36A:
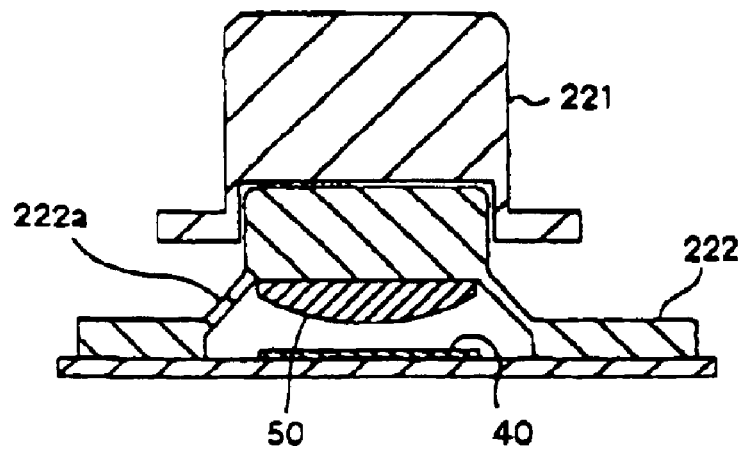
Figure 36B:
Figure 36C:
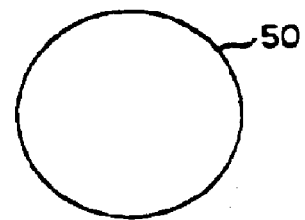
Figure 36D:
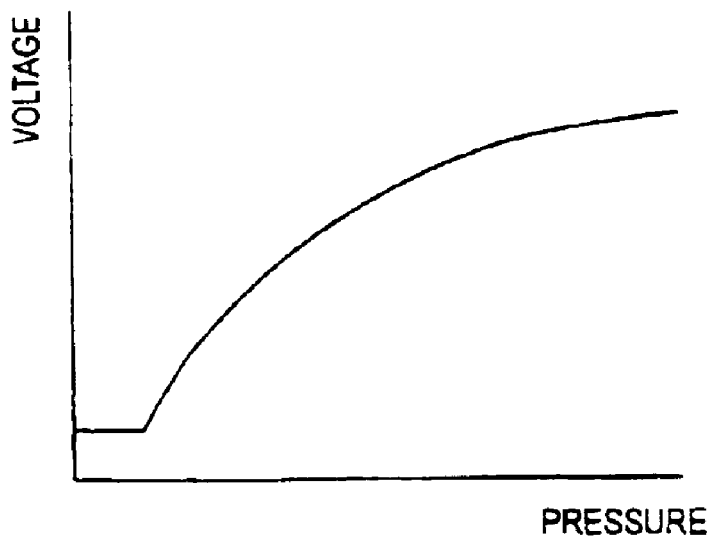

That is, according to the detecting device shown in FIGS. 34A to 34D, the conductive members 50 is formed with a shape having a trapezoidal longitudinal-section surface (like a truncated cone in the figure). According to the conductive member 50 having such a shape, a top portion 50a of the conductive member 50 makes contact with the resistor 40 in accordance with the pressing operation of the control buttons 221. However, the top portion 50a has a flat surface, so that the resistance decreases largely at the contact instant and this results in rapid increase in the output voltage (analog signal) as shown in FIG. 34D and, thereafter, the output voltage successively changes in accordance with the pressure.

Accordingly, the instant the conductive member 50 is connected and disconnected to the resistor 40, a digital ON/OFF operation can be realized. Although FIGS. 34A to 34D illustrate the conductive member 50 having a shape like a truncated cone, the conductive member 50 can also be formed so as to have a truncated multi-pyramid in which the number of angles is three or four or more as an example.

The detecting device 50 shown in FIGS. 35A to 35D uses the conductive member 50 having a shape in ribs 50b in the vertical direction are formed to the peaked peripheral-surfaces. It is dangerous for the peaked conductive-member 50 shown in FIGS. 24A to 24C that a buckling occurs when the acting direction of the pressure is inclined from the central axis. Then, as shown in FIG. 35A to FIG. 35D, the ribs 50b are formed to the peripheral surface of the conductive member 50 and, consequently, the buckling of the conductive member 50 can be suppressed. The shape exhibits a remarkable acting-effect by combining, especially, the cross-shaped controlling body 211 shown in FIG. 29 with the conductive member 50.

The detecting device shown in FIGS. 36A to 36D is formed with a shape having a spherical surface of the conductive member 50. As mentioned above, by forming the spherical conductive-member 50, the buckling of the conductive member 50 can be avoided.

Figure 37A:
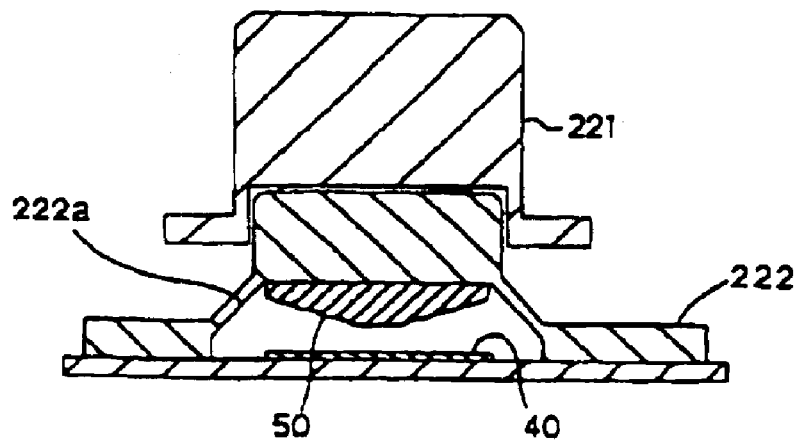
Figure 37B:
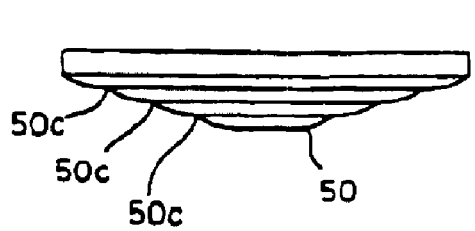
Figure 37C:
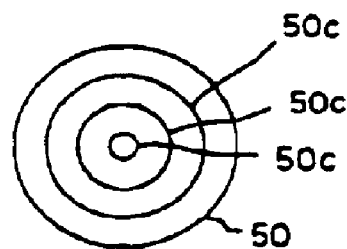
Figure 37D:
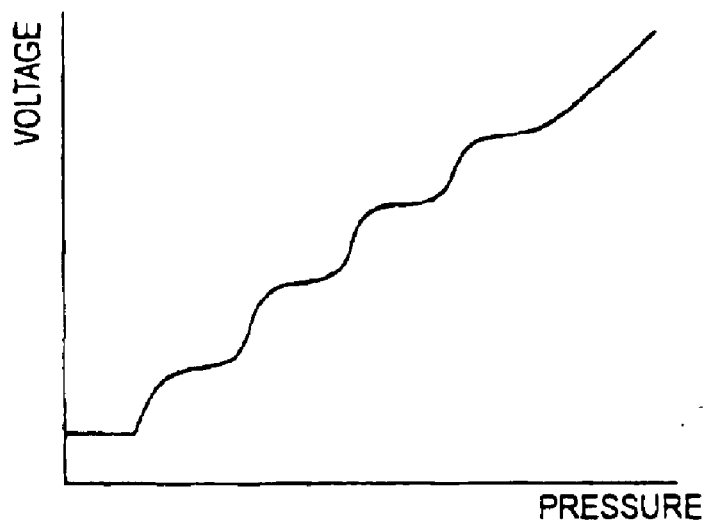

According to the detecting device shown in FIGS. 37A to 37D, the conductive member 50 is formed with a peaked shape having steps. The cross-sectional area decreases step by step towards the top of the conductive member 50 facing the resistor 40. According to the conductive member 50 having such a shape, the amount of deformations increases in accordance with the increase in pressure. However, in the step thereof, when a step portion 50c makes contact with the resistor 40, the contact area rapidly becomes large and the resistance decreases. The analog signal which is outputted by the output terminal of the resistor 40 changes step by step, as shown in FIG. 37D. Therefore, the conductive member 50 has characteristics in that the boundary at which the analog output changes rapidly can be readily recognized and stable level-segment is easy. Since the analog output changes step by step in response to the pressure, the user can easily adjust the pressure.

Figure 38A:
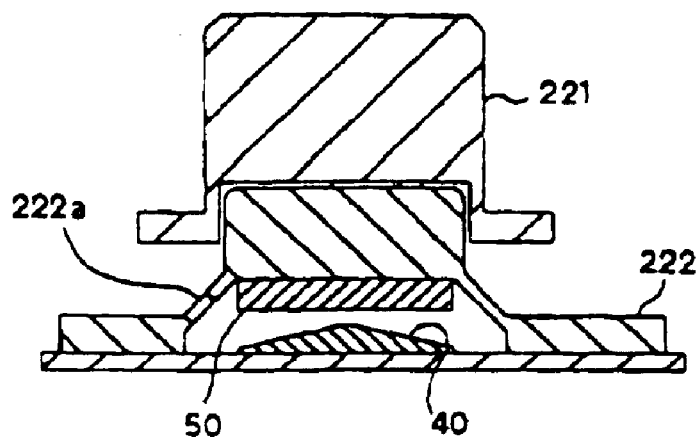
Figure 38B:
Figure 38C:
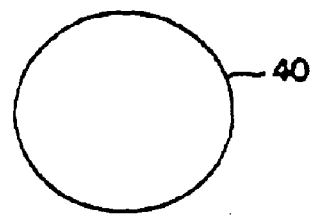
Figure 38D:
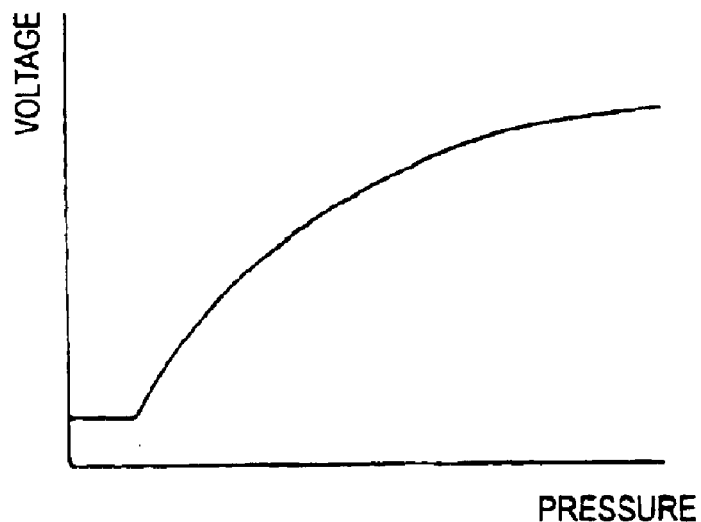
Figure 39A:
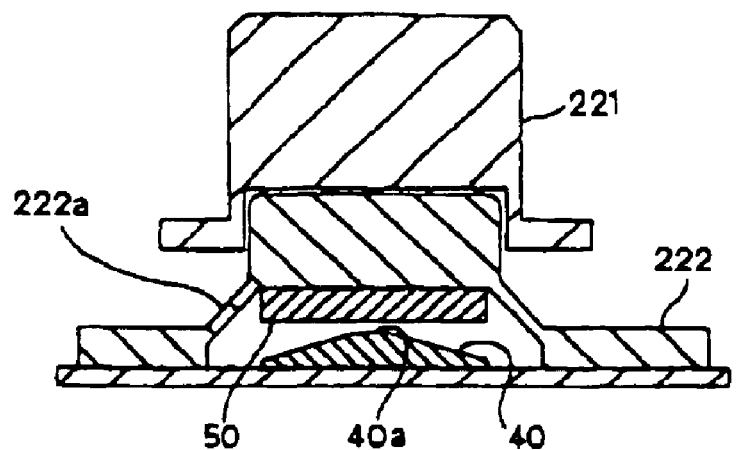
Figure 39B:
Figure 39C:
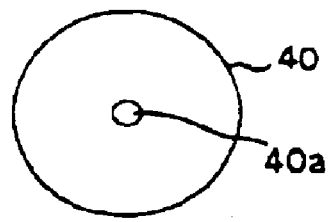
Figure 39D:
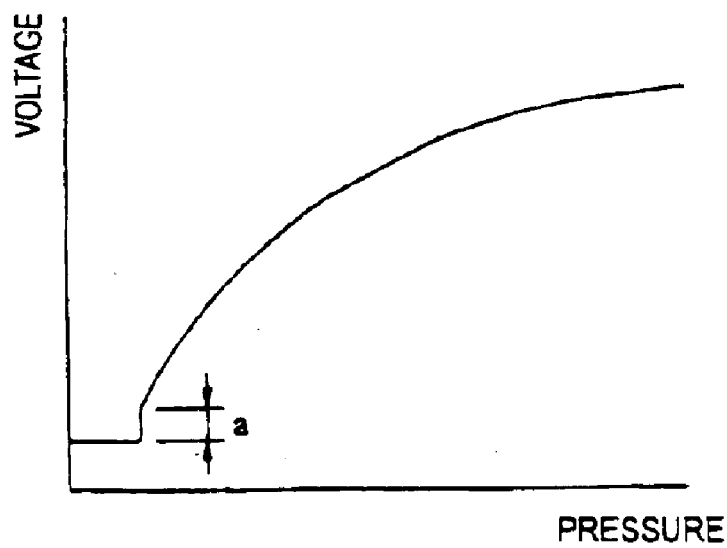
Figure 40A:
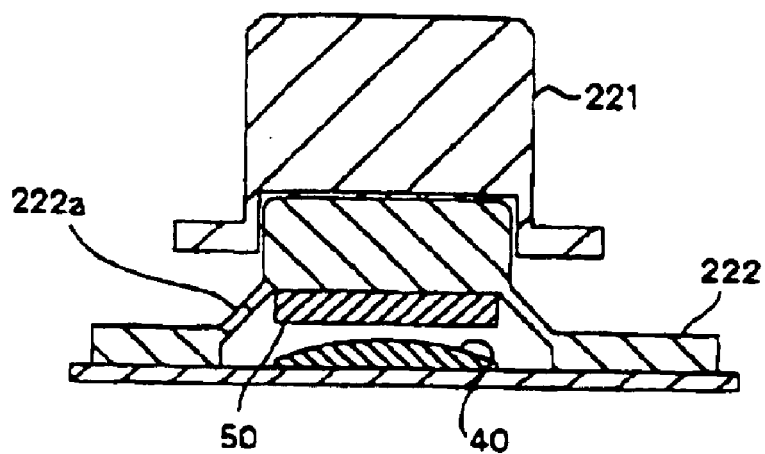
Figure 40B:
Figure 40C:
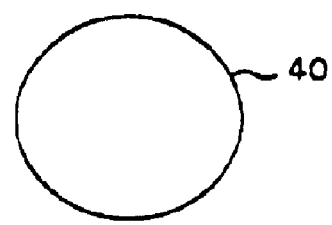
Figure 40D:
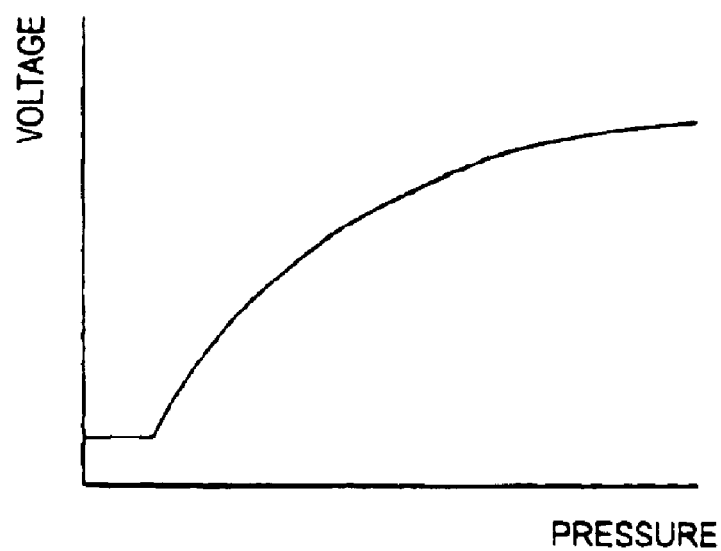

FIGS. 38A to 38D to FIGS. 40A to 40D show detecting devices which are obtained by changing a shape of the conductive member 50. Incidentally, in the figures, FIGS. 38A, 39A, and 40A are front sectional views of the control unit including the detecting device, FIGS. 38B, 39B, and 40B are front views of the conductive member, FIGS. 38C, 39C, and 40C are diagrams in which the conductive member is seen from below, and FIGS. 38D, 39D, and 40D are characteristics diagrams of the analog signal which is outputted by the output terminal of the resistor.

Any resistor 40 shown in the figures have a shape in which the cross-sectional area decreases towards the top facing the conductive member 50. According to the detecting device shown in FIGS. 38A to 38D, the resistor 40 is formed with a peaked shape. When the conductive member 50 descends together with the control buttons 221, the conductive member 50 makes contact with the resistor 40 and is deformed. Since the resistor 40 has the peaked shape, the contact area with the conductive member 50 sequentially becomes larger in accordance with the pressure. Then, the analog signal which is outputted by the output terminal of the resistor 40 sequentially changes, as shown in FIG. 38D.

According to the detecting device shown in FIGS. 39A to 39D, the resistor 40 is formed with a shape having a trapezoidal longitudinal-section surface (like a truncated cone in the figures). The conductive member 50 first makes contact with a top portion 40a of the resistor 40 having such a shape in accordance with the pressing operation of the control buttons 221. The top portion 40a has a flat surface, so that the output voltage rapidly increases at the contact instant, as shown by "a" in FIG. 39D and, thereafter, the output voltage sequentially changes in accordance with the pressure.

Accordingly, the instant the conductive member 50 makes contact with the resistor 40, the digital ON/OFF operation can be realized. Although FIGS. 39A to 39D illustrate the resistor 40 having a shape like a truncated cone, the resistor 40 can also be formed so as to have a truncated multi-pyramid in which the number of angle is three or four or more as an example.

According to the detecting device shown in FIGS. 40A to 40D, the resistor 40 is formed with a spherical surface. The resistor 40 is formed as mentioned above, so that the detecting device shown in FIGS. 40A to 40D can have almost the same characteristics as those shown in FIGS. 36A to 36D.

Figure 41A:
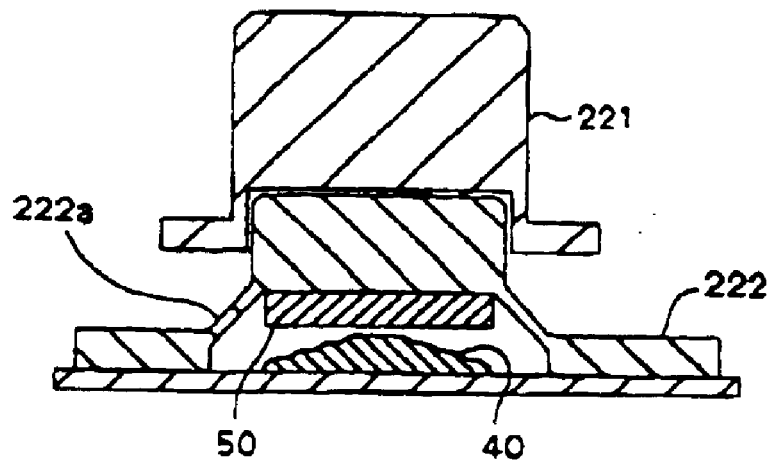
Figure 41B:
Figure 41C:
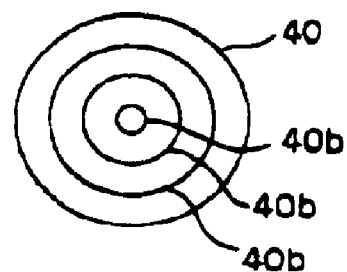
Figure 41D:
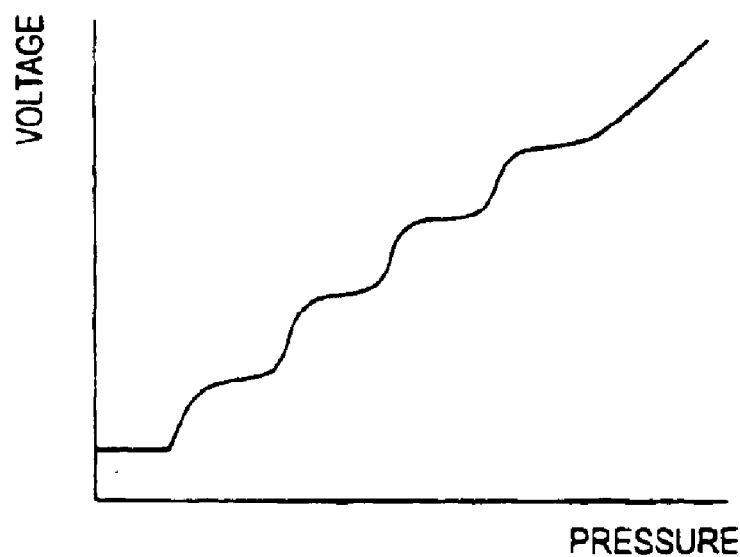

According to a detecting device shown in FIGS. 41A to 41D, the resistor 40 is formed with a peaked shape having steps and the cross-section area decreases step by step towards the top of the resistor 40 facing the conductive member 50. In the step in which the conductive member 50 makes contact with the resistor 40 having such a shape while being deformed in accordance with the pressing operation, the contact area rapidly becomes large and the resistance decreases when the conductive member 50 makes contact with a step portion 40b of the resistor 40. The analog signal which is outputted by the output terminal of the resistor 40 changes step by step, as shown in FIG. 41D. Therefore, the conductive member 50 has characteristics in that the boundary at which the analog output rapidly changes can be readily recognized and stable level-segment is easy. Since the analog output changes step by step in response to the pressure, the user can easily adjust the pressure.

According to a detecting device shown in FIGS. 42A to 42D, the conductive member 50 is formed with a peaked shape, a contact region in the resistor 40 with the conductive member 50 is segmented by spaces 41, and the contact area increases step by step in accordance with the deformation of the conductive member 50. Specifically speaking, the resistor 40 is formed with a shape shown in FIGS. 42B to 42D.

According to the detecting device having a structure shown in the figures, the top of the conductive member 50 first makes contact with a center portion 40c of the resistor 40 in accordance with the pressing operation of the control buttons 221. Thereafter, the conductive member 50 is deformed in accordance with the increase in pressure and, then, a contact region of the conductive member 50 becomes larger step by step in order of outer-peripheral portions 40d, 40d, and 40f of the resistor 40. In association therewith, the resistance decreases.

Intervals among portions 40a to 40f of the resistor 40 are segmented by the spaces 41, so that the resistance does not change and the output voltage (analog signal) thus is almost constant while the conductive member 50 passes through the spaces 41.

Figure 42A:
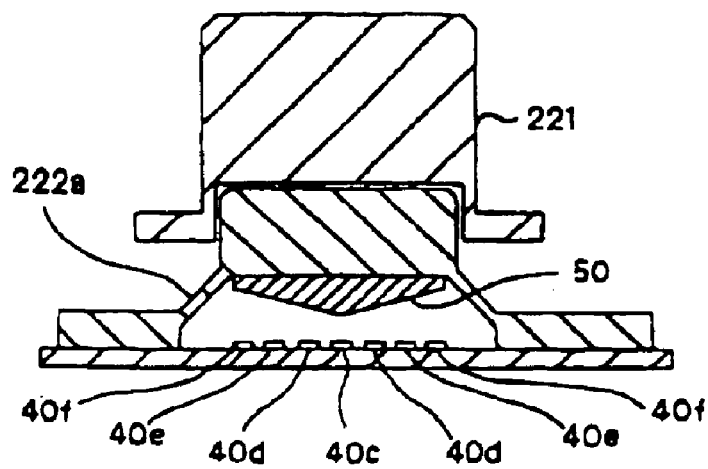
Figure 42B:
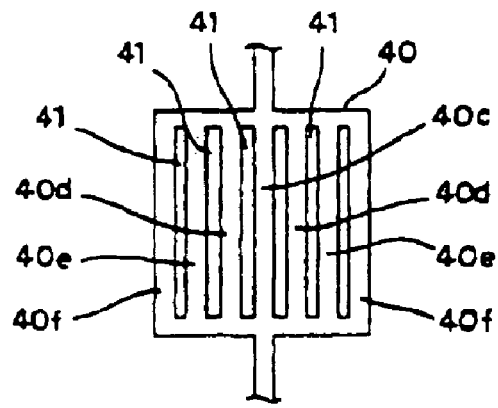
Figure 42C:
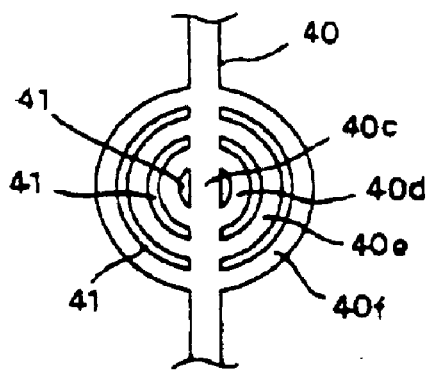
Figure 42D:
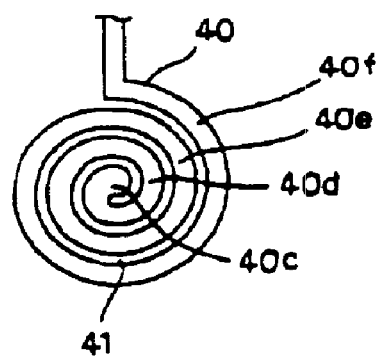

Therefore, the analog signal which is outputted by the output terminal of the resistor 40 changes step by step, as shown in FIG. 42D. The conductive member 50 has characteristics in that the boundary at which the analog output rapidly changes can be readily recognized and stable level-segment is easy.

Figure 43:
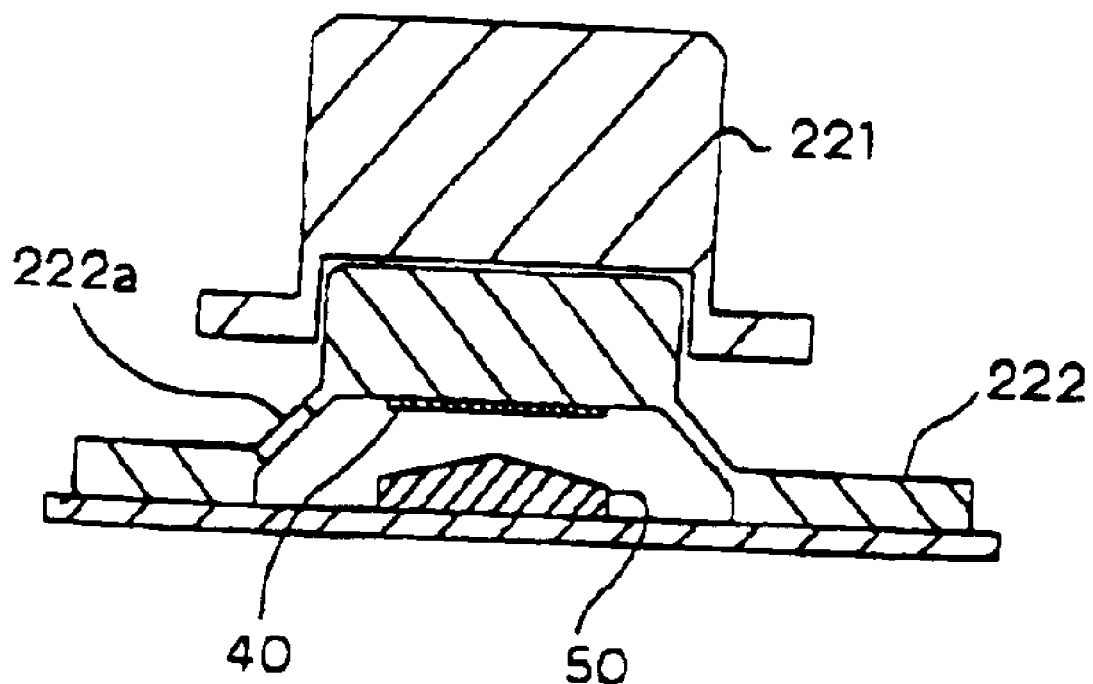
FIG. 43 is a front sectional-view showing another deformed example of the detecting device.

Incidentally, according to the detecting devices having the above-described various structures, the arrangement of the resistor 40 and the conductive member 50 in the control unit can be inverted. As an example, FIG. 43 illustrates that if the resistor 40 is adhered to the inside ceiling-surface of the elastic portion 222a which is formed on the elastic body 222 and the conductive member 50 is disposed at a position facing the resistor 40, the same function and advantage at the aforementioned detecting devices can be obtained.

The present invention is not limited to the above-described embodiments.

For instance, the control apparatus according to the present invention is not limited to be applied to the control apparatus 200 for the video game machine shown in FIG. 2 and the digital operation and the analog operation are possible and, thus, the present invention can be applied to a variety of control apparatus whereby the functions can be improved.

Accordingly to the present invention, as explained above, the digital signal having a plurality of bits whereby the analog control operation is possible is outputted by the output unit for the digital signal having a plurality of bits in accordance with the pressing operation of the controller. Therefore, the digital operation can be realized by the controller for pressing operation.

What is claimed is:

1. A control apparatus, comprising:
   a controller;
   a detecting device for providing analog signals in response to pressures applied to the controller during normal operation of the controller;
   a calibration voltage circuit for providing predetermined maximum and minimum calibration voltages; and
   an output unit including a level segmenting unit for monitoring voltage fluctuations in the predetermined maximum and minimum calibration voltages, segmenting an output level of the analog signals into discrete calibration levels based on the predetermined maximum and minimum calibration voltages after the occurrence of any voltage fluctuations in the predetermined maximum and minimum calibration voltages and segmenting output levels of the analog signals into the calibration levels during normal operation, and an analog-to-digital (A/D) converting unit for converting the analog output levels into digital signals each having a plurality of bits.

2. An apparatus according to claim 1, wherein the detecting device is a pressure-sensitive device which is arranged at a position relative to the controller such that a pressure acting on the controller is transmitted to the detecting device.

3. An apparatus according to claim 1, wherein the detecting device comprises:
   a resistor; and
   a conductive member which moves together with the controller for contacting the resistor; and
   wherein the conductive member has elasticity, and the output level of the analog signal corresponds to a contact area between the resistor and the conductive member.

4. An apparatus according to claim 1, wherein the detecting device includes:
   a conductive member; and
   a resistor which moves together with the controller for contacting the conductive member;
   wherein the conductive member has elasticity, and the output level of the analog signal corresponds to a contact area between the resistor and the conductive member.

5. An apparatus according to claim 3 or 4, wherein the conductive member is deformable and a size of the contact area is a function of a contact pressure exerted on the conductive member by the resistor.

6. An apparatus according to claim 5, wherein the conductive member is formed with a shape having a peaked longitudinal-section surface.

7. An apparatus according to claim 5, wherein the conductive member is formed with a shape having a trapezoidal longitudinal-section surface.

8. An apparatus according to claim 5, wherein the conductive member is formed with a shape having a cross-sectional area which decreases in discrete steps toward a portion which faces the resistor.

9. An apparatus according to claim 5, wherein the conductive member is formed with a spherical surface which faces the resistor.

10. An apparatus according to claim 3 or 4, wherein the resistor is formed with a shape having a cross-sectional area which decreases toward a top portion which faces said conductive member.

11. An apparatus according to claim 10, wherein the resistor is formed with a shape having a peaked longitudinal-section surface.

12. An apparatus according to claim 10, wherein the resistor is formed with a shape having a trapezoidal longitudinal-section surface.

13. An apparatus according to claim 10, wherein the resistor is formed with a spherical surface which faces the conductive member.

14. An apparatus according to claim 3 or 4, wherein the resistor is formed with a shape having a cross-sectional area which decreases in discrete steps toward a portion which faces the conductive member.

15. An apparatus according to claim 3 or 4, wherein the conductive member is deformable in accordance with a contact pressure exerted on the conductive member by the resistor such that a size of the contact area between the conductive member and the resistor changes; and the resistor comprises non-conductive regions such that the contact area increases in discrete steps.

16. An apparatus according to claim 1, wherein the level segmenting unit uniformly segments the output level of the analog signal.

17. An apparatus according to claim 1, wherein the output unit calibrates the control apparatus by ascertaining a maximum output level from the detecting device based on a maximum applied pressure such that the level segmenting unit divides the predetermined levels equally up to the maximum output level.

18. A control apparatus, comprising:
a controller;
a detecting device which provides analog signals in response to pressures applied to the controller during normal operation of the controller, the detecting device including a resistor and a conductive member which move together with the controller for contacting the resistor, where the conductive member has elasticity, and an output level of the analog signal corresponds to a contact area between the resistor and the conductive member;
a calibration voltage circuit for providing predetermined maximum and minimum calibration voltages;
a level segmenting unit for monitoring voltage fluctuations in the predetermined maximum and minimum calibration voltages, segmenting the output level of the analog signals into discrete calibration levels based on the predetermined maximum and minimum calibration voltages after the occurrence of any voltage fluctuations in the predetermined maximum and minimum calibration voltages and segmenting output levels of the analog signals into the calibration levels during normal operation; and
an analog-to-digital (A/D) converting unit for converting the analog output levels into digital signals each having a plurality of bits.

19. A control apparatus, having a controller and a detecting device which provides analog signals in response to pressures applied to the controller, wherein the control apparatus further comprises an output unit comprising:
a controller;
a detecting device which provides analogs signal in response to pressures applied to the controller during normal operation of the controller, the detecting device including a conductive member and a resistor which moves together with the controller for contacting the conductive member, where the conductive member has elasticity, and an output level of the analog signal corresponds to a contact area between the resistor and the conductive member;
a calibration voltage circuit for providing predetermined maximum and minimum calibration voltages;
a level segmenting unit for monitoring voltage fluctuations in the predetermined maximum and minimum calibration voltages, segmenting the output level of the analog signals into discrete calibration levels based on the predetermined maximum and minimum calibration voltages after the occurrence of any voltage fluctuations in the predetermined maximum and minimum calibration voltages and segmenting output levels of the analog signals into the calibration levels during normal operation; and
an A/D converting unit for converting the analog output levels into digital signals each having a plurality of bits.

20. A control apparatus according to claim 18 or 19, wherein the conductive member is deformable and a size of the contact area is a function of a contact pressure exerted on the conductive member by the resistor.

21. A device according to claim 20, wherein the conductive member is formed with a shape having a peaked longitudinal-section surface.

22. A device according to claim 20, wherein the conductive member is formed with a shape having a trapezoidal longitudinal-section surface.

23. A device according to claim 20, wherein the conductive member is formed with a shape having a cross-sectional area which decreases in discrete steps towards a portion that faces the resistor.

24. A device according to claim 20, wherein the conductive member is formed with a shape having a spherical surface which faces the resistor.

25. A device according to claim 18 or 19, wherein the resistor is formed with a shape having a cross-sectional area which decreases towards a lop portion that faces the conductive member.

26. A device according to claim 25, wherein the resistor is formed with a shape having a peaked longitudinal-section surface.

27. A device according to claim 25, wherein the resistor is formed with a shape having a trapezoidal longitudinal-section surface.

28. A device according to claim 25, wherein the resistor is formed with a shape having a spherical surface which faces the conductive member.

29. A device according to claim 18 or 19, wherein the resistor is formed with a shape having a cross-sectional area which decreases in discrete steps towards a portion that face the conductive member.

30. A device according to claim 18 or 19, wherein the conductive member is deformable in accordance with a contact pressure exerted on the conductive member by the resistor such that a size of the contact area between the conductive member and the resistor changes; and the resistor comprises non-conductive regions such that the contact area increases in discrete steps.

31. An apparatus according to claim 18 or 19, wherein the level segmenting unit calibrates the control apparatus by ascertaining a maximum output level from the detecting device based on a maximum applied pressure and dividing the predetermined levels equally up to the maximum output level.

32. A control apparatus, comprising:
a controller;
a detecting device for providing analog signals in response to pressures applied to the controller during normal operation of the controller;
a calibration voltage circuit for providing predetermined maximum and minimum calibration voltages; and
an output unit for monitoring voltage fluctuations in the predetermined maximum and minimum calibration voltages, segmenting an output level of the analog signals into discrete calibration levels based on the predetermined maximum and minimum calibration voltages after the occurrence of any voltage fluctuations in the predetermined maximum and minimum calibration voltages, segmenting output levels of the analog signals into the calibration levels during normal operation and for converting the analog output levels into digital signals each having a plurality of bits;
wherein the detecting device has a conductive member and a resistor, and a contact area between the conductive member and the resistor increases in discrete steps with an increase in the pressure applied to the controller, and the output level of the analog signal corresponds to the contact area between the resistor and the conductive member.

33. An apparatus according to claim 32, wherein the conductive member moves together with the controller for contacting the resistor such that the output level of the analog signal corresponds to the contact area between the resistor and the conductive member, and the conductive member has elasticity.

34. An apparatus according to claim 32, wherein the resistor moves together with the controller for contacting the conductive member such that the output level of the analog signal corresponds to the contact area between the resistor and the conductive member, and the conductive member has elasticity.

35. An apparatus according to claims 33 or 34, wherein the conductive member is formed with a shape having a cross-sectional area which decreases in discrete steps toward a portion which faces the resistor.

36. An apparatus according to claim 33 or 34, wherein the resistor is formed with a shape having a cross-sectional area which decreases in discrete steps toward a portion which faces the conductive member.

37. An apparatus according to claim 33 or 34, wherein the conductive member is deformable in accordance with a contact pressure exerted on the conductive member by the resistor such that a size of the contact area changes; and the resistor comprises non-conductive regions such that the contact area increases in discrete steps.

38. A device for use in a control apparatus having a controller which provides analog signals in response to pressures applied to the controller during normal operation of the controller, the device comprising:
 a calibration voltage circuit for providing predetermined maximum and minimum calibration voltages;
 an output unit for monitoring voltage fluctuations in the predetermined maximum and minimum calibration voltages, segmenting an output level of the analog signals into discrete calibration levels based on the predetermined maximum and minimum calibration voltages after the occurrence of any voltage fluctuations in the predetermined maximum and minimum calibration voltages, segmenting output levels of the analog signals into the calibration levels during normal operation and for converting the analog output levels into digital signals each having a plurality of bits;
 a conductive member;
 a resistor;
 wherein a contact area between the conductive member and the resistor increases in discrete steps with an increase in the pressure applied to the controller, and the output level of the analog signal corresponds to the contact area between the resistor and the conductive member.

39. An apparatus according to claim 32 or 38, wherein the output unit calibrates the controller by ascertaining a maximum output level from the detecting device based on a maximum applied pressure such that the output unit divides the predetermined levels equally up to the maximum output level.

40. An apparatus according to claim 39, wherein the conductive member moves together with the controller for contacting the resistor such that the output level of the analog signal corresponds to the contact area between the resistor and the conductive member, and the conductive member has elasticity.

41. An apparatus according to claim 39, wherein the resistor moves together with the controller for contacting the conductive member such that the output level of the analog signal corresponds to the contact area between the resistor and the conductive member, and the conductive member has elasticity.

42. An apparatus according to claims 40 or 41, wherein the conductive member is formed with a shape having a cross-sectional area which decreases in discrete steps toward a portion which faces the resistor.

43. An apparatus according to claims 40 or 41, wherein the resistor is formed with a shape having a cross-sectional area which decreases in discrete steps toward a portion which faces the conductive member.

44. An apparatus according to claims 40 or 41, wherein the conductive member is deformable in accordance with a contact pressure exerted on the conductive member by the resistor such that a size of the contact area changes; and the resistor comprises non-conductive regions such that the contact area increases in discrete steps.

45. A method of generating a signal representative of a pressure applied to a control apparatus, comprising:
 (a) generating analog signals representative of pressures applied to the control apparatus during normal operation of the control apparatus;
 (b) providing predetermined maximum and minimum calibration voltages;
 (c) monitoring voltage fluctuations in the predetermined maximum and minimum calibration voltages and segmenting an output level of the analog signals into discrete calibration levels based on the predetermined maximum and minimum calibration voltages after the occurrence of any voltage fluctuations in the predetermined maximum and minimum calibration voltages;
 (d) segmenting output levels of the analog signals into the calibration levels during normal operation; and
 (e) assigning preset digital signals corresponding to each of the analog output levels.

46. A method of generating a signal representative of pressures applied to a control apparatus comprising a controller including a resistor and an elastic conductive member which moves together with the controller for contacting the resistor, comprising:
 (a) generating analog signals corresponding to a contact area between the resistor and the conductive member during normal operation of the controller;
 (b) providing predetermined maximum and minimum calibration voltages;
 (c) monitoring voltage fluctuations in the predetermined maximum and minimum calibration voltages and segmenting an output level of the analog signals into discrete calibration levels based on the predetermined maximum and minimum calibration voltages after the occurrence of any voltage fluctuations in the predetermined maximum and minimum calibration voltages;
 (d) segmenting output levels of the analog signals into the calibration levels during normal operation; and
 (e) assigning preset digital signals corresponding to each of the analog output levels.

47. The method as claimed in claim 46, wherein the resistor increases in discrete steps with an increase in the pressure applied to the controller.

48. The method as claimed in claim 45 or 46, further comprising calibrating the control apparatus by ascertaining a maximum output level of the analog calibration signal based on a maximum applied pressure and dividing the predetermined levels equally up to the maximum output level.

49. A control apparatus, comprising:
 a controller;
 a detecting device for providing analog signals in response to pressures applied to the controller during normal operation of the controller; and first and second potentiometers for providing predetermined maximum and minimum calibration voltages; and an output unit including a level segmenting unit for monitoring voltage fluctuations in the predetermined maximum and minimum calibration voltages, segmenting an output level of the analog signals into discrete calibration levels based on the predetermined maximum and minimum calibration voltages after the occurrence of any voltage fluctuations in the predetermined maximum and minimum calibration voltages, and an analog-to-digital (A/D) converting unit for converting the analog output levels into digital signals each having a plurality of bits.

50. An apparatus according to claim 49, wherein the detecting device is a pressure-sensitive device which is arranged at a position relative to the controller such that a pressure acting on the controller is transmitted to the detecting device.

51. An apparatus according to claim 49, wherein the detecting device comprises:
a resistor; and
a conductive member which moves together with the controller for contacting the resistor; and
wherein the conductive member has elasticity, and the output level of the analog signal corresponds to a contact area between the resistor and the conductive member.

52. An apparatus according to claim 49, wherein the detecting device includes:
a conductive member; and
a resistor which moves together with the controller for contacting the conductive member;
wherein the conductive member has elasticity, and the output level of the analog signal corresponds to a contact area between the resistor and the conductive member.

53. An apparatus according to claim 51 or 52, wherein the conductive member is deformable and a size of the contact area is a function of a contact pressure exerted on the conductive member by the resistor.

54. An apparatus according to claim 53, wherein the conductive member is formed with a shape having a peaked longitudinal-section surface.

55. An apparatus according to claim 53, wherein the conductive member is formed with a shape having a trapezoidal longitudinal-section surface.

56. An apparatus according to claim 53, wherein the conductive member is formed with a shape having a cross-sectional area which decreases in discrete steps toward a portion which faces the resistor.

57. An apparatus according to claim 53, wherein the conductive member is formed with a spherical surface which faces the resistor.

58. An apparatus according to claim 51 or 52, wherein the resistor is formed with a shape having a cross-sectional area which decreases toward a top portion which faces the conductive member.

59. An apparatus according to claim 58, wherein the resistor is formed with a shape having a peaked longitudinal-section surface.

60. An apparatus according to claim 58, wherein the resistor is formed with a shape having a trapezoidal longitudinal-section surface.

61. An apparatus according to claim 58, wherein the resistor is formed with a spherical surface which faces the conductive member.

62. An apparatus according to claim 51 or 52, wherein the resistor is formed with a shape having a cross-sectional area which decreases in discrete steps toward a portion which faces the conductive member.

63. An apparatus according to claim 51 or 52, wherein the conductive member is deformable in accordance with a contact pressure exerted on the conductive member by the resistor such that a size of the contact area between the conductive member and the resistor changes; and the resistor comprises non-conductive regions such that the contact area increases in discrete steps.

64. An apparatus according to claim 49, wherein the level segmenting unit uniformly segments the output level of the analog signal.

65. A control apparatus, comprising:
a controller;
a detecting device which provides analog signals in response to pressures applied to the controller during normal operation of the controller, the detecting device including a resistor and a conductive member which moves together with the controller for contacting the resistor, where the conductive member has elasticity, and an output level of the analog signal corresponds to a contact area between the resistor and the conductive member;
first and second potentiometers for providing predetermined maximum and minimum calibration voltages;
a level segmenting unit for monitoring voltage fluctuations in the predetermined maximum and minimum calibration voltages, segmenting the output level of the analog signals into discrete calibration levels based on the predetermined maximum and minimum calibration voltages after the occurrence of any voltage fluctuations in the predetermined maximum and minimum calibration voltages and segmenting output levels of the analog signals into the calibration levels during normal operation; and
an analog-to-digital (A/D) converting unit for converting the analog output levels into digital signals each having a plurality of bits.

66. A control apparatus, having a controller and a detecting device which provides analog signals in response to pressures applied to the controller, wherein the control apparatus further comprises an output unit comprising:
a controller;
a detecting device provides analog signals in response to pressures applied to the controller, the detecting device including a conductive member and a resistor which moves together with the controller for contacting the conductive member, where the conductive member has elasticity, and an output level of the analog signal corresponds to a contact area between the resistor and the conductive member;
first and second potentiometers for providing predetermined maximum and minimum calibration voltages;
a level segmenting unit for monitoring voltage fluctuations in the predetermined maximum and minimum calibration voltages, segmenting the output level of the analog signals into discrete calibration levels based on the predetermined maximum and minimum calibration voltages after the occurrence of any voltage fluctuations in the predetermined maximum and minimum calibration voltages and segmenting output levels of the analog signals into the calibration levels during normal operation; and
an A/D converting unit for converting the analog output levels into digital signals each having a plurality of bits.

67. A control apparatus according to claim 65 or 66, wherein the conductive member is deformable and a size of the contact area is a function of a contact pressure exerted on the conductive member by the resistor.

68. A device according to claim 67, wherein the conductive member is formed with a shape having a peaked longitudinal-section surface.

69. A device according to claim 67, wherein the conductive member is formed with a shape having a trapezoidal longitudinal-section surface.

70. A device according to claim 67, wherein the conductive member is formed with a shape having a cross-sectional area which decreases in discrete steps towards a portion that faces the resistor.

71. A device according to claim 67 wherein the conductive member is formed with a shape having a spherical surface which faces the resistor.

72. A device according to claim 65 or 66, wherein the resistor is formed with a shape having a cross-sectional area which decreases towards a top portion that faces the conductive member.

73. A device according to claim 72, wherein the resistor is formed with a shape having a peaked longitudinal-section surface.

74. A device according to claim 72, wherein the resistor is formed with a shape having a trapezoidal longitudinal-section surface.

75. A device according to claim 72, wherein the resistor is formed with a shape having a spherical surface which faces the conductive member.

76. A device according to claim 65 or 66, wherein the resistor is formed with a shape having a cross-sectional area which decreases in discrete steps towards a portion that faces the conductive member.

77. A device according to claim 65 or 66 wherein the conductive member is deformable in accordance with a contact pressure exerted on the conductive member by the resistor such that a size of the contact area between the conductive member and the resistor changes; and the resistor comprises non-conductive regions such that the contact area increases in discrete steps.

78. A control apparatus, comprising:
a controller;
a detecting device for providing analog signals in response to pressures applied to the controller during normal operation of the controller;
first and second potentiometers for providing predetermined maximum and minimum calibration voltages; and
an output unit for monitoring voltage fluctuations in the predetermined maximum and minimum calibration voltages, segmenting an output level of the analog signals into discrete calibration levels based on the predetermined maximum and minimum calibration voltages after the occurrence of any voltage fluctuations in the predetermined maximum and minimum calibration voltages, segmenting output levels of the analog signals into the calibration levels during normal operation and for converting the analog output levels into digital signals each having a plurality of bits;
wherein the detecting device has a conductive member and a resistor, and a contact area between the conductive member and the resistor increases in discrete steps with an increase in the pressure applied to the controller, and the output level of the analog signal corresponds to the contact area between the resistor and the conductive member.

79. An apparatus according to claim 78, wherein the conductive member moves together with the controller for contacting the resistor such that the output level of the analog signal corresponds to the contact area between the resistor and the conductive member, and the conductive member has elasticity.

80. An apparatus according to claim 78, wherein the resistor moves together with the controller for contacting the conductive member such that the output level of the analog signal corresponds to the contact area between the resistor and the conductive member, and the conductive member has elasticity.

81. An apparatus according to claims 79 or 80, wherein the conductive member is formed with a shape having a cross-sectional area which decreases in discrete steps toward a portion which faces the resistor.

82. An apparatus according to claim 79 or 80, wherein the resistor is formed with a shape having a cross-sectional area which decreases in discrete steps toward a portion which faces the conductive member.

83. An apparatus according to claims 79 or 80, wherein the conductive member is deformable in accordance with a contact pressure exerted on the conductive member by the resistor such that a size of the contact area changes; and the resistor comprises non-conductive regions such that the contact area increases in discrete steps.

84. A device for use in a control apparatus having a controller which provides an analog signal in response to pressures applied to the controller during normal operation of the controller, the device comprising:
first and second potentiometers for providing predetermined maximum and minimum calibration voltages;
an output unit for monitoring voltage fluctuations in the predetermined maximum and minimum calibration voltages, segmenting an output level of the analog signals into discrete calibration levels based on a predetermined maximum and minimum calibration voltages after the occurrence of any voltage fluctuations in the predetermined maximum and minimum calibration voltages, segmenting output levels of the analog signals into the calibration levels during normal operation and for converting the analog output levels into digital signals each having a plurality of bits;
a conductive member; and
a resistor;
wherein a contact area between the conductive member and the resistor increases in discrete steps with an increase in the pressure applied to the controller, and the output level of the analog signal corresponds to the contact area between the resistor and the conductive member.

85. An apparatus according to claim 84, wherein the conductive member moves together with the controller for contacting the resistor such that the output level of the analog signal corresponds to the contact area between the resistor and the conductive member, and the conductive member has elasticity.

86. An apparatus according to claim 84, wherein the resistor moves together with the controller for contacting the conductive member such that the output level of the analog signal corresponds to the contact area between the resistor and the conductive member, and the conductive member has elasticity.

87. An apparatus according to claims 85 or 86, wherein the conductive member is formed with a shape having a cross-sectional area which decreases in discrete steps toward a portion which faces the resistor.

88. An apparatus according to claims 85 or 86, wherein the resistor is formed with a shape having a cross-sectional area which decreases in discrete steps toward a portion which faces the conductive member.

89. An apparatus according to claims 85 or 86, wherein the conductive member is deformable in accordance with a contact pressure exerted on the conductive member by the resistor such that a size of the contact area changes; and the resistor comprises non-conductive regions such that the content area increases in discrete steps.

* * * * *

UNITED STATES PATENT AND TRADEMARK OFFICE
CERTIFICATE OF CORRECTION

PATENT NO.     : 6,935,956 B1
DATED          : August 30, 2005
INVENTOR(S)    : Hiroki Ogata et al.

It is certified that error appears in the above-identified patent and that said Letters Patent is hereby corrected as shown below:

Column 2,
Line 43, after "surface" insert -- which --.

Column 13,
Line 31, "illustrate" should read -- illustrates --.

Column 16,
Line 2, "is" should read -- are --.

Column 18,
Line 11, delete the word "have".

Column 21,
Line 8, "have" should read -- has --.
Line 12, "is" should read -- are --.
Line 33, delete the word "are".

Column 22,
Line 9, "have" should read -- has --.

Column 25,
Line 37, "analogs signal" should read -- analog signals --.

Column 26,
Line 12, "lop" should read -- top --.
Line 26, "face" should read -- faces --.

Column 27,
Lines 56 and 62, "39" should read -- 38 --.

Column 28,
Line 67, delete "and".

Column 30,
Line 41, "analog signals" should read -- an analog signal --.
Line 42, "pressures" should read -- a pressure --.

UNITED STATES PATENT AND TRADEMARK OFFICE
CERTIFICATE OF CORRECTION

PATENT NO. : 6,935,956 B1
DATED : August 30, 2005
INVENTOR(S) : Hiroki Ogata et al.

It is certified that error appears in the above-identified patent and that said Letters Patent is hereby corrected as shown below:

Column 32,
Line 36, delete "a".

Signed and Sealed this

Thirteenth Day of December, 2005

JON W. DUDAS
*Director of the United States Patent and Trademark Office*